US011175482B2

United States Patent
Zhang et al.

(10) Patent No.: US 11,175,482 B2
(45) Date of Patent: Nov. 16, 2021

(54) TELEPHOTO LENS ASSEMBLY AND CAMERA DEVICE

(71) Applicant: ZHEJIANG SUNNY OPTICAL CO., LTD, Ningbo (CN)

(72) Inventors: Kaiyuan Zhang, Ningbo (CN); Jianke Wenren, Ningbo (CN); Lin Huang, Ningbo (CN); Fujian Dai, Ningbo (CN)

(73) Assignee: ZHEJIANG SUNNY OPTICAL CO., LTD

( * ) Notice: Subject to any disclaimer, the term of this patent is extended or adjusted under 35 U.S.C. 154(b) by 0 days.

(21) Appl. No.: 15/766,515

(22) PCT Filed: May 17, 2017

(86) PCT No.: PCT/CN2017/084659
§ 371 (c)(1),
(2) Date: Apr. 6, 2018

(87) PCT Pub. No.: WO2018/126587
PCT Pub. Date: Jul. 12, 2018

(65) Prior Publication Data
US 2020/0241247 A1    Jul. 30, 2020

(30) Foreign Application Priority Data

Jan. 4, 2017  (CN) .......................... 201710004228.1

(51) Int. Cl.
*G02B 13/02*    (2006.01)
*G02B 9/60*    (2006.01)
(Continued)

(52) U.S. Cl.
CPC ............... *G02B 13/02* (2013.01); *G02B 9/60* (2013.01); *G02B 13/0045* (2013.01); *G02B 27/0025* (2013.01); *H04N 5/2254* (2013.01)

(58) Field of Classification Search
CPC .. G02B 13/02; G02B 13/0045; G02B 13/005; G02B 13/006; G02B 9/60; G02B 9/62; G02B 9/64; G02B 27/0025
(Continued)

(56) References Cited

U.S. PATENT DOCUMENTS 7,852,572 B2  12/2010 Robinson
2008/0316609 A1  12/2008 Robinson
(Continued)

FOREIGN PATENT DOCUMENTS

CN  106154515 A  11/2016
CN  205910403 U  1/2017
CN  106569322 A  4/2017

*Primary Examiner* — Jordan M Schwartz
(74) *Attorney, Agent, or Firm* — Barnes & Thornburg LLP

(57) ABSTRACT

The present application provides a telephoto lens assembly, the telephoto lens assembly includes a first lens, a second lens, a third lens, a fourth lens, and at least one subsequent lens, provided sequentially from an object side to an image side along an optical axis, the first lens has a positive focal power, an object side surface of the first lens is a convex surface, and an axial distance from the object side surface of the first lens to an image plane TTL and a total effective focal length f of the telephoto lens assembly satisfy: TTL/f≤1.0, and the fourth lens has a positive focal power, an effective focal length of the first lens f1, an effective focal length of the fourth lens f4 and the total effective focal length f satisfy: 1<|f/f1|+|f/f4|≤2.7.

15 Claims, 30 Drawing Sheets

(51) Int. Cl.
    *G02B 27/00*    (2006.01)
    *G02B 13/00*    (2006.01)
    *H04N 5/225*    (2006.01)
(58) Field of Classification Search
    USPC ................................................ 359/745–746
    See application file for complete search history.

(56)         References Cited

U.S. PATENT DOCUMENTS

2013/0215524 A1      8/2013   Kwon et al.
    2015/0029601 A1*     1/2015   Dror ........................ G02B 9/60
                                                                  359/764
    2016/0109686 A1      4/2016   Lin et al.
    2016/0131869 A1*     5/2016   Liao ................... G02B 27/0025
                                                                  250/208.1
    2016/0320589 A1*    11/2016   Liao ........................ G02B 9/60
    2017/0023770 A1      1/2017   Teraoka
    2017/0102522 A1*     4/2017   Jo ...................... G02B 13/0045
    2017/0102524 A1*     4/2017   Jo ...................... G02B 13/0045
    2017/0269328 A1      9/2017   Jhang et al.
    2017/0351050 A1*    12/2017   Sugita .................... G02B 7/008
    2018/0059376 A1*     3/2018   Lin .......................... G02B 5/00
    2018/0180847 A1*     6/2018   Yoo .......................... G02B 9/62
    2018/0180856 A1*     6/2018   Jung ................... G02B 13/0045
    2019/0086640 A1*     3/2019   Fukaya .................... G02B 9/62

* cited by examiner

TELEPHOTO LENS ASSEMBLY AND CAMERA DEVICE

CROSS-REFERENCE TO RELATED APPLICATIONS

This application is a U.S. national counterpart application of international application serial No. PCT/CN2017/084659 filed May 17, 2017, which claims priority to Chinese Patent Application No. 201710004228.1, filed Jan. 4, 2017. The disclosures of both PCT/CN2017/084659 and Chinese Patent Application No. 201710004228.1 are hereby incorporated by referenced.

TECHNICAL FIELD

The present disclosure relates to the field of telephoto lens assembly, and a camera device equipped with the telephoto lens assembly.

BACKGROUND

As charge-coupled device (CCD) and complementary metal-oxide semiconductor (CMOS) image sensors are having increasingly higher performance and smaller size, telephoto lens assemblies also need to meet the requirements for higher image quality and miniaturization.

In addition, as one's requirement for the image quality of portable electronic products is getting higher and higher, mobile phones, tablet PCs and other electronic products will become thinner and smaller. To achieve miniaturization, the number of lenses in an imaging lens assembly needs to be reduced as much as possible. However, this may lead to a lack of design freedom, making it difficult to meet the requirements for high imaging performance on the market. Currently, to obtain a broad view image, mainstream telephoto lens assemblies adopt a wide-angle optical system, which, however, is not suitable for photographing a distant object and cannot obtain a clear image.

SUMMARY

The present application intends to provide a miniaturized telephoto lens assembly having a high resolution.

According to an aspect, the present application provides a telephoto lens assembly, the telephoto lens assembly includes sequentially, from an object side to an image side along an optical axis: a first lens, a second lens, a third lens, a fourth lens, and at least one subsequent lens, wherein the first lens has a positive focal power, an object side surface of the first lens is a convex surface, and an axial distance from the object side surface of the first lens to an image plane TTL and a total effective focal length f of the telephoto lens assembly may satisfy: TTL/f≤1.0, for example, TTL/f≤0.99, and the fourth lens has a positive focal power, an effective focal length of the first lens f1, an effective focal length of the fourth lens f4 and the total effective focal length f of the telephoto lens assembly may satisfy: 1<|f/f1|+|f/f4|≤2.7, for example, 1.16≤|f/f1|+|f/f4|≤2.7.

According to an embodiment of the present application, the effective focal length of the first lens f1 and the total effective focal length f satisfy: 0.45<f1/f≤1.0, for example, 0.46≤f1/f≤1.0.

According to an embodiment of the present application, the second lens has a negative focal power, and an image side surface of the second lens is a concave surface. An effective focal length of the second lens f2 and the total effective focal length f may satisfy: −1.5<f2/f<−0.7, for example, −1.48≤f2/f≤−0.77.

According to an embodiment of the present application, an effective focal length of the third lens f3, the effective focal length of the fourth lens f4 and the total effective focal length f may satisfy: |f/f3|+|f/f4|<1.5, for example, |f/f3|+|f/f4|≤1.44.

According to an embodiment of the present application, a radius of curvature of an object side surface of the fourth lens R7 and a radius of curvature of an image side surface of the fourth lens R8 may satisfy: |(R7+R8)/(R7−R8)|≤2, for example, |(R7+R8)/(R7−R8)|≤1.92.

According to an embodiment of the present application, an axial air spacing between the second lens and the third lens T23 and an axial air spacing between the third lens and the fourth lens T34 may satisfy: T34/T23<2.5, for example, T34/T23≤2.3.

According to an embodiment of the present application, a radius of curvature of an object side surface of the second lens R3 and a radius of curvature of the image side surface of the second lens R4 may satisfy: |(R3+R4)/(R3−R4)|≤2, for example, |(R3+R4)/(R3−R4)|≤1.8.

According to an embodiment of the present application, a radius of curvature of an object side surface of the third lens R5 and a radius of curvature of an image side surface of the third lens R6 may satisfy: |(R5−R6)/(R5+R6)|≤1, for example, |(R5−R6)/(R5+R6)|≤0.97.

According to an embodiment of the present application, the at least one subsequent lens may include a fifth lens having a negative focal power, and an object side surface of the fifth lens is a concave surface. A vector height of the object side surface of the fifth lens at a maximum effective diameter SAG51 and a center thickness of the fifth lens CT5 may satisfy: |SAG51/CT5|<4.0, for example, |SAG51/CT5|≤3.56.

According to an embodiment of the present application, an effective focal length of the fifth lens f5 and the total effective focal length f may satisfy: −1.5<f5/f<−0.5, for example, −1.26f5/f≤−0.52.

According to an embodiment of the present application, a center thickness of the first lens CT1, a center thickness of the second lens CT2, a center thickness of the third lens CT3, a center thickness of the fourth lens CT4 and the center thickness of the fifth lens CT5 may satisfy: 0.5<(CT2+CT3+CT5)/(CT1+CT4)<1.0, for example, 0.56≤(CT2+CT3+CT5)/(CT1+CT4)≤0.95.

According to another aspect, the present application provides a telephoto lens assembly. The telephoto lens assembly may include sequentially, from an object side to an image side along an optical axis: a first lens, a second lens, a third lens, and a plurality of subsequent lenses, wherein an axial distance from an object side surface of the first lens to an image plane TTL and a total effective focal length f of the telephoto lens assembly may satisfy: TTL/f≤1.0, for example, TTL/f≤0.99; and a radius of curvature of an object side surface of the third lens R5 and a radius of curvature of an image side surface of the third lens R6 may satisfy: |(R5−R6)/(R5+R6)|≤1, for example, |(R5−R6)/(R5+R6)|≤0.97.

According to an embodiment of the present application, the first lens may have a positive focal power, the object side surface of the first lens is a convex surface, an effective focal length of the first lens f1 and the total effective focal length f may satisfy: 0.45<f1/f≤1.0, for example, 0.46≤f1/f≤1.0.

According to an embodiment of the present application, the second lens has a negative focal power, and an image side surface of the second lens is a concave surface. An effective focal length of the second lens f2 and the total effective focal length f may satisfy: $-1.5<f2/f<-0.7$, for example, $-1.48 \leq f2/f \leq -0.77$.

According to an embodiment of the present application, a radius of curvature of an object side surface of the second lens R3 and a radius of curvature of the image side surface of the second lens R4 may satisfy: $|(R3+R4)/(R3-R4)| \leq 2$, for example, $|(R3+R4)/(R3-R4)| \leq 1.8$.

According to an embodiment of the present application, an axial air spacing between the second lens and the third lens T23 and an axial air spacing between the third lens and the fourth lens T34 may satisfy: $T34/T23<2.5$, for example, $T34/T23 \leq 2.3$.

According to an embodiment of the present application, the plurality of subsequent lenses may include a fourth lens having a positive focal power, wherein an effective focal length of the third lens f3, an effective focal length of the fourth lens f4 and the total effective focal length f may satisfy: $|f/f3|+|f/f4|<1.5$, for example, $|f/f3+f/f4| \leq 1.44$.

According to an embodiment of the present application, a radius of curvature of an object side surface of the fourth lens R7 and a radius of curvature of an image side surface of the fourth lens R8 may satisfy: $|(R7+R8)/(R7-R8)| \leq 2$, for example, $|(R7+R8)/(R7-R8)| \leq 1.92$.

According to an embodiment of the present application, the effective focal length of the first lens f1, the effective focal length of the fourth lens f4 and the total effective focal length f satisfy: $1<|f/f1|+|f/f4| \leq 2.7$, $1.16<|f/f1|+f/f4| \leq 2.7$.

According to an embodiment of the present application, wherein, the plurality of subsequent lenses may further include a fifth lens having a negative focal power, and an object side surface of the fifth lens may be a concave surface. A vector height of the object side surface of the fifth lens at a maximum effective diameter SAG51 and a center thickness of the fifth lens CT5 may satisfy: $|SAG51/CT5|<4.0$, for example, $|SAG51/CT5| \leq 3.56$.

According to an embodiment of the present application, an effective focal length of the fifth lens f5 and the total effective focal length f may satisfy: $-1.5<f5/f<-0.5$, for example, $-1.26 \leq f5/f \leq -0.52$.

According to an embodiment of the present application, a center thickness of the first lens CT1, a center thickness of the second lens CT2, a center thickness of the third lens CT3, a center thickness of the fourth lens CT4, and the center thickness of the fifth lens CT5 may satisfy: $0.5<(CT2+CT3+CT5)/(CT1+CT4)<1.0$, for example, $0.56 \leq (CT2+CT3+CT5)/(CT1+CT4) \leq 0.95$.

According to another aspect, the present application further provides a camera device that may be equipped with the telephoto lens assembly.

BRIEF DESCRIPTION OF THE DRAWINGS

The above and other advantages of embodiments of the present application will become apparent from the following detailed description with reference to the accompanying drawings, which are intended to illustrate the exemplary embodiments of the present application rather than limiting them. In the drawings.

DETAILED DESCRIPTION OF EMBODIMENTS

Figure 1:
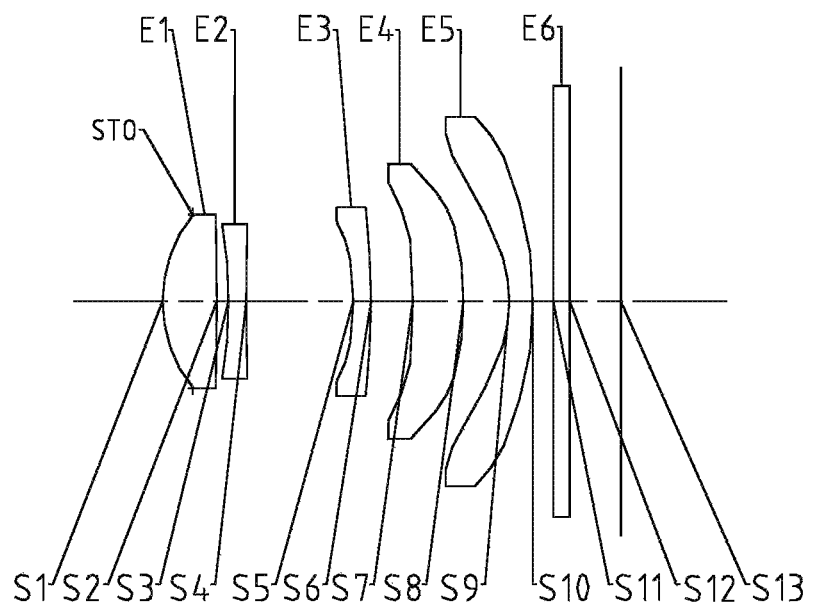
FIG. 1 is a schematic structural diagram illustrating a telephoto lens assembly according to Embodiment 1 of the present application.

For a better understanding of the present application, various aspects of the present application will be described in more detail with reference to the accompanying drawings. It should be understood that the detailed description is merely illustrative of the exemplary embodiments of the present application and is not intended to limit the scope of the present application in any way. Throughout the specification, the same reference numerals refer to the same elements. The expression "and/or" includes any and all combinations of one or more of the associated listed items.

It should be noted that in the present specification, the expressions of the first, the second, the third, etc. are used only to distinguish one feature from another, without indicating any limitation to the feature. Thus, the first lens discussed below may also be referred to as the second lens or the third lens without departing from the teachings of the present application.

In the accompanying drawings, the thickness, size and shape of the lens have been slightly exaggerated for the convenience of explanation, but it should be understood that the sizes of the components are not limited by the accompanying drawings and may be appropriately adjusted within a certain range. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In addition, the paraxial area refers to an area near the optical axis. The first lens is the lens closest to the object and the sixth lens is the lens closest to the photosensitive element. The surface closest to the object in each lens herein is referred to as the object side surface, and the surface closest to the image plane in each lens is referred to as the image side surface.

It should be further understood that the terms "comprising," "including," "having" and variants thereof, when used in this specification, specify the presence of stated features, unities, steps, operations, elements and/or components, but do not exclude the presence or addition of one or more other features, unities, steps, operations, elements, components and/or combinations thereof. In addition, expressions, such as "at least one of," when preceding a list of features, modify the entire list of features rather than an individual feature in the list. Further, the use of "may", when describing embodiments of the present application, relates to "one or more embodiments of the present application." Also, the term "exemplary" is intended to refer to an example or illustration.

Unless otherwise defined, all terms (including technical and scientific terms) used herein have the same meaning as commonly understood by those of ordinary skill in the art to which the present application belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

The features, principles and other aspects of the present application will be described in detail below.

The present application provides a telephoto lens assembly. The telephoto lens assembly according to an exemplary embodiment of the present application may comprise a first lens, a second lens, a third lens, a fourth lens, at least one subsequent lens and a photosensitive element provided sequentially from an object side to an image side along an optical axis, and the telephoto lens assembly may have a total effective focal length f.

In an exemplary embodiment, the first lens may have a positive focal power, and an object side surface of the first lens is a convex surface. An axial distance from the object side surface of the first lens to an image plane TTL and a total effective focal length f of the telephoto lens assembly may satisfy: TTL/f≤1.0, and more particularly, satisfy TTL/f≤0.99. The fourth lens may have a positive focal power. An effective focal length of the first lens f1, an effective focal length of the fourth lens f4 and the total effective focal length f may satisfy: 1<|f/f1|+|f/f4|≤2.7, more particularly, satisfy 1.16≤f/f1|+|f/f4|≤2.7. By reasonably setting the distance from the object side surface of the first lens to the image plane of the telephoto lens assembly, the lens assembly may be made as thin as possible. In addition, by reasonably selecting the focal length of each lens and appropriately adjusting the total effective focal length of the telephoto lens assembly, the telephoto lens assembly can obtain a preferable flat field condition.

In an exemplary embodiment, the first lens may be set in order that the effective focal length of the first lens f1 and the total effective focal length f satisfy: 0.45<f1/f≤1.0, more particularly, satisfy 0.46≤f1/f≤1.0, to ensure that the first lens has a proper positive focal power, thereby facilitating the design of subsequent lenses.

In an exemplary embodiment, the second lens may have a negative focal power, and an image side surface of the second lens may be set as a concave surface. An effective focal length of the second lens f2 and the total effective focal length f of the telephoto lens assembly may satisfy: −1.5<f2/f<−0.7, more particularly, satisfy −1.48≤f2/f≤−0.77. By reasonably setting the effective focal length of the second lens, it is possible to ensure that the second lens is capable of generating a certain positive spherical aberration to balance a negative spherical aberration of the positive focal power lens; if a ratio between the effective focal length of the second lens f2 and the total effective focal length f of the telephoto lens assembly is less than a lower limit value, the correction ability is insufficient, and if it is larger than an upper limit value, an excessive positive spherical aberration is generated.

In an exemplary embodiment, an effective focal length of the third lens f3, the effective focal length of the fourth lens f4 and the total effective focal length f may satisfy: |f/f3|+|f/f4|<1.5, more particularly, satisfy |f/f3|+|f/f4|≤1.44. By reasonably configuring a relationship between the effective focal length of the third lens f3 and the effective focal length of the fourth lens f4, it is possible to ensure that the system obtains a suitable relative brightness.

In an exemplary embodiment, a radius of curvature of an object side surface of the fourth lens R7 and a radius of curvature of an image side surface of the fourth lens R8 may satisfy: |(R7+R8)/(R7−R8)|≤2, for example, satisfy |(R7+R8)/(R7−R8)|≤1.92. By making the difference between the radiuses of curvature of the fourth lens as large as possible, it is ensured that the fourth lens has a strong ability of balancing an aberration.

In an exemplary embodiment, an axial air spacing between the second lens and the third lens T23 and an axial air spacing between the third lens and the fourth lens T34 may satisfy: T34/T23<2.5, for example, T34/T23≤2.3. By reasonably selecting axial positions of the second lens and the third lens, a Petzval field curvature can be well corrected.

In an exemplary embodiment, a radius of curvature of an object side surface of the second lens R3 and a radius of curvature of the image side surface of the second lens R4 may satisfy: |(R3+R4)/(R3−R4)|≤2, for example, |(R3+R4)/(R3−R4)|≤1.8. By reasonably allocating the curvature of the second lens, the second lens may have a suitable Seidel aberration coefficient, so that a primary aberration can be well balanced.

In an exemplary embodiment, a radius of curvature of an object side surface of the third lens R5 and a radius of curvature of an image side surface of the third lens R6 may satisfy: |(R5−R6)/(R5+R6)|≤1, more particularly, for example satisfy |(R5−R6)/(R5+R6)|≤0.97. By reasonably setting the curvature of the third lens, a spherical aberration may be effectively corrected.

In an exemplary embodiment, at least one subsequent lens of the telephoto lens assembly may include a fifth lens having a negative focal power, and an object side surface of the fifth lens is a concave surface. A vector height of the object side surface of the fifth lens at a maximum effective diameter SAG51 and a center thickness of the fifth lens CT5 may satisfy: |SAG51/CT5|<4.0, more particularly, may satisfy |SAG51/CT5|≤3.56.

In an exemplary embodiment, an effective focal length of the fifth lens f5 and the total effective focal length f of the telephoto lens assembly may satisfy: −1.5<f5/f<−0.5, more particularly, satisfy −1.26≤f5/f≤−0.52, so that the fifth lens has a proper negative focal power.

In an exemplary embodiment, a center thickness of the first lens CT1, a center thickness of the second lens CT2, a center thickness of the third lens CT3, a center thickness of the fourth lens CT4 and the center thickness of the fifth lens CT5 may satisfy: 0.5<(CT2+CT3+CT5)/(CT1+CT4)<1.0, more particularly, may satisfy: 0.56≤(CT2+CT3+CT5)/(CT1+CT4)≤0.95. By reasonably selecting the thickness of each lens, it is possible to reasonably correct a fifth-order spherical aberration and a chromatic spherical aberration. If the (CT2+CT3+CT5)/(CT1+CT4) is less than a lower limit value, the fifth-order spherical aberration increases significantly, and if the (CT2+CT3+CT5)/(CT1+CT4) is larger than an upper limit, the chromatic spherical aberration increases significantly.

The present application further provides another telephoto lens assembly. The telephoto lens assembly may include sequentially, from an object side to an image side along an optical axis, a first lens, a second lens, a third lens and a plurality of subsequent lenses. In the telephoto lens assembly, an axial distance from an object side surface of the first lens to an image plane TTL and a total effective focal length f of the telephoto lens assembly may satisfy: TTL/f≤1.0, for example, TTL/f≤0.99, and a radius of curvature of an object side surface of the third lens R5 and a radius of curvature of an image side surface of the third lens R6 may satisfy: |(R5−R6)/(R5+R6)|≤1, for example, |(R5−R6)/(R5+R6)|≤0.97. Such designed telephoto lens assembly may effectively correct a spherical aberration as well as ensuring that the lens assembly is as thin as possible.

In another exemplary embodiment, the first lens may be set in order that an effective focal length of the first lens f1 and the total effective focal length f satisfy: 0.45<f1/f≤1.0, more particularly, satisfy 0.46≤f1/f≤1.0, to ensure that the first lens has a proper positive focal power, thereby facilitating the design of a subsequent lens.

In another exemplary embodiment, the second lens may have a negative focal power, and an image side surface of the second lens may be set as a concave surface. An effective focal length of the second lens f2 and the total effective focal length f of the telephoto lens assembly may satisfy: −1.5<f2/f<−0.7, more particularly, satisfy −1.48≤f2/f≤−0.77. By reasonably setting the effective focal length of the second lens, it is possible to ensure that the second lens is capable of generating a certain positive spherical aberration to balance a negative spherical aberration of the positive focal power lens; if a ratio between the effective focal length of the second lens f2 and the total effective focal length f of the telephoto lens assembly is less than a lower limit value, the correction ability is insufficient, and if it is larger than an upper limit value, an excessive positive spherical aberration is generated.

In another exemplary embodiment, a radius of curvature of an object side surface of the second lens R3 and a radius of curvature of the image side surface of the second lens R4 may satisfy: |(R3+R4)/(R3−R4)|≤2, for example, |(R3+R4)/(R3−R4)|≤1.8. By reasonably allocating the curvature of the second lens, the second lens may have a suitable Seidel aberration coefficient, so that a primary aberration can be well balanced.

In another exemplary embodiment, an axial air spacing between the second lens and the third lens T23 and an axial air spacing between the third lens and the fourth lens T34 may satisfy: T34/T23<2.5, for example, T34/T23≤2.3. By reasonably selecting axial positions of the second lens and the third lens, a Petzval field curvature can be well corrected.

In another exemplary embodiment, the plurality of subsequent lenses in the telephoto lens assembly may further include a fourth lens having a positive focal power. An effective focal length of the third lens f3, an effective focal length of the fourth lens f4 and the total effective focal length f of the telephoto lens assembly may satisfy: |f/f3|+|f/f4|<1.5, more particularly, may satisfy |f/f3|+f/f4≤1.44. By reasonably configuring a relationship between the effective focal length of the third lens f3 and the effective focal length of the fourth lens f4, it is possible to ensure that the system obtains a suitable relative brightness.

In another exemplary embodiment, a radius of curvature of an object side surface of the fourth lens R7 and a radius of curvature of an image side surface of the fourth lens R8 may satisfy: |(R7+R8)/(R7−R8)|≤2, for example, satisfy |(R7+R8)/(R7−R8)|≤1.92. By making the difference between the radiuses of curvature of the fourth lens as large as possible, it is ensured that the fourth lens has a strong ability of balancing an aberration.

In another exemplary embodiment, the effective focal length of the first lens f1, the effective focal length of the fourth lens f4 and the total effective focal length f may satisfy: 1<|f/f1|+|f/f4|≤2.7, more particularly, satisfy 1.16≤|f/f1|+|f/f4|≤2.7. By reasonably selecting the focal length of each lens and appropriately adjusting the total effective focal length of the telephoto lens assembly, the telephoto lens assembly can obtain a preferable flat field condition.

In another exemplary embodiment, the plurality of subsequent lenses in the telephoto lens assembly may further include a fifth lens. The fifth lens may have a negative focal power, and an object side surface of the fifth lens may be a concave surface. A vector height of the object side surface of the fifth lens at a maximum effective diameter SAG51 and a center thickness of the fifth lens CT5 may satisfy: |SAG51/CT5|<4.0, more particularly, may satisfy |SAG51/CT5|≤3.56.

In another exemplary embodiment, an effective focal length of the fifth lens f5 and the total effective focal length f of the telephoto lens assembly may satisfy: −1.5<f5/f<−0.5, more particularly, satisfy −1.26≤f5/f≤−0.52, so that the fifth lens has a proper negative focal power.

In another exemplary embodiment, a center thickness of the first lens CT1, a center thickness of the second lens CT2, a center thickness of the third lens CT3, a center thickness of the fourth lens CT4 and the center thickness of the fifth lens CT5 may satisfy: 0.5<(CT2+CT3+CT5)/(CT1+CT4)<1.0, more particularly, may satisfy: 0.56≤ (CT2+CT3+CT5)/(CT1+CT4)≤0.95. By reasonably selecting the thickness of each lens, it is possible to reasonably correct a fifth-order spherical aberration and a chromatic spherical aberration. If the (CT2+CT3+CT5)/(CT1+CT4) is less than a lower limit value, the fifth-order spherical aberration increases significantly, and if the (CT2+CT3+CT5)/(CT1+CT4) is larger than an upper limit, the chromatic spherical aberration increases significantly.

The present application further provides a camera device. The camera device may include the telephoto lens assembly described above.

The telephoto lens assembly according to the exemplary embodiments of the present application may use a plurality of lenses, for example, five as used in the present application, but it should be understood as examples rather than limitations. By reasonably allocating the focal power, center thickness, surface form of each lens, axial spacing between lenses, etc., it is possible to provide a miniaturized telephoto lens assembly having a high resolution. In the embodiments of the present application, at least one of the mirror surfaces of the lenses is an aspheric mirror surface. The feature of the aspheric lens is: from the center of the lens to the periphery, the curvature is continuously changing. Unlike the spherical lens with a certain curvature from the center of the lens to the periphery, the aspheric lens has a better radius of curvature feature, which has an advantage of improving a distorted aberration and improving an astigmatic aberration, capable of making the field of view larger and more realistic. Using the aspheric lens, an aberration at the time of imaging can be eliminated as much as possible, thereby improving an image quality.

However, it should be understood by those skilled in the art that the various results and advantages described below may be obtained by changing the constituting numbers of the lens assemblies without departing from the technical solution claimed by the present application. For example, although five lenses are described as an example in the description of Embodiment 1, the telephoto lens assembly is not limited to including five lenses. If desired, the telephoto lens assembly may also include other numbers of lenses.

Specific embodiments of the telephoto lens assembly that may be applied to the above-described embodiments are further described below with reference to FIG. 1 to FIG. 24D.

Embodiment 1

Embodiment 1 of the telephoto lens assembly according to the embodiments of the present application is described below with reference to FIG. 1 to FIG. 2D.

As shown in FIG. 1, Embodiment 1 of the telephoto lens assembly includes a first lens E1 having an object side surface S1 and an image side surface S2, a second lens E2 having an object side surface S3 and an image side surface S4, a third lens E3 having an object side surface S5 and an image side surface S6, a fourth lens E4 having an object side surface S7 and an image side surface S8 and a fifth lens E5 having an object side surface S9 and an image side surface S10. In this embodiment, the first lens may have a positive focal power and the object side surface of the first lens may be a convex surface; the second lens may have a negative focal power and the image side surface of the second lens may be a concave surface; the third lens may have a positive focal power or a negative focal power; the fourth lens may have a positive focal power; and the fifth lens may have a negative focal power, and the object side surface of the fifth lens may be a concave surface. The telephoto lens assembly may also include a diaphragm (not shown) and a filter E6 having an object side surface S11 and an image side surface S12 and for filtering out the infrared light. In the telephoto lens assembly of the present embodiment, an aperture STO may also be provided to adjust the amount of light entered. Light from an object passes through the surfaces S1 to S12 sequentially and is finally imaged on the image plane S13.

Effective focal lengths of the lenses f1 to f5, a total effective focal length f of the telephoto lens assembly, a total length of the camera lens TTL and a half maximum field-of-view angle HFOV of the telephoto lens assembly in Embodiment 1 are shown in Table 1 below.

TABLE 1

| f1 (mm) | 3.32 | f (mm) | 6.41 |
|---|---|---|---|
| f2 (mm) | −9.47 | TTL (mm) | 5.90 |
| f3 (mm) | −9.68 | HFOV (deg) | 25.55 |
| f4 (mm) | 8.27 | | |
| f5 (mm) | −4.59 | | |

With reference to Table 1, the axial distance from the object side surface of the first lens to the image plane TTL and the total effective focal length f of the telephoto lens assembly satisfy: TTL/f=0.92. An effective focal length of the first lens f1 and the total effective focal length f satisfy: f1/f=0.52. An effective focal length of the second lens f2 and the total effective focal length f satisfy: f2/f=−1.48. The effective focal length of the first lens f1, an effective focal length of the fourth lens f4 and the total effective focal length f satisfy: |f/f1|+|f/f4|=2.7. An effective focal length of the third lens f3, the effective focal length of the fourth lens f4 and the total effective focal length f satisfy: |f/f3+f/f4|=1.44. An effective focal length of the fifth lens f5 and the total effective focal length f satisfy: f5/f=−0.72.

Table 2 shows a surface form, a radius of curvature, a thickness, a material and a conic constant of each lens in this embodiment.

TABLE 2

| surface number | surface form | radius of curvature | thickness | material | conic constant |
|---|---|---|---|---|---|
| OBJ | spherical | infinite | infinite | | |
| STO | spherical | infinite | −0.3858 | | |
| S1 | aspheric | 1.8104 | 0.6977 | 1.53, 55.8 | 0.7841 |
| S2 | aspheric | −77.1829 | 0.1488 | | −99.0000 |
| S3 | aspheric | −9.4854 | 0.2300 | 1.64, 23.5 | 66.3362 |
| S4 | aspheric | 16.9293 | 1.3781 | | −99.0000 |
| S5 | aspheric | −4.6533 | 0.2300 | 1.64, 23.5 | 14.3804 |
| S6 | aspheric | −19.0757 | 0.5366 | | 6.2204 |
| S7 | aspheric | −23.7893 | 0.6513 | 1.66, 20.4 | 99.0000 |
| S8 | aspheric | −4.4938 | 0.5905 | | 1.5747 |
| S9 | aspheric | −1.9857 | 0.3000 | 1.53, 55.8 | −1.5709 |
| S10 | aspheric | −10.8799 | 0.2666 | | −0.8600 |
| S11 | spherical | infinite | 0.2100 | 1.52, 64.2 | |
| S12 | spherical | infinite | 0.6604 | | |
| S13 | spherical | infinite | | | |

Table 3 shows high-order coefficients $A_4, A_6, A_8, A_{10}, A_{12}$ and $A_{14}$ applicable to each of the aspheric surfaces S1 to S10 of the aspheric lenses in this Embodiment.

TABLE 3

| surface number | $A_4$ | $A_6$ | $A_8$ | $A_{10}$ | $A_{12}$ | $A_{14}$ |
|---|---|---|---|---|---|---|
| S1 | −1.9341E−02 | 2.420E−03 | −2.4298E−02 | 3.3539E−02 | −2.5486E−0 | 7.8660E−03 |
| S2 | −3.7680E−02 | 4.2305E−02 | −5.9015E−03 | −2.2809E−0 | 2.7934E−02 | −9.7003E−03 |
| S3 | −7.3914E−02 | 1.2778E−01 | −1.0026E−01 | 4.5244E−02 | −7.4047E−03 | −2.2859E−03 |
| S4 | −4.9649E−02 | 9.1512E−02 | −9.7260E−02 | 6.1266E−02 | −2.5624E−02 | 3.9480E−03 |
| S5 | −7.5395E−02 | −1.6644E−01 | 5.2182E−01 | −5.4835E−01 | 2.7217E−01 | −6.0317E−02 |
| S6 | −7.7281E−02 | −1.0366E−01 | 3.1184E−01 | −2.3485E−01 | 7.4673E−02 | −8.8626E−03 |
| S7 | −9.6674E−03 | −1.0126E−01 | 7.1105E−02 | −2.2090E−02 | 3.8613E−03 | −3.2075E−04 |
| S8 | 2.9258E−02 | −7.1590E−02 | 3.4812E−02 | −8.9265E−03 | 8.5341E−04 | 5.4549E−05 |
| S9 | −6.5675E−02 | 7.8139E−02 | −3.7326E−02 | 9.0424E−03 | −1.0574E−03 | 4.7852E−05 |
| S10 | −1.1273E−01 | 8.2612E−02 | −3.0676E−02 | 6.2815E−03 | −7.0086E−04 | 3.3228E−05 |

With reference to Table 2 and Table 3, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.56. A radius of curvature of the object side surface of the second lens R3 and a radius of curvature of the image side surface of the second lens R4 satisfy: |(R3+R4)/(R3−R4)|=0.28. An axial air spacing between the second lens and the third lens T23 and n axial air spacing between the third lens and the fourth lens T34 satisfy: T34/T23=0.39. A radius of curvature of the object side surface of the third lens R5 and a radius of curvature of the image side surface of the third lens R6 satisfy: |(R5−R6)/(R5+R6)|=0.61. A radius of curvature of the object side surface of the fourth lens R7 and a radius of curvature of the image side surface of the fourth lens R8 satisfy: |(R7+R8)/(R7−R8)|=1.47.

In this embodiment, a vector height of the object side surface of the fifth lens at a maximum effective diameter SAG51 and the center thickness of the fifth lens CT5 satisfy: |SAG51/CT5|=2.72.

Figure 2A:
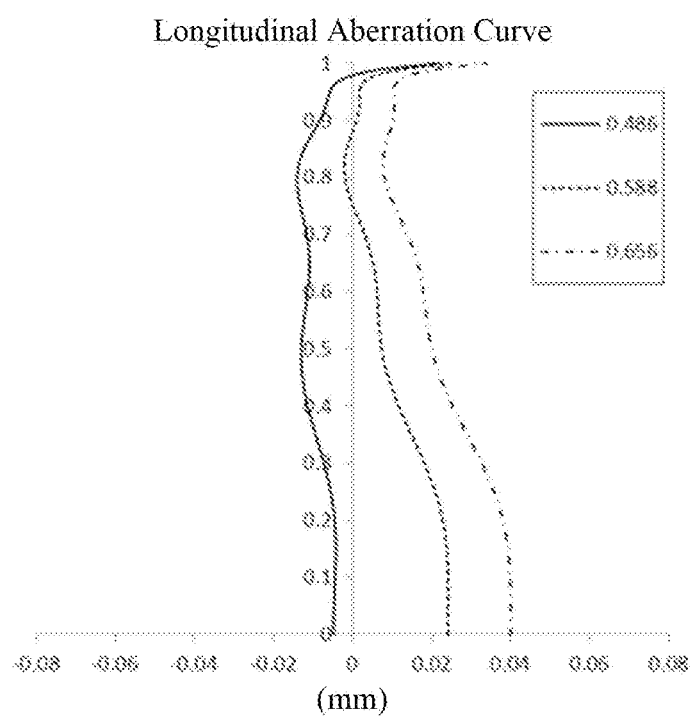
FIG. 2A illustrates a longitudinal aberration curve of the telephoto lens assembly according to Embodiment 1.
Figure 2B:
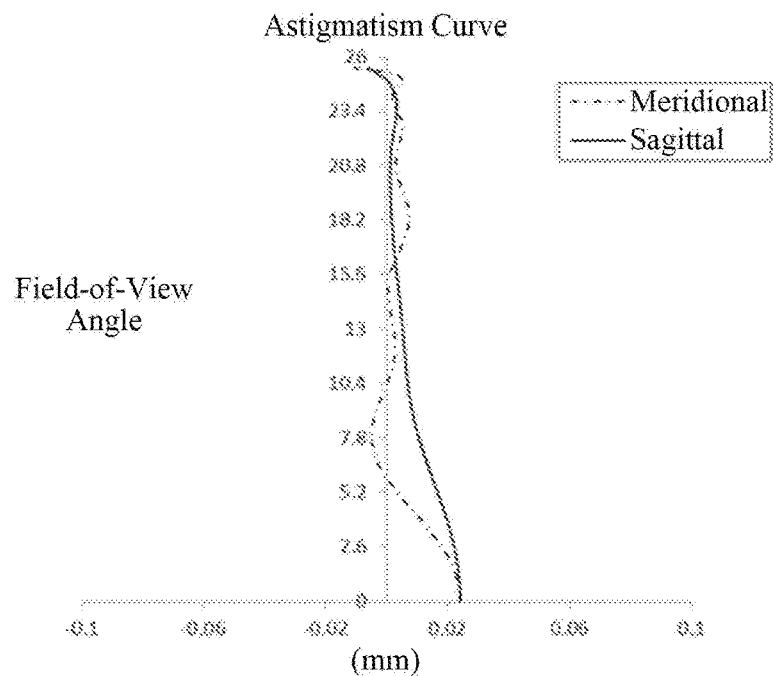
FIG. 2B illustrates an astigmatism curve of the telephoto lens assembly according to Embodiment 1.
Figure 2C:
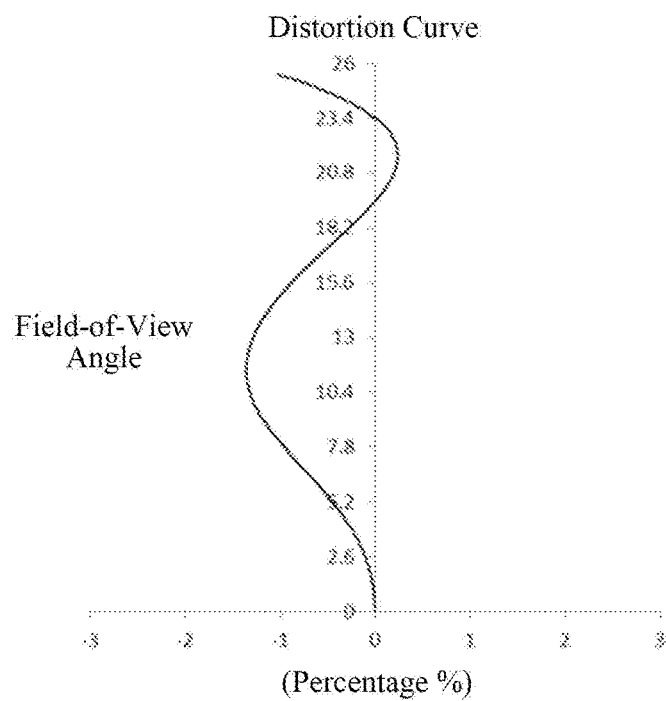
FIG. 2C illustrates a distortion curve of the telephoto lens assembly according to Embodiment 1.
Figure 2D:
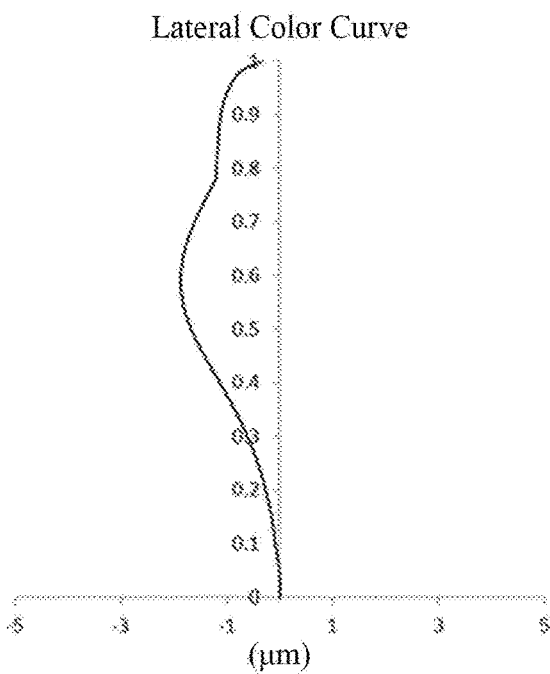
FIG. 2D shows a lateral color curve of the telephoto lens assembly according to Embodiment 1.

FIG. 2A illustrates a longitudinal aberration curve of the telephoto lens assembly according to Embodiment 1, representing deviations of focal points of light of different wavelengths converged after passing through an optical system. FIG. 2B illustrates an astigmatism curve of the telephoto lens assembly according to Embodiment 1, representing a curvature of a meridional image plane and a curvature of a sagittal image plane. FIG. 2C illustrates a distortion curve of the telephoto lens assembly according to Embodiment 1, representing amounts of distortion at different viewing angles. FIG. 2D illustrates a lateral color curve of the telephoto lens assembly according to Embodiment 1, representing deviations of different image heights on an image plane after light passes through the telephoto lens assembly. It can be seen from FIG. 2A to FIG. 2D that the telephoto lens assembly according to Embodiment 1 achieves good image quality while ensuring miniaturization.

Embodiment 2

A telephoto lens assembly according to Embodiment 2 of the present application is described below with reference to FIG. 3 to FIG. 4D. In addition to parameters of each lens of the telephoto lens assembly, for example, in addition to the radius of curvature, thickness, material, conic constant, effective focal length, axial spacing, higher-order coefficient etc. of each lens, the telephoto lens assembly described in the present Embodiment 2 and the following embodiments is the same as the configuration and construction of the telephoto lens assembly described in Embodiment 1. For the purpose of brevity, the description of parts similar to those in Embodiment 1 will be omitted.

Figure 3:
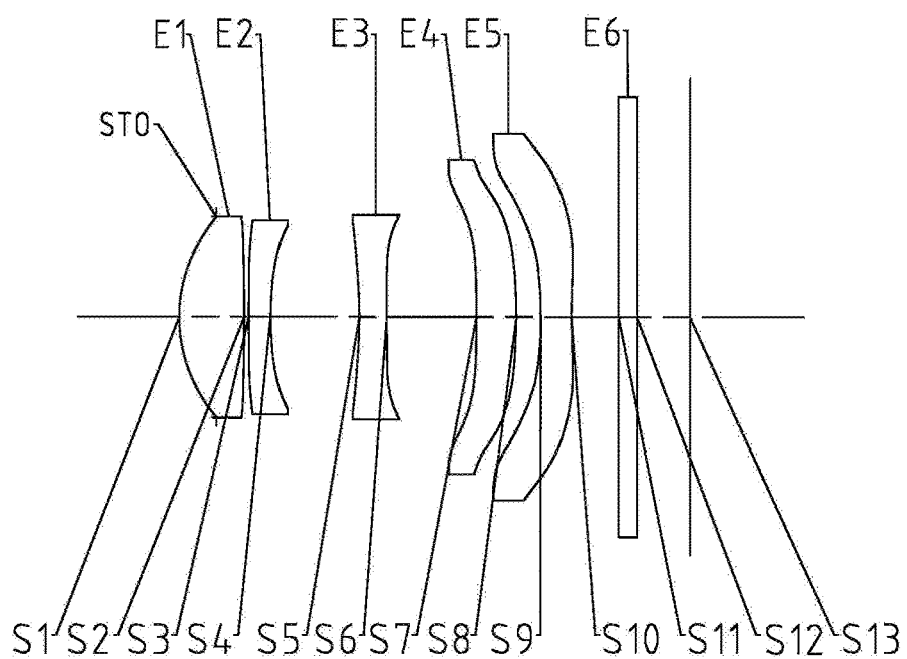
FIG. 3 is a schematic structural diagram illustrating a telephoto lens assembly according to Embodiment 2 of the present application.

FIG. 3 is a schematic structural diagram illustrating a telephoto lens assembly according to Embodiment 2 of the present application. As shown in FIG. 3, the telephoto lens assembly according to Embodiment 2 includes five lenses E1-E5 respectively having an object side surface and an image side surface.

Effective focal lengths of the lenses f1 to f5, a total effective focal length f of the telephoto lens assembly, a total length of the camera lens TTL and a half maximum field-of-view angle HFOV of the telephoto lens assembly in Embodiment 2 are shown in Table 4 below.

TABLE 4

| f1 (mm) | 3.06   | f (mm)    | 6.51  |
| f2 (mm) | −7.31  | TTL (mm)  | 5.85  |
| f3 (mm) | −11.41 | HFOV (deg)| 22.66 |
| f4 (mm) | 11.77  |           |       |
| f5 (mm) | −5.33  |           |       |

With reference to Table 4, the axial distance from the object side surface of the first lens to the image plane TTL and the total effective focal length f of the telephoto lens assembly satisfy: TTL/f=0.90. An effective focal length of the first lens f1 and the total effective focal length f satisfy: f1/f=0.47. An effective focal length of the second lens f2 and the total effective focal length f satisfy: f2/f=−1.12. The effective focal length of the first lens f1, an effective focal length of the fourth lens f4 and the total effective focal length f satisfy: |f/f1|+|f/f4|=2.68. An effective focal length of the third lens f3, the effective focal length of the fourth lens f4 and the total effective focal length f satisfy: |f/f3+|f/f4|=1.12. An effective focal length of the fifth lens f5 and the total effective focal length f satisfy: f5/f=−0.82.

Table 5 shows a surface form, a radius of curvature, a thickness, a material and a conic constant of each lens in this embodiment.

TABLE 5

| surface number | surface form | radius of curvature | thickness | material   | conic constant |
|----------------|--------------|---------------------|-----------|------------|----------------|
| OBJ            | spherical    | infinite            | infinite  |            |                |
| STO            | spherical    | infinite            | −0.4254   |            |                |
| S1             | aspheric     | 1.7226              | 0.7466    | 1.54, 56.1 | −0.6443        |
| S2             | aspheric     | −42.7739            | 0.0500    |            | 99.0000        |
| S3             | aspheric     | 20.4577             | 0.2500    | 1.66, 20.4 | 98.3361        |
| S4             | aspheric     | 3.8901              | 1.0166    |            | 7.0669         |
| S5             | aspheric     | −5.4086             | 0.3140    | 1.54, 56.1 | −99.0000       |
| S6             | aspheric     | −42.8279            | 1.0307    |            | 99.0000        |
| S7             | aspheric     | −17.1098            | 0.4557    | 1.66, 20.4 | 99.0000        |
| S8             | aspheric     | −5.4042             | 0.2784    |            | 4.7305         |
| S9             | aspheric     | −5.3007             | 0.3500    | 1.53, 55.8 | 3.8949         |
| S10            | aspheric     | 6.3052              | 0.5412    |            | −40.5088       |
| S11            | spherical    | infinite            | 0.2100    | 1.52, 64.2 |                |
| S12            | spherical    | infinite            | 0.6077    |            |                |
| S13            | spherical    | infinite            |           |            |                |

Table 6 shows high-order coefficients $A_4$, $A_6$, $A_8$, $A_{10}$, $A_{12}$, $A_{14}$, $A_{16}$, $A_{18}$ and $A_{20}$ applicable to each of the aspheric surfaces S1 to S10 of the aspheric lenses in this Embodiment.

TABLE 6

| surface number | $A_4$       | $A_6$       | $A_8$       | $A_{10}$    | $A_{12}$    |
|----------------|-------------|-------------|-------------|-------------|-------------|
| S1             | 1.5123E−02  | 1.0671E−02  | −6.0862E−02 | 2.2823E−01  | −4.8494E−01 |
| S2             | −8.0524E−02 | 3.9748E−01  | −1.1716E+00 | 2.2787E+00  | −2.9338E+00 |
| S3             | −1.0074E−01 | 4.7025E−01  | −1.3118E+00 | 2.4867E+00  | −3.0011E+00 |
| S4             | −4.2868E−02 | 2.0845E−01  | −5.4534E−01 | 9.3043E−01  | −6.1725E−01 |
| S5             | −6.1119E−02 | 1.2634E−01  | −1.1985E−01 | 2.6612E−01  | −7.1432E−01 |
| S6             | 3.3176E−02  | 6.0064E−02  | −4.0818E−02 | 1.2912E−01  | −2.6861E−01 |
| S7             | 1.4892E−02  | −1.5488E−01 | 2.0966E−01  | −1.7271E−01 | 7.9839E−02  |

TABLE 6-continued

| S8 | 1.2805E-01 | -3.3749E-01 | 3.5972E-01 | -2.1460E-01 | 7.6222E-02 |
|---|---|---|---|---|---|
| S9 | 5.4904E-02 | -2.3597E-01 | 8.2637E-02 | 2.0621E-01 | -2.5331E-01 |
| S10 | -7.4713E-02 | -2.4089E-02 | 1.5224E-02 | 2.4849E-02 | -2.7818E-02 |

| surface number | $A_{14}$ | $A_{16}$ | $A_{18}$ | $A_{20}$ |
|---|---|---|---|---|
| S1 | 6.0456E-01 | -4.4196E-01 | 1.7560E-01 | -2.9546E-02 |
| S2 | 2.5035E+00 | -1.3877E+00 | 4.5688E-01 | -6.8254E-02 |
| S3 | 2.2657E+00 | -1.0359E+00 | 2.6145E-01 | -2.8122E-02 |
| S4 | -4.9881E-01 | 1.1979E+00 | -8.1073E-01 | 1.9494E-01 |
| S5 | 1.1770E+00 | -1.1398E+00 | 5.9265E-01 | -1.2886E-01 |
| S6 | 3.3945E-01 | -2.6519E-01 | 1.1228E-01 | -1.9437E-02 |
| S7 | -1.8356E-02 | 1.6472E-03 | 0 | 0 |
| S8 | -2.0248E-02 | 5.4937E-03 | -1.1392E-03 | 1.0061E-04 |
| S9 | 1.2825E-01 | -3.4033E-02 | 4.6664E-03 | -2.6198E-04 |
| S10 | 1.2235E-02 | -2.8441E-03 | 3.4761E-04 | -1.7659E-05 |

With reference to Table 5 and Table 6, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.76. A radius of curvature of the object side surface of the second lens R3 and a radius of curvature of the image side surface of the second lens R4 satisfy: |(R3+R4)/(R3−R4)|=1.47. An axial air spacing between the second lens and the third lens T23 and an axial air spacing between the third lens and the fourth lens T34 satisfy: T34/T23=1.01. A radius of curvature of the object side surface of the third lens R5 and a radius of curvature of the image side surface of the third lens R6 satisfy: |(R5−R6)/(R5+R6)|=0.78. A radius of curvature of the object side surface of the fourth lens R7 and a radius of curvature of the image side surface of the fourth lens R8 satisfy: |(R7+R8)/(R7−R8)|=1.92.

In this embodiment, a vector height of the object side surface of the fifth lens at a maximum effective diameter SAG51 and the center thickness of the fifth lens CT5 satisfy: |SAG51/CT5|=1.55.

Figure 4A:
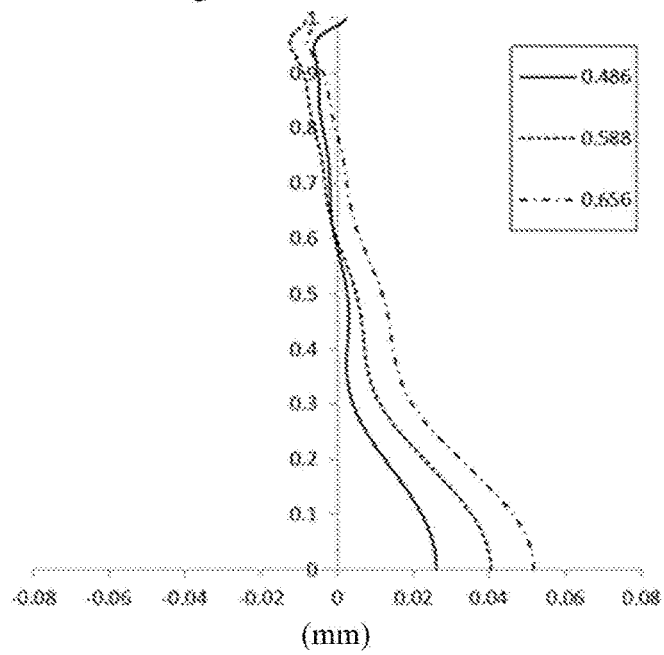
FIG. 4A illustrates a longitudinal aberration curve of the telephoto lens assembly according to Embodiment 2.
Figure 4B:
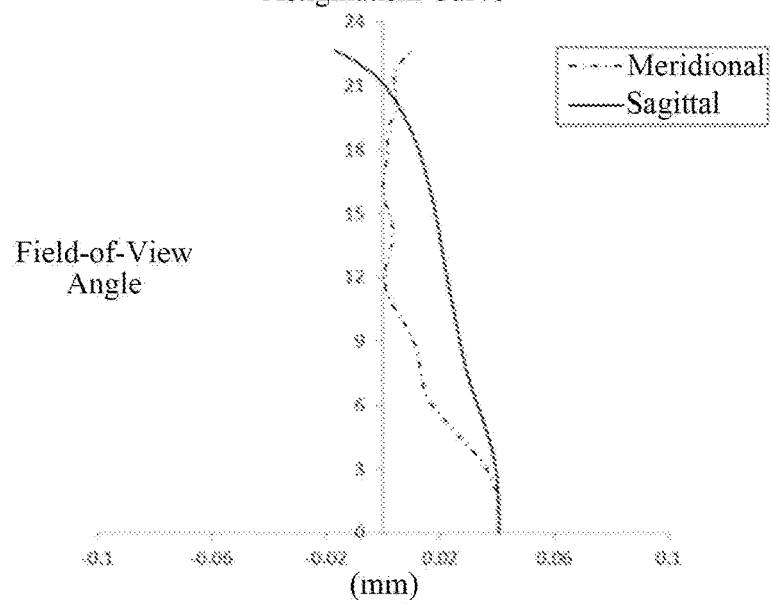
FIG. 4B illustrates an astigmatism curve of the telephoto lens assembly according to Embodiment 2.
Figure 4C:
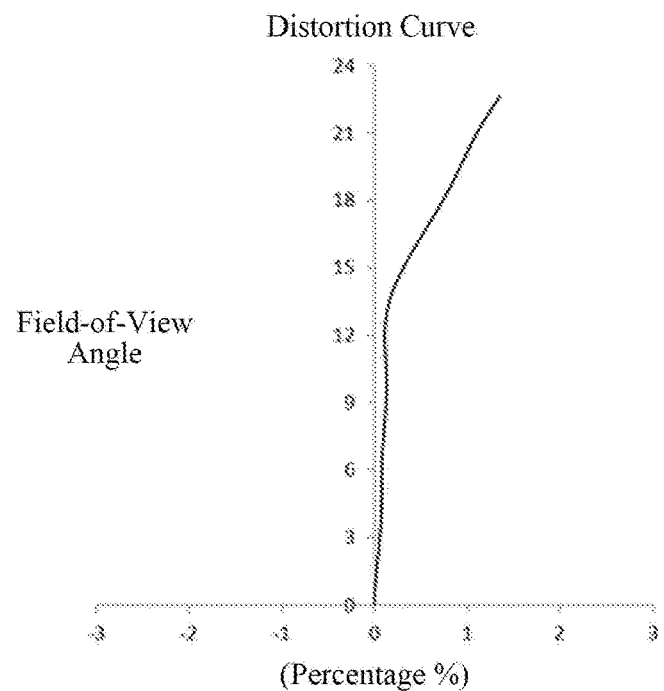
FIG. 4C illustrates a distortion curve of the telephoto lens assembly according to Embodiment 2.
Figure 4D:
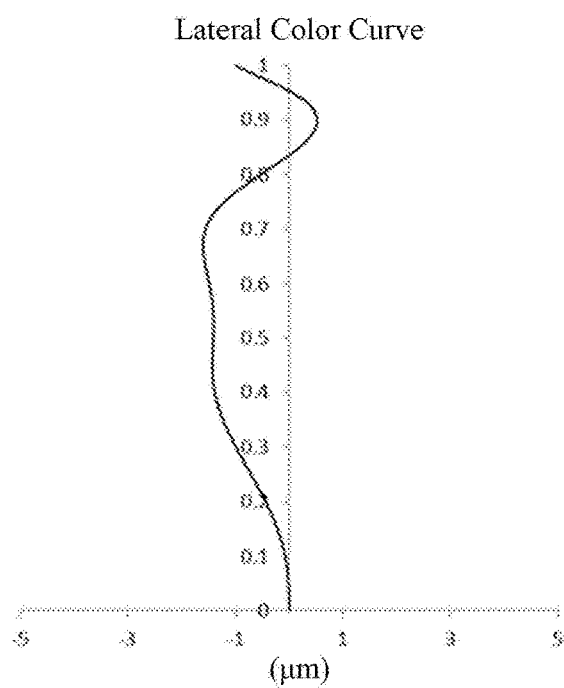
FIG. 4D illustrates a lateral color curve of the telephoto lens assembly according to Embodiment 2.

FIG. 4A illustrates a longitudinal aberration curve of the telephoto lens assembly according to Embodiment 2, representing deviations of focal points of light of different wavelengths converged after passing through an optical system. FIG. 4B illustrates an astigmatism curve of the telephoto lens assembly according to Embodiment 2, representing a curvature of a meridional image plane and a curvature of a sagittal image plane. FIG. 4C illustrates a distortion curve of the telephoto lens assembly according to Embodiment 2, representing amounts of distortion at different viewing angles. FIG. 4D illustrates a lateral color curve of the telephoto lens assembly according to Embodiment 2, representing deviations of different image heights on an image plane after light passes through the telephoto lens assembly. It can be seen from FIG. 4A to FIG. 4D that the telephoto lens assembly according to Embodiment 2 achieves good image quality while ensuring miniaturization.

Embodiment 3

Figure 5:
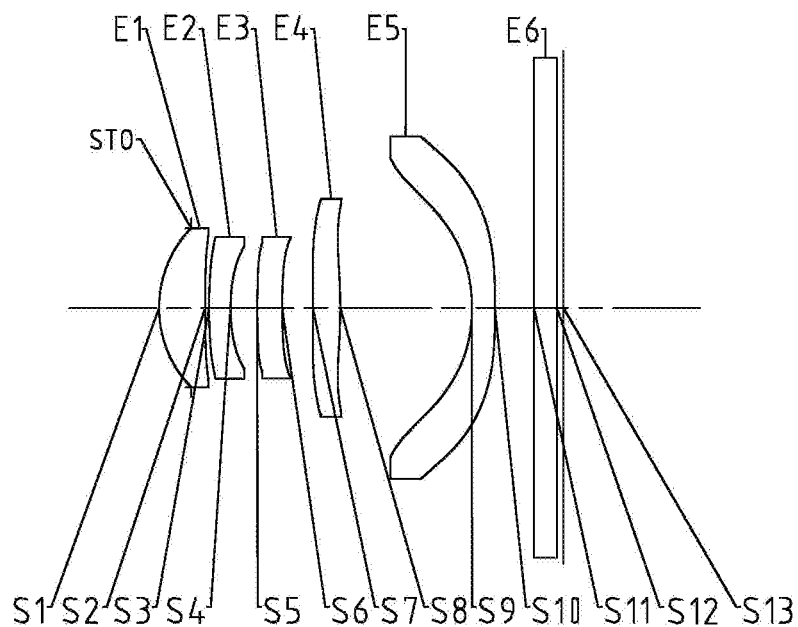
FIG. 5 is a schematic structural diagram illustrating a telephoto lens assembly according to Embodiment 3 of the present application.

A telephoto lens assembly according to Embodiment 3 of the present application is described below with reference to FIG. 5 to FIG. 6D. FIG. 5 is a schematic structural diagram illustrating a telephoto lens assembly according to Embodiment 3 of the present application. As shown in FIG. 5, the telephoto lens assembly according to Embodiment 3 includes five lenses E1-E5 respectively having an object side surface and an image side surface.

Effective focal lengths of the lenses f1 to f5, a total effective focal length f of the telephoto lens assembly, a total length of the camera lens TTL and a half maximum field-of-view angle HFOV of the telephoto lens assembly in Embodiment 3 are shown in Table 7 below.

TABLE 7

| f1 (mm) | 2.81 | f (mm) | 5.62 |
|---|---|---|---|
| f2 (mm) | -4.48 | TTL (mm) | 5.30 |
| f3 (mm) | -38.15 | HFOV (deg) | 29.77 |
| f4 (mm) | 11.74 | | |
| f5 (mm) | -4.58 | | |

With reference to Table 7, the axial distance from the object side surface of the first lens to the image plane TTL and the total effective focal length f of the telephoto lens assembly satisfy: TTL/f=0.94. An effective focal length of the first lens f1 and the total effective focal length f satisfy: f1/f=0.50. An effective focal length of the second lens f2 and the total effective focal length f satisfy: f2/f=−0.80. The effective focal length of the first lens f1, an effective focal length of the fourth lens f4 and the total effective focal length f satisfy: |f/f1|+|f/f4|=2.48. An effective focal length of the third lens f3, the effective focal length of the fourth lens f4 and the total effective focal length f satisfy: |f/f3|+|f/f4|=0.63. An effective focal length of the fifth lens f5 and the total effective focal length f satisfy: f5/f=−0.81.

Table 8 shows a surface form, a radius of curvature, a thickness, a material and a conic constant of each lens in this embodiment.

TABLE 8

| surface number | surface form | radius of curvature | thickness | material | conic constant |
|---|---|---|---|---|---|
| OBJ | spherical | infinite | infinite | | |
| STO | spherical | infinite | -0.4208 | | |
| S1 | aspheric | 1.5347 | 0.6054 | 1.53, 55.8 | -0.1486 |
| S2 | aspheric | -58.8128 | 0.0501 | | -99.0000 |
| S3 | aspheric | 8.8948 | 0.2800 | 1.66, 20.4 | 63.4437 |
| S4 | aspheric | 2.1916 | 0.3508 | | 3.8358 |
| S5 | aspheric | 9.7341 | 0.3252 | 1.54, 56.1 | 94.2370 |
| S6 | aspheric | 6.5484 | 0.4047 | | -3.6394 |
| S7 | aspheric | -266.5953 | 0.3582 | 1.66, 20.4 | 99.0000 |
| S8 | aspheric | -7.5405 | 1.7256 | | -92.9905 |
| S9 | aspheric | -2.5225 | 0.3000 | 1.53, 55.8 | 0.1466 |
| S10 | aspheric | 84.0806 | 0.5141 | | -18.8463 |
| S11 | spherical | infinite | 0.3000 | 1.52,64.2 | |
| S12 | spherical | infinite | 0.0863 | | |
| S13 | spherical | infinite | | | |

Table 9 shows high-order coefficients $A_4$, $A_6$, $A_8$, $A_{10}$, $A_{12}$, $A_{14}$, $A_{16}$, $A_{18}$ and $A_{20}$ applicable to each of the aspheric surfaces S1 to S10 of the aspheric lenses in this Embodiment.

TABLE 9

| surface number | $A_4$ | $A_6$ | $A_8$ | $A_{10}$ | $A_{12}$ |
|---|---|---|---|---|---|
| S1  | 1.3190E−02  | −7.5412E−03 | 5.2225E−02  | −1.2456E−01 | 1.6414E−01  |
| S2  | 1.5298E−01  | −3.8214E−01 | 1.0359E+00  | −2.4484E+00 | 4.7340E+00  |
| S3  | 9.4519E−01  | −3.7053E−01 | 1.3756E+00  | −4.1009E+00 | 9.5271E+00  |
| S4  | −5.2094E−02 | −1.3741E−03 | 3.1124E−01  | −6.8458E−01 | 1.5214E+00  |
| S5  | −5.7395E−02 | 5.0858E−02  | 4.9204E−01  | −1.7837E+00 | 4.4706E+00  |
| S6  | −3.2038E−02 | 1.7541E−01  | −4.8132E−01 | 2.0696E+00  | −5.2704E+00 |
| S7  | −1.3561E−03 | 2.7833E−02  | −6.7171E−03 | 8.5930E−03  | 3.4375E−02  |
| S8  | −1.2117E−02 | 4.6604E−02  | −5.2008E−02 | 7.7468E−02  | −6.8457E−02 |
| S9  | −1.6890E−01 | 2.1789E−01  | −2.2365E−01 | 1.5975E−01  | −7.5220E−02 |
| S10 | −1.9268E−01 | 2.1627E−01  | −1.9276E−01 | 1.1669E−01  | −4.7090E−02 |

| surface number | $A_{14}$ | $A_{16}$ | $A_{18}$ | $A_{20}$ |
|---|---|---|---|---|
| S1  | −7.6157E−02 | −5.2646E−02 | 7.8467E−02  | −2.7072E−02 |
| S2  | −6.5522E+00 | 5.8052E+00  | −2.9326E+00 | 6.4036E−01  |
| S3  | −1.5297E+01 | 1.5361E+01  | −8.6796E+00 | 2.1061E+00  |
| S4  | −3.1208E+00 | 4.5441E+00  | −4.1044E+00 | 1.6105E+00  |
| S5  | −6.9401E+00 | 6.0721E+00  | −2.6556E+00 | 4.0423E−01  |
| S6  | 8.4209E+00  | −8.3530E+00 | 4.6673E+00  | −1.1105E+00 |
| S7  | −8.9256E−02 | 7.7599E−02  | −3.1316E−02 | 5.0071E−03  |
| S8  | 3.8769E−02  | −1.5891E−02 | 3.9570E−03  | −4.0079E−04 |
| S9  | 2.2578E−02  | −4.0565E−03 | 3.9076E−04  | −1.5290E−05 |
| S10 | 1.2416E−02  | −2.0513E−03 | 1.9248E−04  | −7.8077E−06 |

With reference to Table 8 and Table 9, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.94. A radius of curvature of the object side surface of the second lens R3 and a radius of curvature of the image side surface of the second lens R4 satisfy: |(R3+R4)/(R3−R4)|=1.65. An axial air spacing between the second lens and the third lens T23 and an axial air spacing between the third lens and the fourth lens T34 satisfy: T34/T23=1.15. A radius of curvature of the object side surface of the third lens R5 and a radius of curvature of the image side surface of the third lens R6 satisfy: |(R5−R6)/(R5+R6)|=0.20. A radius of curvature of the object side surface of the fourth lens R7 and a radius of curvature of the image side surface of the fourth lens R8 satisfy: |(R7+R8)/(R7−R8)|=1.06.

In this embodiment, a vector height of the object side surface of the fifth lens at a maximum effective diameter SAG51 and the center thickness of the fifth lens CT5 satisfy: |SAG51/CT5|=3.56.

Figure 6A:
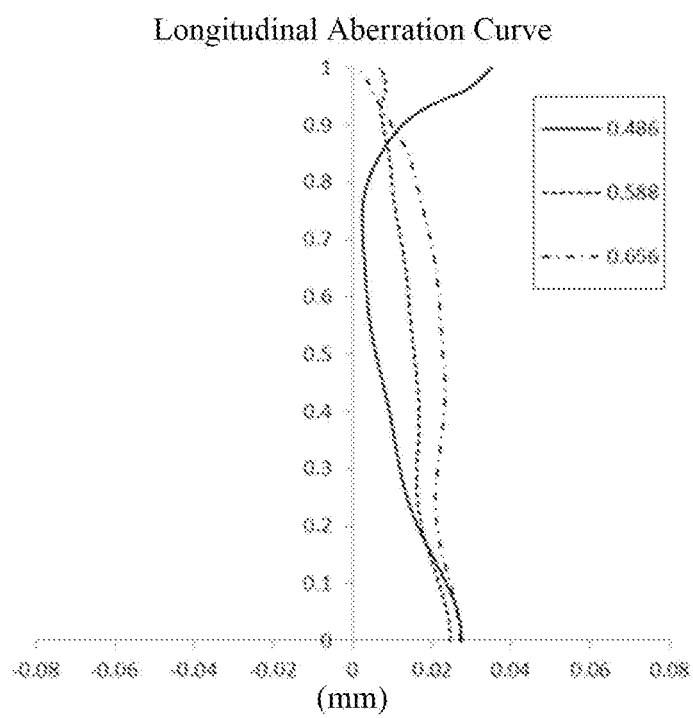
FIG. 6A illustrates a longitudinal aberration curve of the telephoto lens assembly according to Embodiment 3.
Figure 6B:
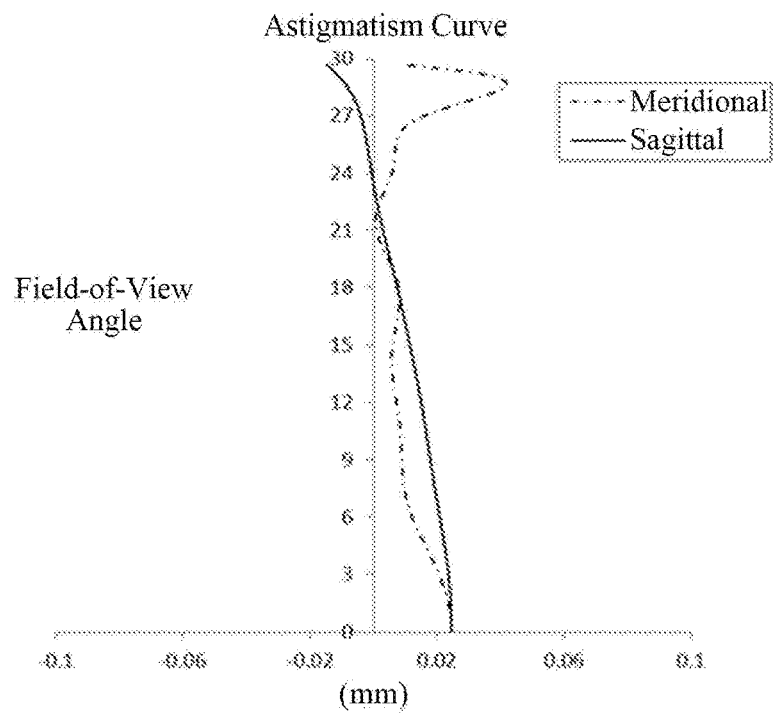
FIG. 6B illustrates an astigmatism curve of the telephoto lens assembly according to Embodiment 3.
Figure 6C:
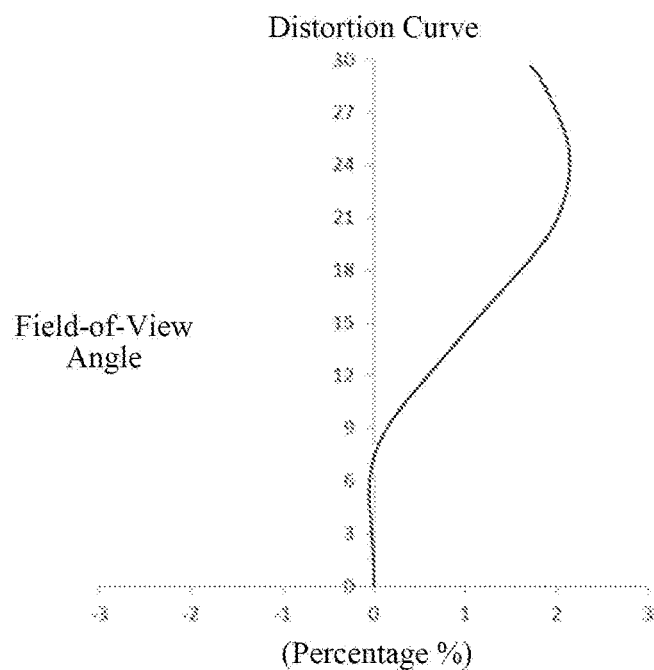
FIG. 6C illustrates a distortion curve of the telephoto lens assembly according to Embodiment 3.
Figure 6D:
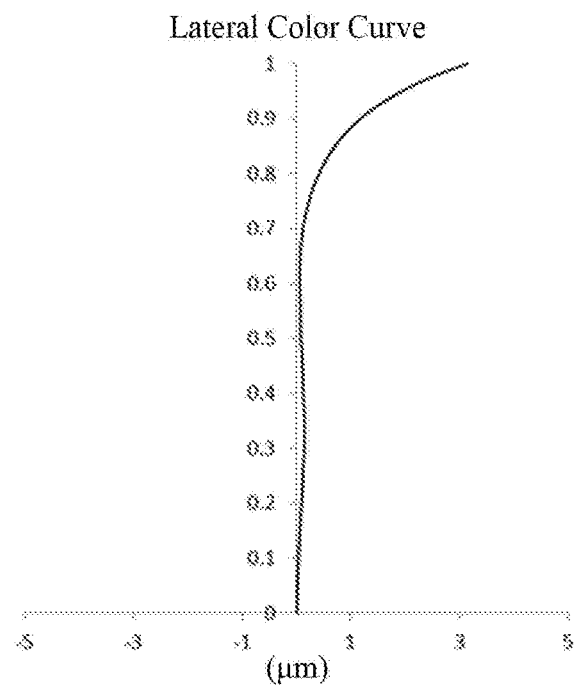
FIG. 6D illustrates a lateral color curve of the telephoto lens assembly according to Embodiment 3.

FIG. 6A illustrates a longitudinal aberration curve of the telephoto lens assembly according to Embodiment 3, representing deviations of focal points of light of different wavelengths converged after passing through an optical system. FIG. 6B illustrates an astigmatism curve of the telephoto lens assembly according to Embodiment 3, representing a curvature of a meridional image plane and a curvature of a sagittal image plane. FIG. 6C illustrates a distortion curve of the telephoto lens assembly according to Embodiment 3, representing amounts of distortion at different viewing angles. FIG. 6D illustrates a lateral color curve of the telephoto lens assembly according to Embodiment 3, representing deviations of different image heights on an image plane after light passes through the telephoto lens assembly. It can be seen from FIG. 6A to FIG. 6D that the telephoto lens assembly according to Embodiment 3 achieves good image quality while ensuring miniaturization.

Embodiment 4

Figure 7:
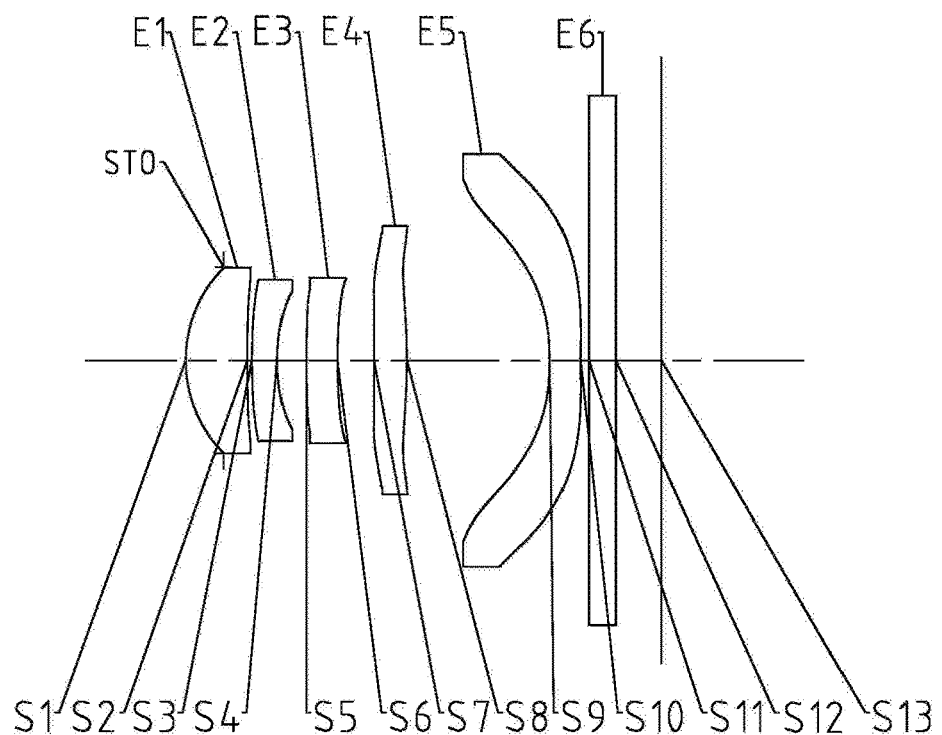
FIG. 7 is a schematic structural diagram illustrating a telephoto lens assembly according to Embodiment 4 of the present application.

A telephoto lens assembly according to Embodiment 4 of the present application is described below with reference to FIG. 7 to FIG. 8D. FIG. 7 is a schematic structural diagram illustrating a telephoto lens assembly according to Embodiment 4 of the present application. As shown in FIG. 7, the telephoto lens assembly according to Embodiment 4 includes five lenses E1-E5 respectively having an object side surface and an image side surface.

Effective focal lengths of the lenses f1 to f5, a total effective focal length f of the telephoto lens assembly, a total length of the camera lens TTL and a half maximum field-of-view angle HFOV of the telephoto lens assembly in Embodiment 4 are shown in Table 10 below.

TABLE 10

| f1 (mm) | 2.78   | f (mm)    | 5.59  |
| f2 (mm) | −4.31  | TTL (mm)  | 5.30  |
| f3 (mm) | −36.36 | HFOV (deg)| 29.87 |
| f4 (mm) | 11.79  |           |       |
| f5 (mm) | −4.75  |           |       |

With reference to Table 10, the axial distance from the object side surface of the first lens to the image plane TTL and the total effective focal length f of the telephoto lens assembly satisfy: TTL/f=0.95. An effective focal length of the first lens f1 and the total effective focal length f satisfy: f1/f=0.50. An effective focal length of the second lens f2 and the total effective focal length f satisfy: f2/f=−0.77. The effective focal length of the first lens f1, an effective focal length of the fourth lens f4 and the total effective focal length f satisfy: |f/f1|+|f/f4|=2.49. An effective focal length of the third lens f3, the effective focal length of the fourth lens f4 and the total effective focal length f satisfy: |f/f3|+|f/f4|=0.63. An effective focal length of the fifth lens f5 and the total effective focal length f satisfy: f5/f=−0.85.

Table 11 shows a surface form, a radius of curvature, a thickness, a material and a conic constant of each lens in this embodiment.

TABLE 11

| surface number | surface form | radius of curvature | thickness | material | conic constant |
|---|---|---|---|---|---|
| OBJ | spherical | infinite | infinite | | |
| STO | spherical | infinite | −0.4334 | | |
| S1 | aspheric | 1.4981 | 0.6881 | 1.53, 55.8 | −0.1915 |
| S2 | aspheric | −139.0004 | 0.0500 | | 99.0000 |
| S3 | aspheric | 9.7066 | 0.2800 | 1.66, 20.4 | 68.9205 |
| S4 | aspheric | 2.1780 | 0.3225 | | 3.9489 |
| S5 | aspheric | 10.2771 | 0.3484 | 1.54, 56.1 | 52.0915 |
| S6 | aspheric | 6.6826 | 0.4053 | | −17.5999 |
| S7 | aspheric | −49.1664 | 0.3693 | 1.66, 20.4 | 84.7464 |
| S8 | aspheric | −6.7436 | 1.5950 | | −53.3530 |
| S9 | aspheric | −3.0846 | 0.3400 | 1.53, 55.8 | −0.0010 |
| S10 | aspheric | 14.8079 | 0.0909 | | 1.8651 |
| S11 | spherical | infinite | 0.3000 | 1.52, 64.2 | |
| S12 | spherical | infinite | 0.5105 | | |
| S13 | spherical | infinite | | | |

Table 12 shows high-order coefficients $A_4$, $A_6$, $A_8$, $A_{10}$, $A_{12}$, $A_{14}$, $A_{16}$, $A_{18}$ and $A_{20}$ applicable to each of the aspheric surfaces S1 to S10 of the aspheric lenses in this Embodiment.

TABLE 12

| surface number | $A_4$ | $A_6$ | $A_8$ | $A_{10}$ | $A_{12}$ |
|---|---|---|---|---|---|
| S1 | 1.4635E−02 | −1.1744E−02 | 8.1307E−02 | −2.4197E−01 | 4.5543E−01 |
| S2 | 1.7911E−01 | −5.6535E−01 | 1.5973E+00 | −3.5918E+00 | 6.2751E+00 |
| S3 | 1.3431E−01 | −5.8751E−01 | 1.9775E+00 | −5.0882E+00 | 1.0285E+01 |
| S4 | −2.6998E−02 | −1.4992E−01 | 8.7793E−01 | −2.5003E+00 | 5.8216E+00 |
| S5 | −4.7594E−02 | −1.1130E−02 | 4.2543E−01 | −9.4501E−01 | 1.1615E+00 |
| S6 | −1.2192E−02 | 1.1403E−01 | −4.7586E−01 | 2.2650E+00 | −5.9632E+00 |
| S7 | 5.4108E−03 | 3.6344E−02 | −1.0320E−01 | 2.3202E−01 | −2.4955E−01 |
| S8 | −8.6705E−03 | 5.4391E−02 | −1.1121E−01 | 1.8213E−01 | −1.7434E−01 |
| S9 | −1.8849E−01 | 2.4203E−01 | −2.1890E−01 | 1.2776E−01 | −4.9424E−02 |
| S10 | −2.1231E−01 | 2.3891E−01 | −1.9781E−01 | 1.1025E−01 | −4.1703E−02 |

| surface number | $A_{14}$ | $A_{16}$ | $A_{18}$ | $A_{20}$ |
|---|---|---|---|---|
| S1 | −5.2270E−01 | 3.5406E−01 | −1.2500E−01 | 1.5782E−02 |
| S2 | −7.9008E+00 | 6.5136E+00 | −3.1270E+00 | 6.6149E−01 |
| S3 | −1.5025E+01 | 1.4288E+01 | −7.8523E+00 | 1.8897E+00 |
| S4 | −9.9119E+00 | 1.1212E+01 | −7.6646E+00 | 2.3979E+00 |
| S5 | 7.8297E−01 | −4.6625E+00 | 5.5690E+00 | −2.2455E+00 |
| S6 | 9.7534E+00 | −9.9029E+00 | 5.6649E+00 | −1.3820E+00 |
| S7 | 1.4184E−01 | −4.2512E−02 | 0.005036752 | 0.000139297 |
| S8 | 1.0917E−01 | −4.5440E−02 | 1.0974E−02 | −1.1215E−03 |
| S9 | 1.2839E−02 | −2.1227E−03 | 1.9842E−04 | −7.9275E−06 |
| S10 | 1.0504E−02 | −1.6789E−03 | 1.5355E−04 | −6.0977E−06 |

With reference to Table 11 and Table 12, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.92. A radius of curvature of the object side surface of the second lens R3 and a radius of curvature of the image side surface of the second lens R4 satisfy: |(R3+R4)/(R3−R4)|=1.58. An axial air spacing between the second lens and the third lens T23 and an axial air spacing between the third lens and the fourth lens T34 satisfy: T34/T23=1.26. A radius of curvature of the object side surface of the third lens R5 and a radius of curvature of the image side surface of the third lens R6 satisfy: |(R5−R6)/(R5+R6)|=0.21. A radius of curvature of the object side surface of the fourth lens R7 and a radius of curvature of the image side surface of the fourth lens R8 satisfy: |(R7+R8)/(R7−R8)|=1.32.

In this embodiment, a vector height of the object side surface of the fifth lens at a maximum effective diameter SAG51 and the center thickness of the fifth lens CT5 satisfy: |SAG51/CT5|=2.84.

Figure 8A:
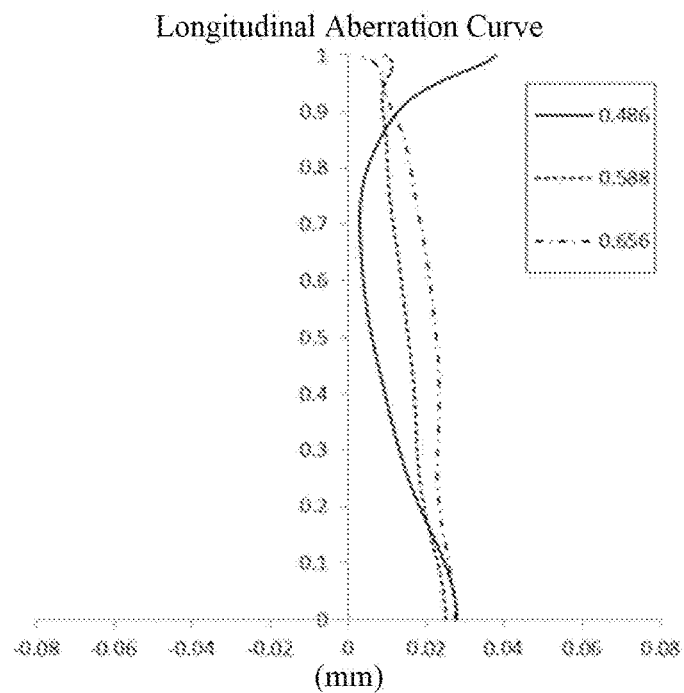
FIG. 8A illustrates a longitudinal aberration curve of the telephoto lens assembly according to Embodiment 4.
Figure 8B:
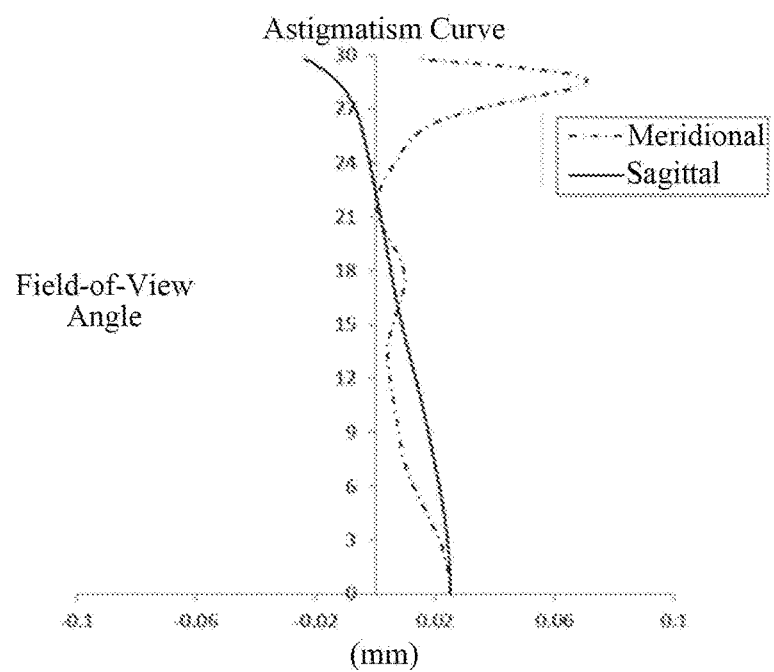
FIG. 8B illustrates an astigmatism curve of the telephoto lens assembly according to Embodiment 4.
Figure 8C:
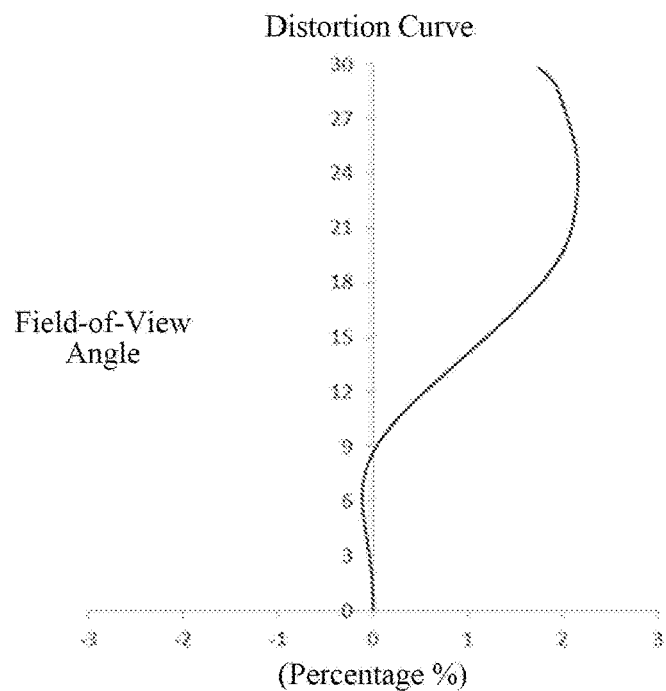
FIG. 8C illustrates a distortion curve of the telephoto lens assembly according to Embodiment 4.
Figure 8D:
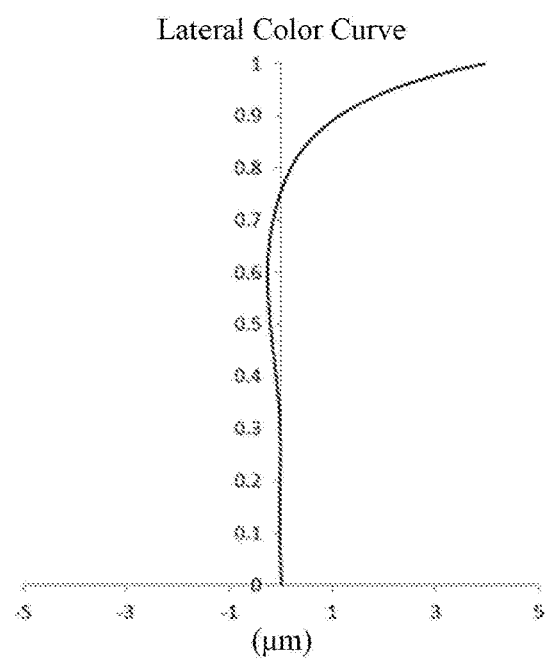
FIG. 8D illustrates a lateral color curve of the telephoto lens assembly according to Embodiment 4.

FIG. 8A illustrates a longitudinal aberration curve of the telephoto lens assembly according to Embodiment 4, representing deviations of focal points of light of different wavelengths converged after passing through an optical system. FIG. 8B illustrates an astigmatism curve of the telephoto lens assembly according to Embodiment 4, representing a curvature of a meridional image plane and a curvature of a sagittal image plane. FIG. 8C illustrates a distortion curve of the telephoto lens assembly according to Embodiment 4, representing amounts of distortion at different viewing angles. FIG. 8D illustrates a lateral color curve of the telephoto lens assembly according to Embodiment 4, representing deviations of different image heights on an image plane after light passes through the telephoto lens assembly. It can be seen from FIG. 8A to FIG. 8D that the telephoto lens assembly according to Embodiment 4 achieves good image quality while ensuring miniaturization.

Embodiment 5

Figure 9:
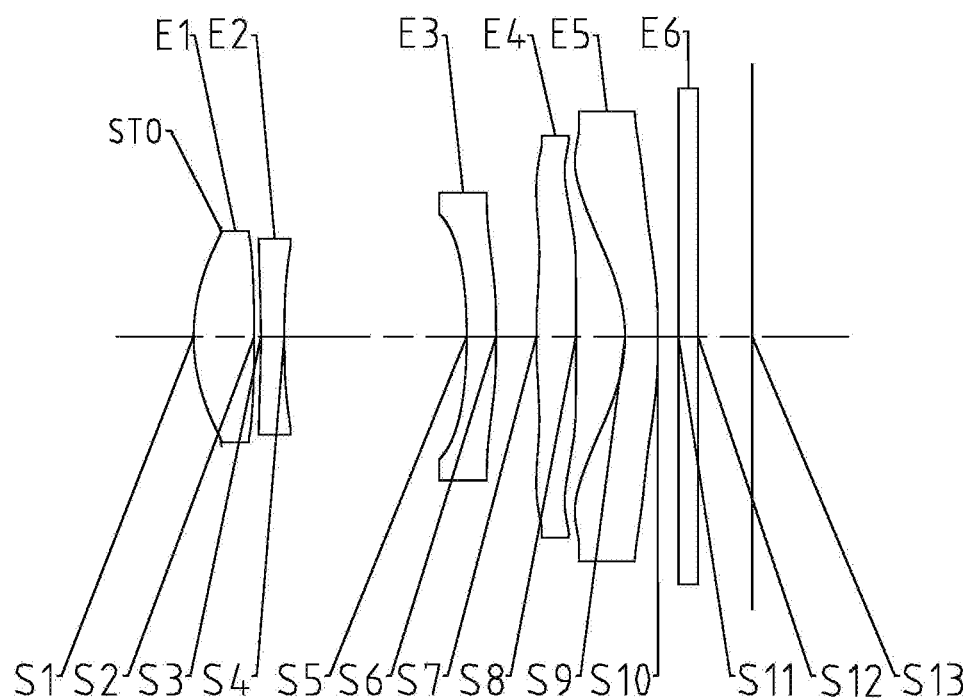
FIG. 9 is a schematic structural diagram illustrating a telephoto lens assembly according to Embodiment 5 of the present application.

A telephoto lens assembly according to Embodiment 5 of the present application is described below with reference to FIG. 9 to FIG. 10D. FIG. 9 is a schematic structural diagram illustrating a telephoto lens assembly according to Embodiment 5 of the present application. As shown in FIG. 9, the telephoto lens assembly according to Embodiment 5 includes five lenses E1-E5 respectively having an object side surface and an image side surface.

Effective focal lengths of the lenses f1 to f5, a total effective focal length f of the telephoto lens assembly, a total length of the camera lens TTL and a half maximum field-of-view angle HFOV of the telephoto lens assembly in Embodiment 5 are shown in Table 13 below.

TABLE 13

| f1 (mm) | 3.44 | f (mm) | 6.41 |
|---|---|---|---|
| f2 (mm) | −8.55 | TTL (mm) | 5.988 |
| f3 (mm) | −25.19 | HFOV (deg) | 24.3 |
| f4 (mm) | 8.19 | | |
| f5 (mm) | −3.35 | | |

With reference to Table 13, the axial distance from the object side surface of the first lens to the image plane TTL and the total effective focal length f of the telephoto lens assembly satisfy: TTL/f=0.93. An effective focal length of the first lens f1 and the total effective focal length f satisfy: f1/f=0.54. An effective focal length of the second lens f2 and the total effective focal length f satisfy: f2/f=−1.33. The effective focal length of the first lens f1, an effective focal length of the fourth lens f4 and the total effective focal length f satisfy: |f/f1|+|f/f4|=2.65. An effective focal length of the third lens f3, the effective focal length of the fourth lens f4 and the total effective focal length f satisfy: |f/f3|+|f/f4|=1.04. An effective focal length of the fifth lens f5 and the total effective focal length f satisfy: f5/f=−0.52.

Table 14 shows a surface form, a radius of curvature, a thickness, a material and a conic constant of each lens in this embodiment.

TABLE 14

| surface number | surface form | radius of curvature | thickness | material | conic constant |
|---|---|---|---|---|---|
| OBJ | spherical | infinite | infinite | | |
| STO | spherical | infinite | −0.3000 | | |
| S1 | aspheric | 2.0756 | 0.6493 | 1.54, 56.1 | 0.6639 |
| S2 | aspheric | −16.9769 | 0.0717 | | −21.7573 |
| S3 | aspheric | −11.8571 | 0.2500 | 1.66, 20.4 | −99.0000 |

TABLE 14-continued

| surface number | surface form | radius of curvature | thickness | material | conic constant |
|---|---|---|---|---|---|
| S4 | aspheric | 10.8882 | 1.9530 | | 52.8537 |
| S5 | aspheric | −7.2168 | 0.3140 | 1.54, 56.1 | 6.8744 |
| S6 | aspheric | −15.4796 | 0.4319 | | 48.5372 |
| S7 | aspheric | 7.6022 | 0.4247 | 1.66, 20.4 | −56.5712 |
| S8 | aspheric | −18.3672 | 0.5255 | | 21.5743 |
| S9 | aspheric | −1.6129 | 0.3500 | 1.53, 55.8 | −3.7088 |
| S10 | aspheric | −17.2863 | 0.2204 | | 39.3089 |
| S11 | spherical | infinite | 0.2100 | 1.52, 64.2 | |
| S12 | spherical | infinite | 0.5797 | | |
| S13 | spherical | infinite | | | |

Table 15 shows high-order coefficients $A_4$, $A_6$, $A_8$, $A_{10}$, $A_{12}$, $A_{14}$, $A_{16}$, $A_{18}$ and $A_{20}$ applicable to each of the aspheric surfaces S1 to S10 of the aspheric lenses in this Embodiment.

TABLE 15

| surface number | $A_4$ | $A_6$ | $A_8$ | $A_{10}$ | $A_{12}$ |
|---|---|---|---|---|---|
| S1 | −1.4287E−02 | −1.3240E−02 | 2.9704E−02 | −7.4354E−02 | 1.0265E−01 |
| S2 | −3.4586E−02 | 1.6787E−01 | −4.6279E−01 | 6.8592E−01 | −4.8152E−01 |
| S3 | −1.7781E−02 | 2.2527E−01 | −7.4222E−01 | 1.4730E+00 | −1.8359E+00 |
| S4 | 5.9568E−03 | 1.4562E−01 | −6.4369E−01 | 1.7005E+00 | −2.9212E+00 |
| S5 | −5.8915E−02 | −4.8745E−02 | 3.2151E−01 | −7.7081E−01 | 1.1167E+00 |
| S6 | −9.1014E−02 | 9.0709E−02 | −1.0639E−01 | 1.5344E−01 | −1.2191E−01 |
| S7 | 4.4840E−02 | −1.3823E−01 | 8.4290E−02 | −7.0204E−03 | −1.3676E−02 |
| S8 | 1.4195E−01 | −2.5732E−01 | 1.9844E−01 | −9.2144E−02 | 2.8489E−02 |
| S9 | −6.2628E−03 | −4.3319E−02 | 7.9200E−02 | −5.1488E−02 | 1.6731E−02 |
| S10 | −1.0301E−01 | 7.6913E−02 | −1.4736E−02 | −6.2377E−03 | 4.2601E−03 |

| surface number | $A_{14}$ | $A_{16}$ | $A_{18}$ | $A_{20}$ |
|---|---|---|---|---|
| S1 | −9.8879E−02 | 6.3251E−02 | −2.4878E−02 | 4.3250E−03 |
| S2 | −8.7247E−02 | 4.1491E−01 | −2.7926E−01 | 6.4072E−02 |
| S3 | 1.3655E+00 | −5.1156E−01 | 3.5431E−02 | 2.2076E−02 |
| S4 | 3.2668E+00 | −2.2911E+00 | 9.1410E−01 | −1.5810E−01 |
| S5 | −1.0140E+00 | 5.5503E−01 | −1.6758E−01 | 2.1425E−02 |
| S6 | 4.8413E−02 | −8.1184E−03 | −9.6358E−05 | 1.3558E−04 |
| S7 | 7.2489E−03 | −1.7195E−03 | 2.0811E−04 | −1.0486E−05 |
| S8 | −5.8697E−03 | 7.6623E−04 | −5.6119E−05 | 1.6685E−06 |
| S9 | −2.6345E−03 | 1.0563E−04 | 2.0193E−05 | −1.9401E−06 |
| S10 | −1.1055E−03 | 1.5453E−04 | −1.1480E−05 | 3.5637E−07 |

With reference to Table 14 and Table 15, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.85. A radius of curvature of the object side surface of the second lens R3 and a radius of curvature of the image side surface of the second lens R4 satisfy: |(R3+R4)/(R3−R4)|=0.04. An axial air spacing between the second lens and the third lens T23 and an axial air spacing between the third lens and the fourth lens T34 satisfy: T34/T23=0.22. A radius of curvature of the object side surface of the third lens R5 and a radius of curvature of the image side surface of the third lens R6 satisfy: |(R5−R6)/(R5+R6)|=0.36. A radius of curvature of the object side surface of the fourth lens R7 and a radius of curvature of the image side surface of the fourth lens R8 satisfy: |(R7+R8)/(R7−R8)|=0.41.

In this embodiment, a vector height of the object side surface of the fifth lens at a maximum effective diameter SAG51 and the center thickness of the fifth lens CT5 satisfy: |SAG51/CT5|=1.41.

Figure 10A:
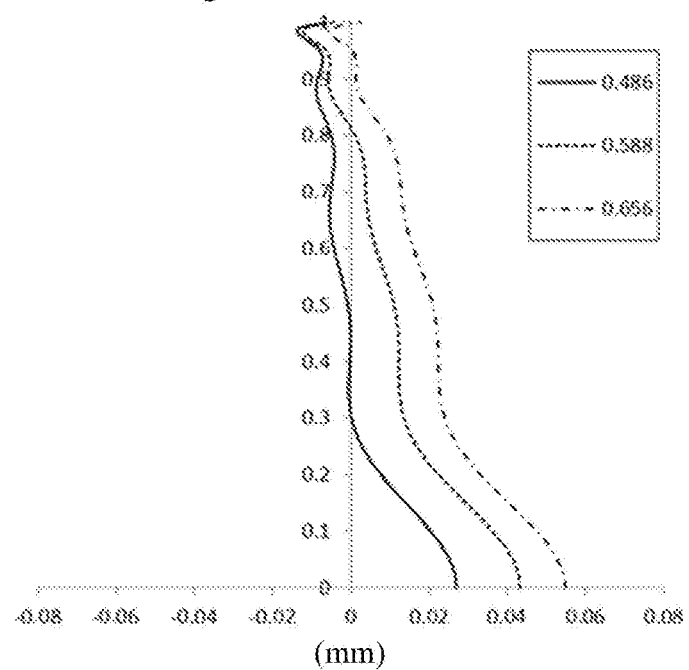
FIG. 10A illustrates a longitudinal aberration curve of the telephoto lens assembly according to Embodiment 5.
Figure 10B:
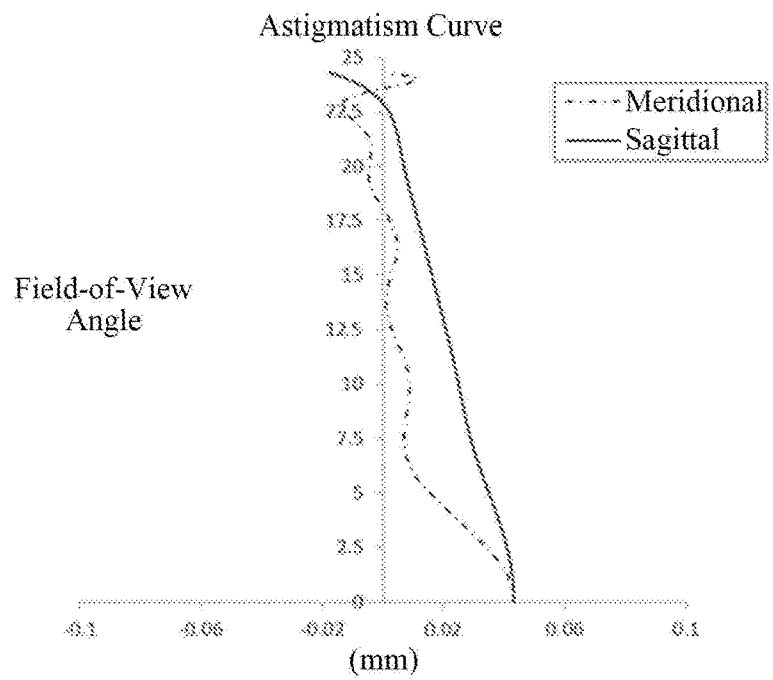
FIG. 10B illustrates an astigmatism curve of the telephoto lens assembly according to Embodiment 5.
Figure 10C:
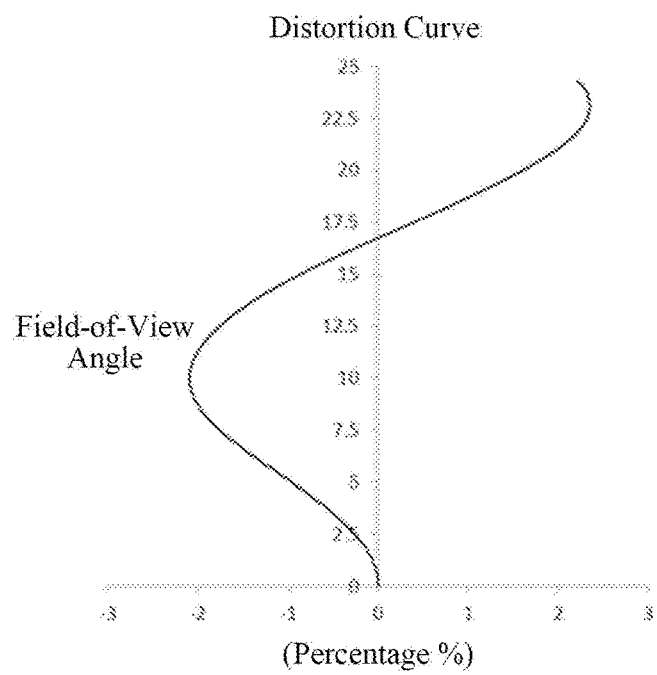
FIG. 10C illustrates a distortion curve of the telephoto lens assembly according to Embodiment 5.
Figure 10D:
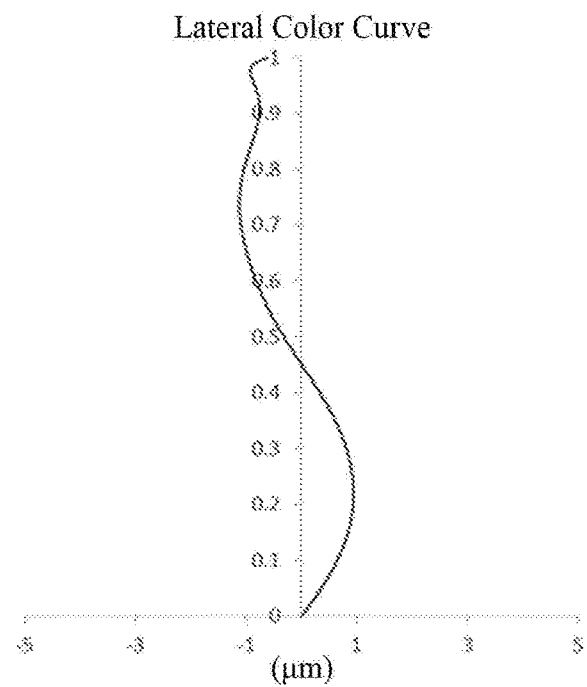
FIG. 10D illustrates a lateral color curve of the telephoto lens assembly according to Embodiment 5.

FIG. 10A illustrates a longitudinal aberration curve of the telephoto lens assembly according to Embodiment 5, representing deviations of focal points of light of different wavelengths converged after passing through an optical system. FIG. 10B illustrates an astigmatism curve of the telephoto lens assembly according to Embodiment 5, representing a curvature of a meridional image plane and a curvature of a sagittal image plane. FIG. 10C illustrates a distortion curve of the telephoto lens assembly according to Embodiment 5, representing amounts of distortion at different viewing angles. FIG. 10D illustrates a lateral color curve of the telephoto lens assembly according to Embodiment 5, representing deviations of different image heights on an image plane after light passes through the telephoto lens assembly. It can be seen from FIG. 10A to FIG. 10D that the telephoto lens assembly according to Embodiment 5 achieves good image quality while ensuring miniaturization.

Embodiment 6

Figure 11:
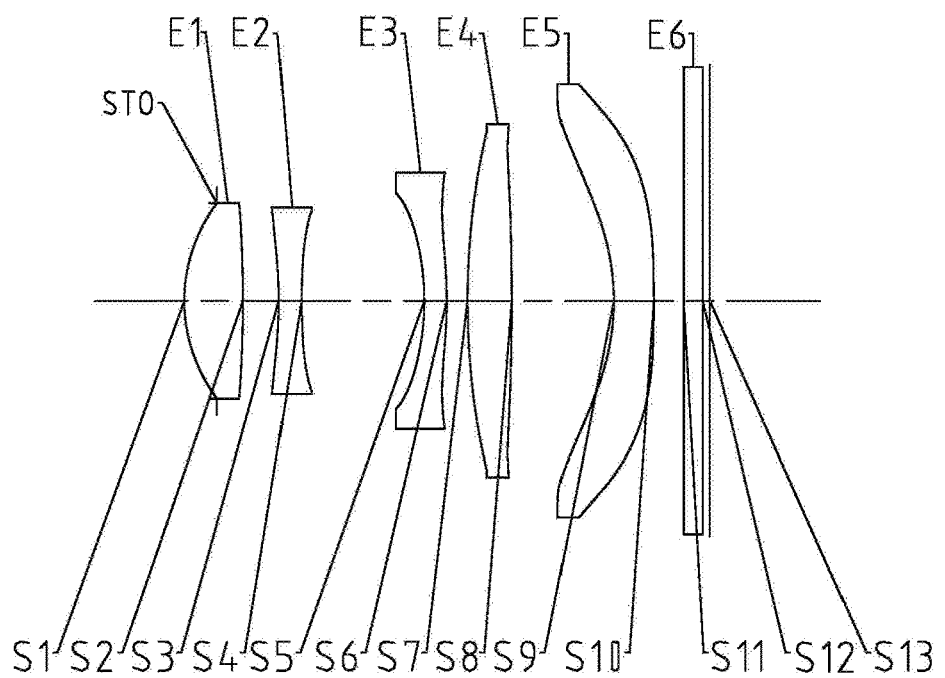
FIG. 11 is a schematic structural diagram illustrating a telephoto lens assembly according to Embodiment 6 of the present application.

A telephoto lens assembly according to Embodiment 6 of the present application is described below with reference to FIG. 11 to FIG. 12D. FIG. 11 is a schematic structural diagram illustrating a telephoto lens assembly according to Embodiment 6 of the present application. As shown in FIG. 11, the telephoto lens assembly according to Embodiment 6 includes five lenses E1-E5 respectively having an object side surface and an image side surface.

Effective focal lengths of the lenses f1 to f5, a total effective focal length f of the telephoto lens assembly, a total length of the camera lens TTL and a half maximum field-of-view angle HFOV of the telephoto lens assembly in Embodiment 6 are shown in Table 16 below.

TABLE 16

| f1 (mm) | 2.99 | f (mm) | 6.25 |
|---|---|---|---|
| f2 (mm) | −4.80 | TTL (mm) | 5.858 |
| f3 (mm) | −13.34 | HFOV (deg) | 22.5 |
| f4 (mm) | 10.60 | | |
| f5 (mm) | −5.74 | | |

With reference to Table 16, the axial distance from the object side surface of the first lens to the image plane TTL and the total effective focal length f of the telephoto lens assembly satisfy: TTL/f=0.94. An effective focal length of the first lens f1 and the total effective focal length f satisfy: f1/f=0.48. An effective focal length of the second lens f2 and the total effective focal length f satisfy: f2/f=−0.77. The effective focal length of the first lens f1, an effective focal length of the fourth lens f4 and the total effective focal length f satisfy: |f/f1|+|f/f4|=2.68. An effective focal length of the third lens f3, the effective focal length of the fourth lens f4 and the total effective focal length f satisfy: |f/f3|+|f/f4|=1.06. An effective focal length of the fifth lens f5 and the total effective focal length f satisfy: f5/f=−0.92.

Table 17 shows a surface form, a radius of curvature, a thickness, a material and a conic constant of each lens in this embodiment.

TABLE 17

| surface number | surface form | radius of curvature | thickness | material | conic constant |
|---|---|---|---|---|---|
| OBJ | spherical | infinite | infinite | | |
| STO | spherical | infinite | −0.3631 | | |
| S1 | aspheric | 1.7931 | 0.6556 | 1.54, 56.1 | −1.1740 |
| S2 | aspheric | −15.1351 | 0.3980 | | 1.2071 |
| S3 | aspheric | −5.3479 | 0.2500 | 1.66, 20.4 | −25.1690 |
| S4 | aspheric | 7.9543 | 1.3682 | | 49.7591 |
| S5 | aspheric | −2.8995 | 0.2500 | 1.54, 56.1 | 1.9793 |
| S6 | aspheric | −4.9749 | 0.2320 | | −36.3203 |
| S7 | aspheric | 8.9721 | 0.4947 | 1.66, 20.4 | 12.9660 |
| S8 | aspheric | −31.2288 | 1.1317 | | 50.0000 |
| S9 | aspheric | −2.6142 | 0.4466 | 1.53, 55.8 | −1.9610 |
| S10 | aspheric | −18.6384 | 0.3332 | | −90.0000 |
| S11 | spherical | infinite | 0.2100 | 1.52, 64.2 | |
| S12 | spherical | infinite | 0.0800 | | |
| S13 | spherical | infinite | | | |

Table 18 shows high-order coefficients $A_4$, $A_6$, $A_8$, $A_{10}$, $A_{12}$, $A_{14}$, $A_{16}$, $A_{18}$ and $A_{20}$ applicable to each of the aspheric surfaces S1 to S10 of the aspheric lenses in this Embodiment.

TABLE 18

| surface number | $A_4$ | $A_6$ | $A_8$ | $A_{10}$ | $A_{12}$ |
|---|---|---|---|---|---|
| S1 | 2.3514E−02 | 5.7627E−03 | −1.4059E−02 | 3.5504E−02 | −4.8318E−02 |
| S2 | −3.8251E−04 | −1.6315E−04 | 1.3214E−02 | −3.1442E−02 | 2.8708E−02 |
| S3 | −1.3121E−02 | 4.3221E−02 | −1.4804E−02 | −9.8421E−02 | 2.6227E−01 |
| S4 | 6.8308E−03 | 2.9450E−02 | −1.7466E−02 | 2.9591E−02 | −2.1063E−01 |
| S5 | 1.5005E−02 | −1.7186E−02 | −8.0271E−02 | 4.2765E−01 | −7.2747E−01 |
| S6 | 1.8405E−02 | 4.7555E−03 | −1.1668E−01 | 4.4268E−01 | −6.6418E−01 |
| S7 | 1.3558E−02 | −3.1230E−02 | 2.8365E−02 | −1.1653E−02 | 5.5458E−05 |
| S8 | 4.6322E−03 | −1.2526E−02 | 1.9559E−02 | −2.3800E−02 | 1.8476E−02 |
| S9 | −4.6784E−03 | −1.0080E−02 | 2.4290E−02 | −2.0934E−02 | 1.0388E−02 |
| S10 | −3.4661E−02 | −5.7516E−03 | 1.5810E−02 | −1.2372E−02 | 5.2294E−03 |

| surface number | $A_{14}$ | $A_{16}$ | $A_{18}$ | $A_{20}$ |
|---|---|---|---|---|
| S1 | 3.2164E−02 | −6.5424E−03 | −3.2528E−03 | 1.1676E−03 |
| S2 | −1.0479E−02 | −8.4858E−04 | −2.7094E−04 | 6.8433E−04 |
| S3 | −3.4333E−01 | 2.6658E−01 | −1.1923E−01 | 2.4728E−02 |
| S4 | 5.2487E−01 | −6.1595E−01 | 3.5303E−01 | −7.9543E−02 |
| S5 | 5.6970E−01 | −1.9548E−01 | 5.5837E−03 | 8.8153E−03 |
| S6 | 5.2683E−01 | −2.3633E−01 | 5.6913E−02 | −5.7277E−03 |
| S7 | 1.8702E−03 | −7.2643E−04 | 1.1553E−04 | −6.8005E−06 |
| S8 | −8.6660E−03 | 2.3963E−03 | −3.5825E−04 | 2.2225E−05 |
| S9 | −3.1280E−03 | 5.5993E−04 | −5.4497E−05 | 2.2124E−06 |
| S10 | −1.2761E−03 | 1.7687E−04 | −1.2708E−05 | 3.5899E−07 |

With reference to Table 17 and Table 18, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.82. A radius of curvature of the object side surface of the second lens R3 and a radius of curvature of the image side surface of the second lens R4 satisfy: |(R3+R4)/(R3−R4)|=0.20. An axial air spacing between the second lens and the third lens T23 and an axial air spacing between the third lens and the fourth lens T34 satisfy: T34/T23=0.17. A radius of curvature of the object side surface of the third lens R5 and a radius of curvature of the image side surface of the third lens R6 satisfy: |(R5−R6)/(R5+R6)|=0.26. A radius of curvature of the object side surface of the fourth lens R7 and a radius of curvature of the image side surface of the fourth lens R8 satisfy: |(R7+R8)/(R7−R8)|=0.55.

In this embodiment, a vector height of the object side surface of the fifth lens at a maximum effective diameter SAG51 and the center thickness of the fifth lens CT5 satisfy: |SAG51/CT5|=1.40.

Figure 12A:
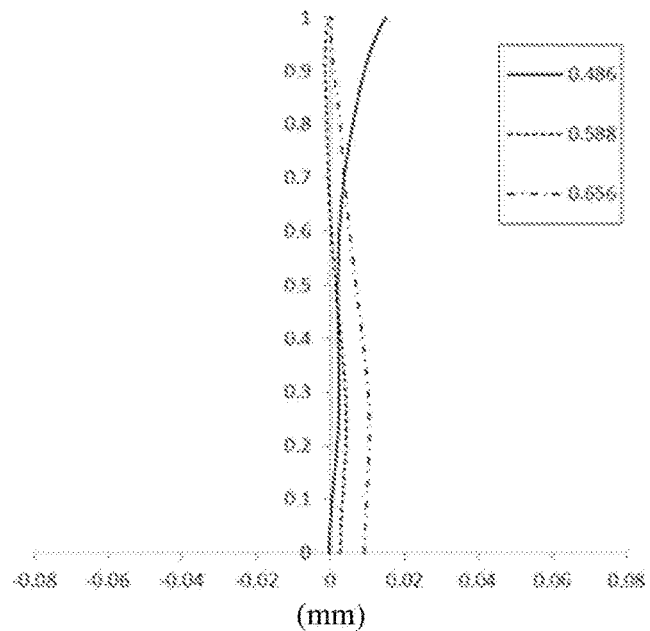
FIG. 12A illustrates a longitudinal aberration curve of the telephoto lens assembly according to Embodiment 6.
Figure 12B:
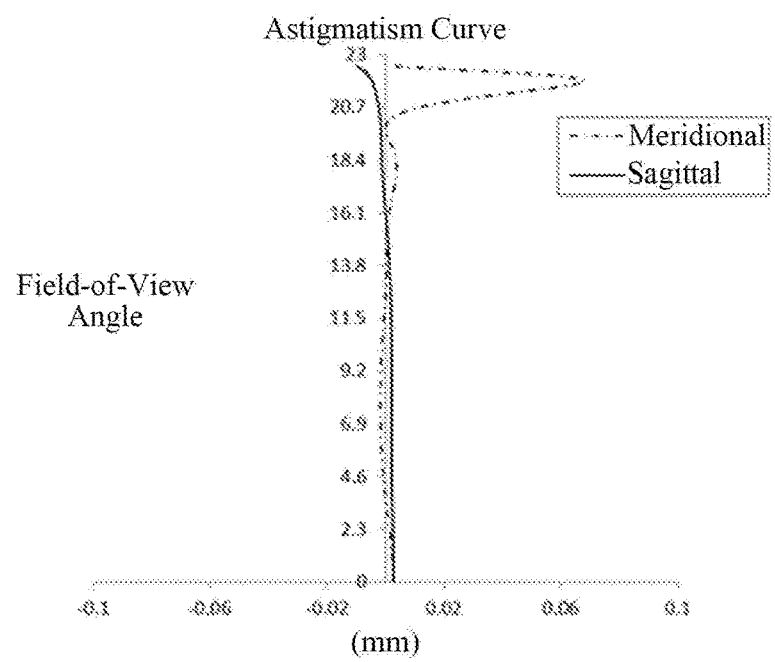
FIG. 12B illustrates an astigmatism curve of the telephoto lens assembly according to Embodiment 6.
Figure 12C:
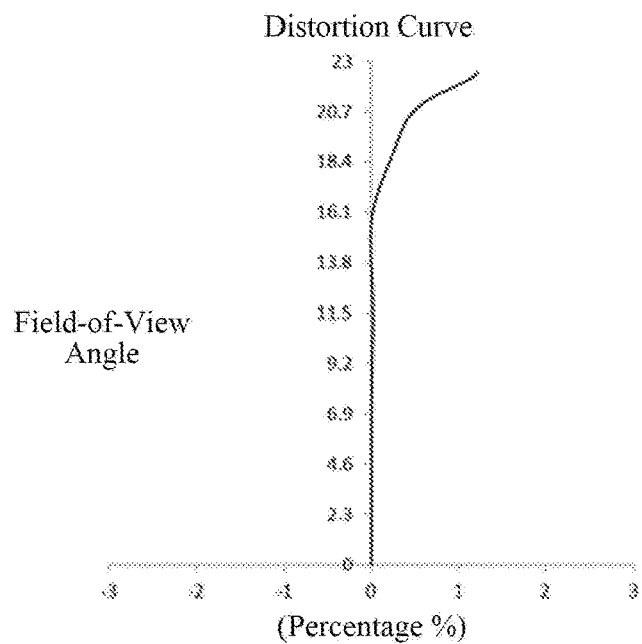
FIG. 12C illustrates a distortion curve of the telephoto lens assembly according to Embodiment 6.
Figure 12D:
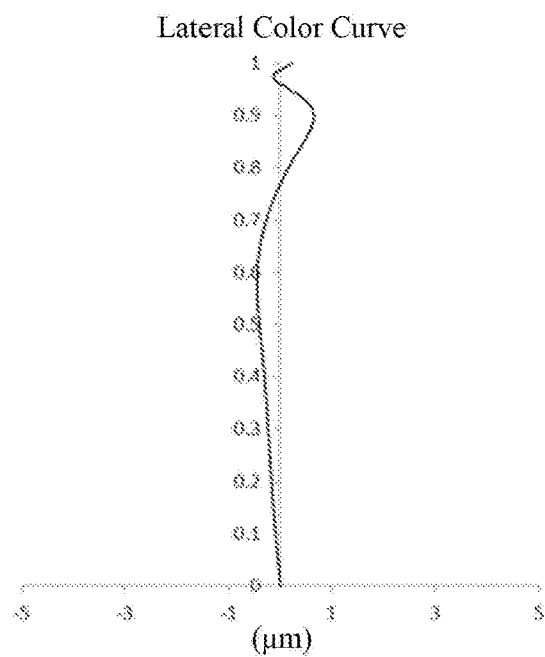
FIG. 12D illustrates a lateral color curve of the telephoto lens assembly according to Embodiment 6.

FIG. 12A illustrates a longitudinal aberration curve of the telephoto lens assembly according to Embodiment 6, representing deviations of focal points of light of different wavelengths converged after passing through an optical system. FIG. 12B illustrates an astigmatism curve of the telephoto lens assembly according to Embodiment 6, representing a curvature of a meridional image plane and a curvature of a sagittal image plane. FIG. 12C illustrates a distortion curve of the telephoto lens assembly according to Embodiment 6, representing amounts of distortion at different viewing angles. FIG. 12D illustrates a lateral color curve of the telephoto lens assembly according to Embodiment 6, representing deviations of different image heights on an image plane after light passes through the telephoto lens assembly. It can be seen from FIG. 12A to FIG. 12D that the telephoto lens assembly according to Embodiment 6 achieves good image quality while ensuring miniaturization.

Embodiment 7

Figure 13:
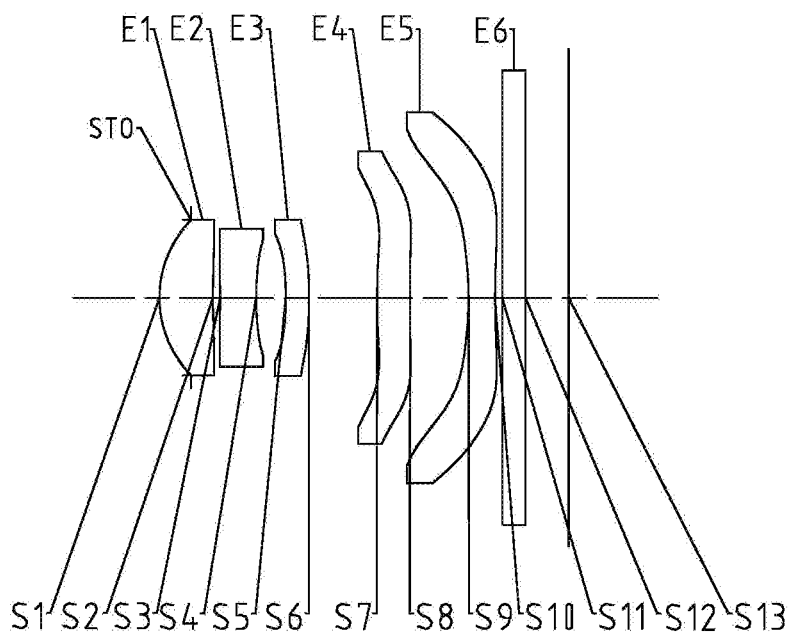
FIG. 13 is a schematic structural diagram illustrating a telephoto lens assembly according to Embodiment 7 of the present application.

A telephoto lens assembly according to Embodiment 7 of the present application is described below with reference to FIG. 13 to FIG. 14D. FIG. 13 is a schematic structural diagram illustrating a telephoto lens assembly according to Embodiment 7 of the present application. As shown in FIG. 13, the telephoto lens assembly according to Embodiment 7 includes five lenses E1-E5 respectively having an object side surface and an image side surface.

Effective focal lengths of the lenses f1 to f5, a total effective focal length f of the telephoto lens assembly, a total length of the camera lens TTL and a half maximum field-of-view angle HFOV of the telephoto lens assembly in Embodiment 7 are shown in Table 19 below.

TABLE 19

| f1 (mm) | 2.94 | f (mm) | 5.47 |
|---|---|---|---|
| f2 (mm) | −5.80 | TTL (mm) | 5.308 |
| f3 (mm) | −21.58 | HFOV (deg) | 30.4 |
| f4 (mm) | 14.04 | | |
| f5 (mm) | −5.26 | | |

With reference to Table 19, the axial distance from the object side surface of the first lens to the image plane TTL and the total effective focal length f of the telephoto lens assembly satisfy: TTL/f=0.97. An effective focal length of the first lens f1 and the total effective focal length f satisfy: f1/f=0.54. An effective focal length of the second lens f2 and the total effective focal length f satisfy: f2/f=−1.06. The effective focal length of the first lens f1, an effective focal length of the fourth lens f4 and the total effective focal length f satisfy: |f/f1|+|f/f4|=2.25. An effective focal length of the third lens f3, the effective focal length of the fourth lens f4 and the total effective focal length f satisfy: |f/f3|+|f/f4|=0.64. An effective focal length of the fifth lens f5 and the total effective focal length f satisfy: f5/f=−0.96.

Table 20 shows a surface form, a radius of curvature, a thickness, a material and a conic constant of each lens in this embodiment.

TABLE 20

| surface number | surface form | radius of curvature | thickness | material | conic constant |
|---|---|---|---|---|---|
| OBJ | spherical | infinite | infinite | | |
| STO | spherical | infinite | −0.4081 | | |
| S1 | aspheric | 1.4419 | 0.6938 | 1.54, 56.1 | −0.7910 |
| S2 | aspheric | 12.2102 | 0.0919 | | −56.3891 |
| S3 | aspheric | −118.9937 | 0.4671 | 1.66, 20.4 | 99.0000 |
| S4 | aspheric | 3.9645 | 0.3832 | | 14.6316 |
| S5 | aspheric | −5.3778 | 0.3000 | 1.54, 56.1 | 30.4184 |
| S6 | aspheric | −10.1188 | 0.8832 | | −98.1830 |
| S7 | aspheric | 8.1052 | 0.4247 | 1.66, 20.4 | −99.0000 |
| S8 | aspheric | 62.9589 | 0.7621 | | 99.0000 |
| S9 | aspheric | −4.1598 | 0.3400 | 1.53, 55.8 | 1.1238 |
| S10 | aspheric | 8.9023 | 0.0946 | | −87.3681 |
| S11 | spherical | infinite | 0.3000 | 1.52, 64.2 | |
| S12 | spherical | infinite | 0.5594 | | |
| S13 | spherical | infinite | | | |

Table 21 shows high-order coefficients $A_4$, $A_6$, $A_8$, $A_{10}$, $A_{12}$, $A_{14}$, $A_{16}$, $A_{18}$ and $A_{20}$ applicable to each of the aspheric surfaces S1 to S10 of the aspheric lenses in this Embodiment.

TABLE 21

| surface number | $A_4$ | $A_6$ | $A_8$ | $A_{10}$ | $A_{12}$ |
|---|---|---|---|---|---|
| S1 | 3.5667E−02 | −7.1267E−03 | 1.0421E−01 | −3.4511E−01 | 7.2338E−01 |
| S2 | −3.9772E−02 | 6.6538E−02 | −1.7119E−01 | 6.6295E−01 | −1.8564E+00 |
| S3 | −3.5430E−02 | 3.6815E−02 | 2.9831E−01 | −1.2797E+00 | 2.9474E+00 |
| S4 | −3.5487E−02 | 1.9389E−01 | −8.2921E−01 | 3.2275E+00 | −7.7418E+00 |
| S5 | −1.7290E−01 | 4.8059E−02 | 1.3466E−01 | −3.9242E−01 | 9.8162E−01 |
| S6 | −1.4636E−01 | 3.2602E−02 | 2.5838E−01 | −7.8846E−01 | 1.5223E+00 |
| S7 | 3.6147E−02 | −1.0645E−01 | 3.6121E−02 | 2.7554E−02 | −4.3868E−02 |
| S8 | 7.9114E−02 | −1.1132E−01 | 2.1290E−02 | 2.9184E−02 | −2.6901E−02 |
| S9 | 3.8777E−02 | 1.4323E−02 | −7.1684E−02 | 4.9947E−02 | −1.7242E−02 |
| S10 | −3.1262E−02 | 3.6458E−02 | −4.5704E−02 | 2.2408E−02 | −5.7277E−03 |

TABLE 21-continued

| surface number | $A_{14}$ | $A_{16}$ | $A_{18}$ | $A_{20}$ |
|---|---|---|---|---|
| S1 | −9.2824E−01 | 6.9193E−01 | −2.6488E−01 | 3.4269E−02 |
| S2 | 3.1400E+00 | −3.1869E+00 | 1.7610E+00 | −4.0828E−01 |
| S3 | −4.2993E+00 | 3.9065E+00 | −2.0440E+00 | 4.7515E−01 |
| S4 | 1.1194E+01 | −9.2278E+00 | 3.9217E+00 | −6.6290E−01 |
| S5 | −1.3361E+00 | 8.8481E−01 | −2.7730E−01 | 3.3340E−02 |
| S6 | −1.7421E+00 | 1.1529E+00 | −4.1262E−01 | 6.1697E−02 |
| S7 | 2.6375E−02 | −8.1048E−03 | 1.2426E−03 | −7.5190E−05 |
| S8 | 1.0468E−02 | −2.0533E−03 | 1.8743E−04 | −5.5609E−06 |
| S9 | 3.4976E−03 | −4.2236E−04 | 2.7954E−05 | −7.7690E−07 |
| S10 | 8.3467E−04 | −6.9743E−05 | 3.1176E−06 | −5.7920E−08 |

With reference to Table 20 and Table 21, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.99. A radius of curvature of the object side surface of the second lens R3 and a radius of curvature of the image side surface of the second lens R4 satisfy: |(R3+R4)/(R3−R4)|=0.94. An axial air spacing between the second lens and the third lens T23 and an axial air spacing between the third lens and the fourth lens T34 satisfy: T34/T23=2.30. A radius of curvature of the object side surface of the third lens R5 and a radius of curvature of the image side surface of the third lens R6 satisfy: |(R5−R6)/(R5+R6)|=0.31. A radius of curvature of the object side surface of the fourth lens R7 and a radius of curvature of the image side surface of the fourth lens R8 satisfy: |(R7+R8)/(R7−R8)|=1.30.

In this embodiment, a vector height of the object side surface of the fifth lens at a maximum effective diameter SAG51 and the center thickness of the fifth lens CT5 satisfy: |SAG51/CT5|=2.36.

Figure 14A:
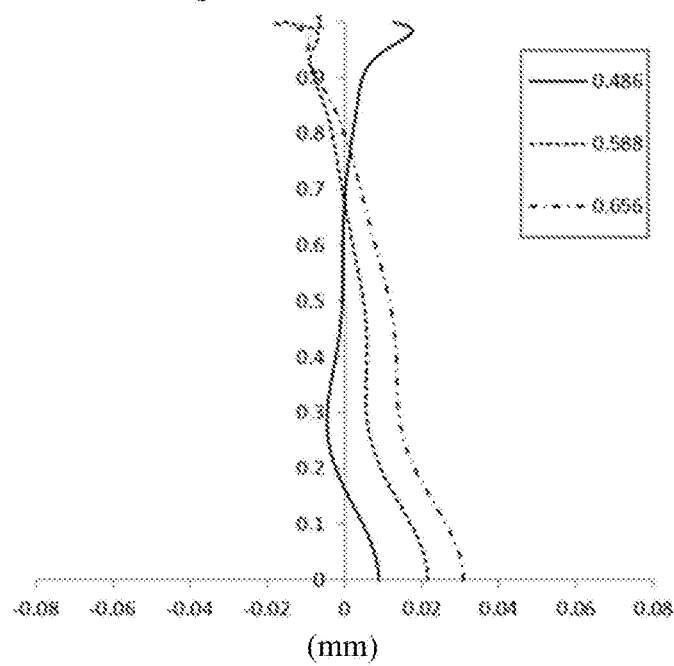
FIG. 14A illustrates a longitudinal aberration curve of the telephoto lens assembly according to Embodiment 7.
Figure 14B:
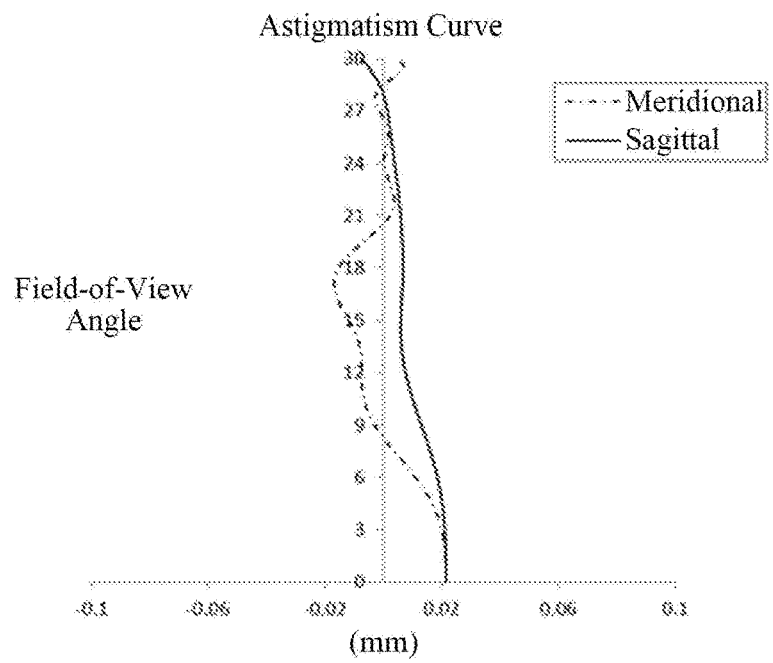
FIG. 14B illustrates an astigmatism curve of the telephoto lens assembly according to Embodiment 7.
Figure 14C:
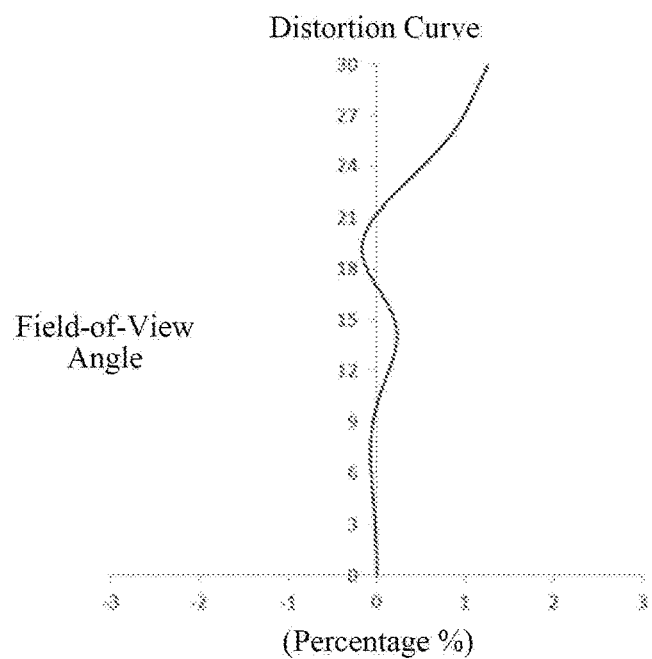
FIG. 14C illustrates a distortion curve of the telephoto lens assembly according to Embodiment 7.
Figure 14D:
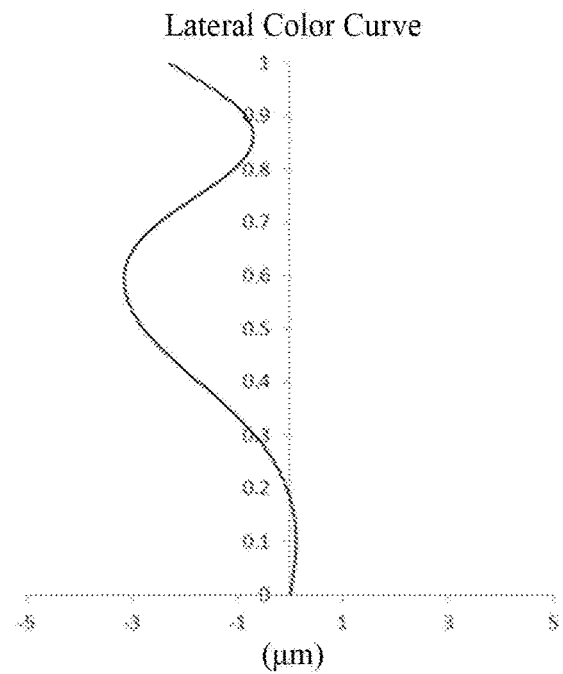
FIG. 14D illustrates a lateral color curve of the telephoto lens assembly according to Embodiment 7.

FIG. 14A illustrates a longitudinal aberration curve of the telephoto lens assembly according to Embodiment 7, representing deviations of focal points of light of different wavelengths converged after passing through an optical system. FIG. 14B illustrates an astigmatism curve of the telephoto lens assembly according to Embodiment 7, representing a curvature of a meridional image plane and a curvature of a sagittal image plane. FIG. 14C illustrates a distortion curve of the telephoto lens assembly according to Embodiment 7, representing amounts of distortion at different viewing angles. FIG. 14D illustrates a lateral color curve of the telephoto lens assembly according to Embodiment 7, representing deviations of different image heights on an image plane after light passes through the telephoto lens assembly. It can be seen from FIG. 14A to FIG. 14D that the telephoto lens assembly according to Embodiment 7 achieves good image quality while ensuring miniaturization.

Embodiment 8

Figure 15:
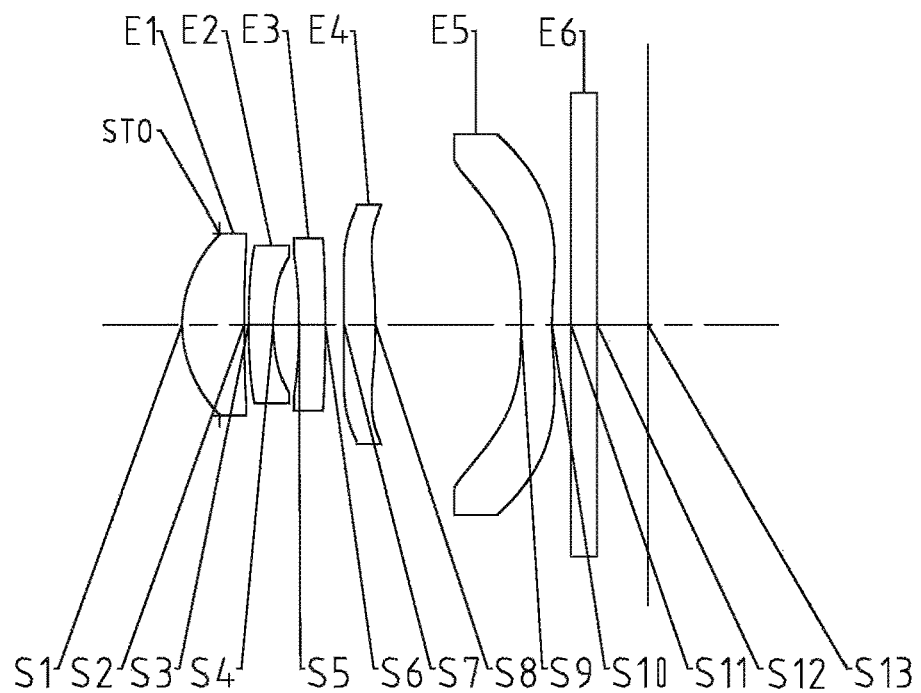
FIG. 15 is a schematic structural diagram illustrating a telephoto lens assembly according to Embodiment 8 of the present application.

A telephoto lens assembly according to Embodiment 8 of the present application is described below with reference to FIG. 15 to FIG. 16D. FIG. 15 is a schematic structural diagram illustrating a telephoto lens assembly according to Embodiment 8 of the present application. As shown in FIG. 15, the telephoto lens assembly according to Embodiment 8 includes five lenses E1-E5 respectively having an object side surface and an image side surface.

Effective focal lengths of the lenses f1 to f5, a total effective focal length f of the telephoto lens assembly, a total length of the camera lens TTL and a half maximum field-of-view angle HFOV of the telephoto lens assembly in Embodiment 8 are shown in Table 22 below.

TABLE 22

| f1 (mm) | 2.87 | f (mm) | 5.58 |
|---|---|---|---|
| f2 (mm) | −4.89 | TTL (mm) | 5.308 |
| f3 (mm) | −15.23 | HFOV (deg) | 30.0 |
| f4 (mm) | 9.56 | | |
| f5 (mm) | −5.20 | | |

With reference to Table 22, the axial distance from the object side surface of the first lens to the image plane TTL and the total effective focal length f of the telephoto lens assembly satisfy: TTL/f=0.95. An effective focal length of the first lens f1 and the total effective focal length f satisfy: f1/f=0.51. An effective focal length of the second lens f2 and the total effective focal length f satisfy: f2/f=−0.88. The effective focal length of the first lens f1, an effective focal length of the fourth lens f4 and the total effective focal length f satisfy: |f/f1|+|f/f4|=2.53. An effective focal length of the third lens f3, the effective focal length of the fourth lens f4 and the total effective focal length f satisfy: |f/f3|+|f/f4|=0.95. An effective focal length of the fifth lens f5 and the total effective focal length f satisfy: f5/f=−0.93.

Table 23 shows a surface form, a radius of curvature, a thickness, a material and a conic constant of each lens in this embodiment.

TABLE 23

| surface number | surface form | radius of curvature | thickness | material | conic constant |
|---|---|---|---|---|---|
| OBJ | spherical | infinite | Infinite | | |
| STO | spherical | infinite | −0.4412 | | |
| S1 | aspheric | 1.4414 | 0.7093 | 1.53, 55.8 | −0.0920 |
| S2 | aspheric | 19.5128 | 0.0500 | | 99.0000 |
| S3 | aspheric | 7.9558 | 0.2800 | 1.66, 20.4 | 57.4815 |
| S4 | aspheric | 2.2670 | 0.2859 | | 2.4224 |
| S5 | aspheric | −8.1432 | 0.3001 | 1.54, 56.1 | 95.2175 |
| S6 | aspheric | −474.0306 | 0.2157 | | 99.0000 |
| S7 | aspheric | −57.4786 | 0.3588 | 1.66, 20.4 | −92.1367 |
| S8 | aspheric | −5.7043 | 1.6601 | | −42.0904 |
| S9 | aspheric | −19.1640 | 0.3508 | 1.53, 55.8 | −97.6296 |
| S10 | aspheric | 3.2708 | 0.2090 | | −80.4796 |
| S11 | spherical | infinite | 0.3000 | 1.52, 64.2 | |
| S12 | spherical | infinite | 0.5803 | | |
| S13 | spherical | infinite | | | |

Table 24 shows high-order coefficients $A_4$, $A_6$, $A_8$, $A_{10}$, $A_{12}$, $A_{14}$, $A_{16}$, $A_{18}$ and $A_{20}$ applicable to each of the aspheric surfaces S1 to S10 of the aspheric lenses in this Embodiment.

TABLE 24

| surface number | $A_4$ | $A_6$ | $A_8$ | $A_{10}$ | $A_{12}$ |
|---|---|---|---|---|---|
| S1  | 1.0003E−02  | −5.0704E−02 | 2.7629E−01  | −8.6660E−01 | 1.7124E+00 |
| S2  | −2.9055E−03 | 1.5504E−05  | 4.5049E−08  | −7.5311E−10 | 2.3565E−12 |
| S3  | −4.1279E−16 | 1.1369E−14  | −1.3292E−13 | 8.3192E−13  | −3.0014E−12 |
| S4  | 3.2203E−02  | 2.2079E−02  | 1.4962E−01  | −9.6688E−01 | 4.9536E+00 |
| S5  | −3.0244E−02 | −3.5057E−01 | 4.2681E+00  | −2.5321E+01 | 9.4802E+01 |
| S6  | −9.1115E−02 | 9.6391E−02  | 5.6193E−02  | −1.9102E−01 | 1.5654E−01 |
| S7  | −2.6323E−02 | 6.6878E−02  | 3.6467E−02  | −5.9248E−02 | 1.8145E−02 |
| S8  | −1.7696E−02 | 5.2228E−02  | −1.4807E−03 | −2.8043E−03 | 9.2868E−03 |
| S9  | −2.4835E−01 | 2.5881E−01  | −2.4785E−01 | 1.6061E−01  | −6.6086E−02 |
| S10 | −8.5172E−02 | 4.1801E−02  | −2.5205E−02 | 1.0347E−02  | −2.5809E−03 |

| surface number | $A_{14}$ | $A_{16}$ | $A_{18}$ | $A_{20}$ |
|---|---|---|---|---|
| S1  | −2.1460E+00 | 1.6504E+00  | −7.0994E−01 | 1.3017E−01  |
| S2  | 1.3325E−12  | −1.3360E−12 | 7.3521E−13  | −1.7156E−13 |
| S3  | 6.4184E−12  | −8.0252E−12 | 5.4168E−12  | −1.5235E−12 |
| S4  | −1.5847E+01 | 3.0896E+01  | −3.3089E+01 | 1.5066E+01  |
| S5  | −2.2691E+02 | 3.3724E+02  | −2.8368E+02 | 1.0360E+02  |
| S6  | −6.4123E−02 | 1.4466E−02  | −1.7202E−03 | 8.4511E−05  |
| S7  | 3.4955E−03  | −3.1447E−03 | 6.5242E−04  | −4.5609E−05 |
| S8  | −1.1022E−02 | 4.0795E−03  | −5.3139E−04 | 1.2636E−05  |
| S9  | 1.6999E−02  | −2.6135E−03 | 2.1701E−04  | −7.4342E−06 |
| S10 | 3.7540E−04  | −3.0270E−05 | 1.2469E−06  | −2.0240E−08 |

With reference to Table 23 and Table 24, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.87. A radius of curvature of the object side surface of the second lens R3 and a radius of curvature of the image side surface of the second lens R4 satisfy: |(R3+R4)/(R3−R4)|=1.80. An axial air spacing between the second lens and the third lens T23 and an axial air spacing between the third lens and the fourth lens T34 satisfy: T34/T23=0.75. A radius of curvature of the object side surface of the third lens R5 and a radius of curvature of the image side surface of the third lens R6 satisfy: |(R5−R6)/(R5+R6)|=0.97. A radius of curvature of the object side surface of the fourth lens R7 and a radius of curvature of the image side surface of the fourth lens R8 satisfy: |(R7+R8)/(R7−R8)|=1.22.

In this embodiment, a vector height of the object side surface of the fifth lens at a maximum effective diameter SAG51 and the center thickness of the fifth lens CT5 satisfy: |SAG51/CT5|=2.18.

Figure 16A:
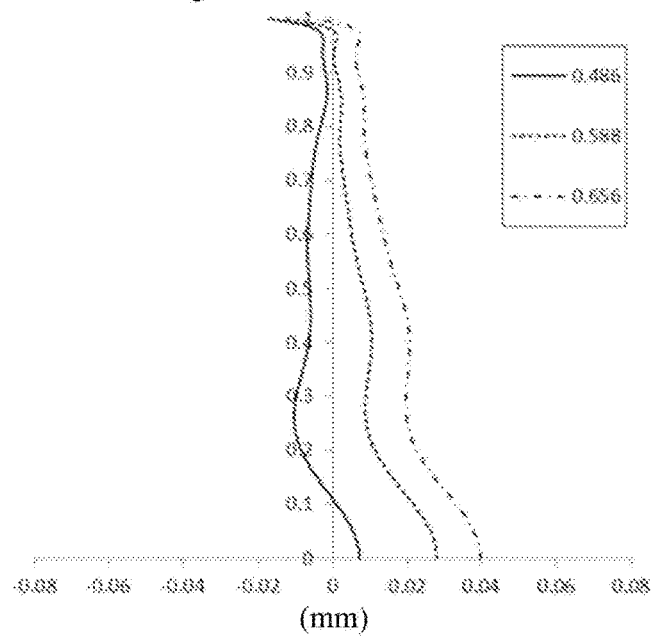
FIG. 16A illustrates a longitudinal aberration curve of the telephoto lens assembly according to Embodiment 8.
Figure 16B:
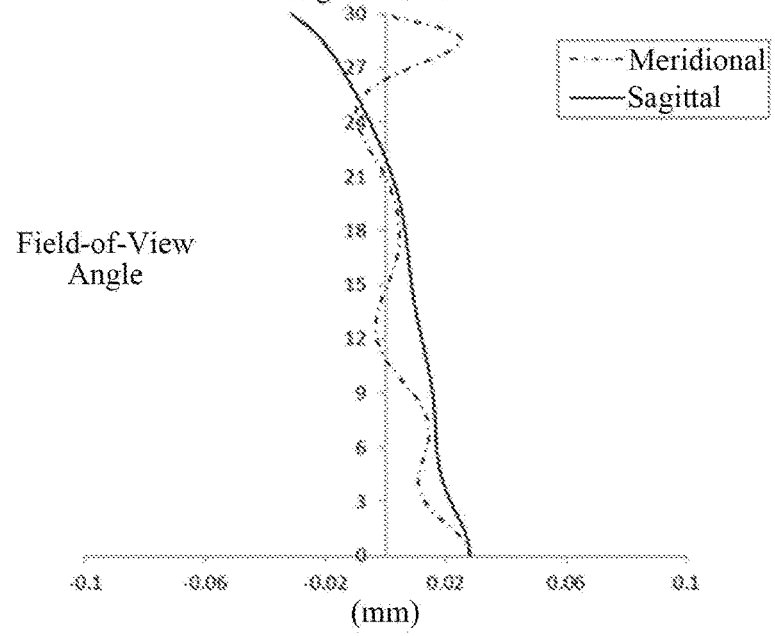
FIG. 16B illustrates an astigmatism curve of the telephoto lens assembly according to Embodiment 8.
Figure 16C:
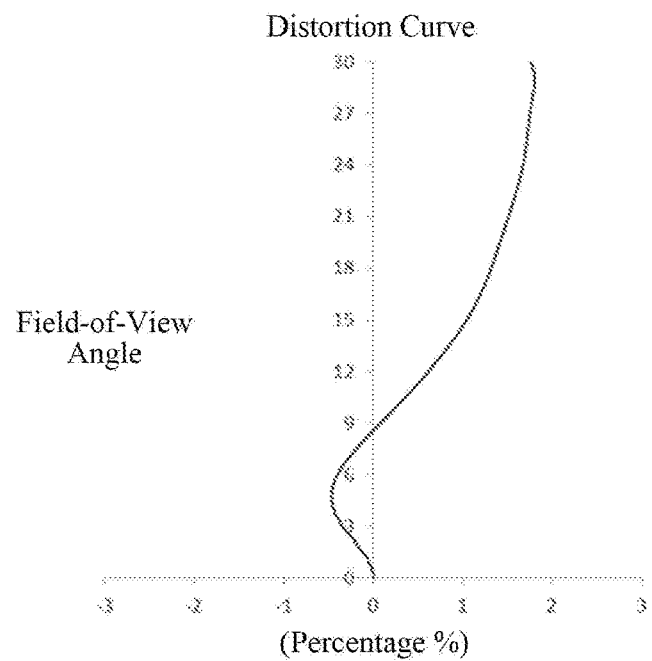
FIG. 16C illustrates a distortion curve of the telephoto lens assembly according to Embodiment 8.
Figure 16D:
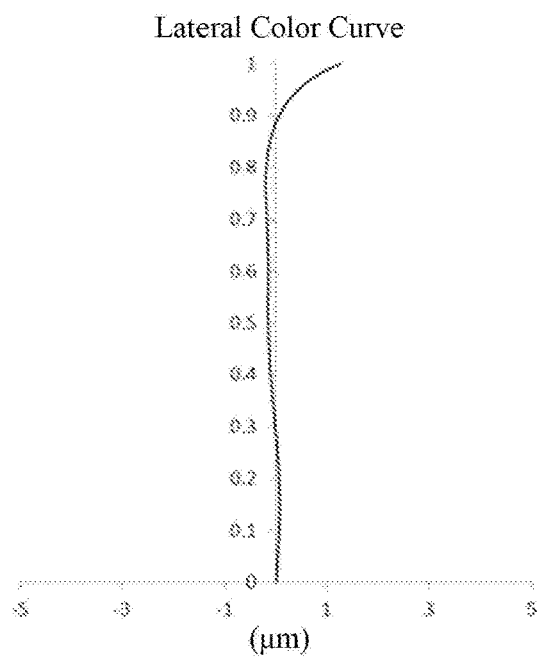
FIG. 16D illustrates a lateral color curve of the telephoto lens assembly according to Embodiment 8.

FIG. 16A illustrates a longitudinal aberration curve of the telephoto lens assembly according to Embodiment 8, representing deviations of focal points of light of different wavelengths converged after passing through an optical system. FIG. 16B illustrates an astigmatism curve of the telephoto lens assembly according to Embodiment 8, representing a curvature of a meridional image plane and a curvature of a sagittal image plane. FIG. 16C illustrates a distortion curve of the telephoto lens assembly according to Embodiment 8, representing amounts of distortion at different viewing angles. FIG. 16D illustrates a lateral color curve of the telephoto lens assembly according to Embodiment 8, representing deviations of different image heights on an image plane after light passes through the telephoto lens assembly. It can be seen from FIG. 16A to FIG. 16D that the telephoto lens assembly according to Embodiment 8 achieves good image quality while ensuring miniaturization.

Embodiment 9

Figure 17:
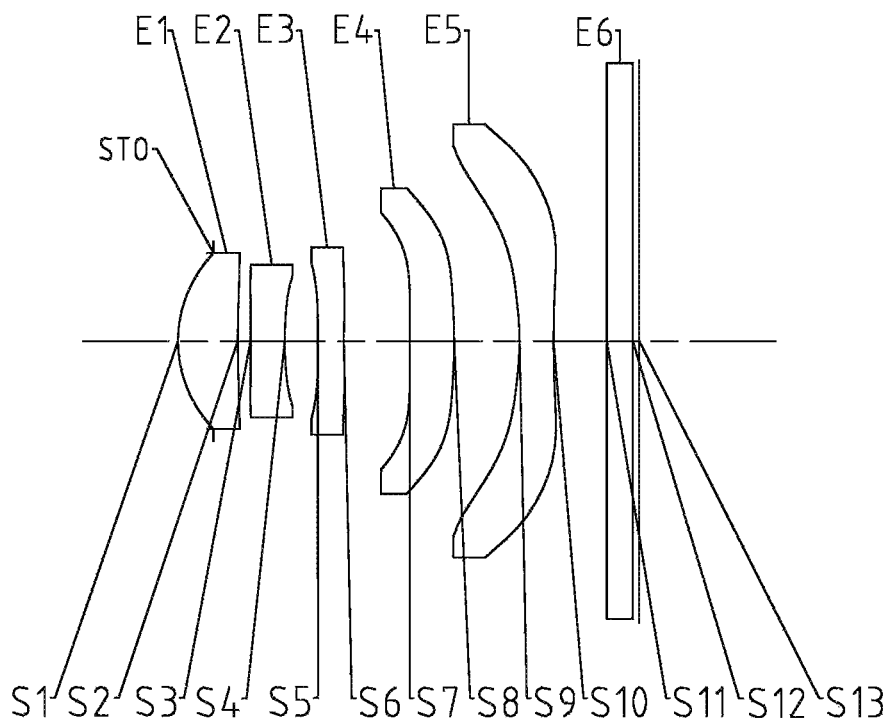
FIG. 17 is a schematic structural diagram illustrating a telephoto lens assembly according to Embodiment 9 of the present application.

A telephoto lens assembly according to Embodiment 9 of the present application is described below with reference to FIG. 17 to FIG. 18D. FIG. 17 is a schematic structural diagram illustrating a telephoto lens assembly according to Embodiment 9 of the present application. As shown in FIG. 17, the telephoto lens assembly according to Embodiment 9 includes five lenses E1-E5 respectively having an object side surface and an image side surface.

Effective focal lengths of the lenses f1 to f5, a total effective focal length f of the telephoto lens assembly, a total length of the camera lens TTL and a half maximum field-of-view angle HFOV of the telephoto lens assembly in Embodiment 9 are shown in Table 25 below.

TABLE 25

| f1 (mm) | 3.02   | f (mm)     | 5.48  |
|---|---|---|---|
| f2 (mm) | −6.00  | TTL (mm)   | 5.308 |
| f3 (mm) | −20.04 | HFOV (deg) | 30.3  |
| f4 (mm) | 9.26   |            |       |
| f5 (mm) | −4.70  |            |       |

With reference to Table 25, the axial distance from the object side surface of the first lens to the image plane TTL and the total effective focal length f of the telephoto lens assembly satisfy: TTL/f=0.97. An effective focal length of the first lens f1 and the total effective focal length f satisfy: f1/f=0.55. An effective focal length of the second lens f2 and the total effective focal length f satisfy: f2/f=−1.09. The effective focal length of the first lens f1, an effective focal length of the fourth lens f4 and the total effective focal length f satisfy: |f/f1|+|f/f4|=2.40. An effective focal length of the third lens f3, the effective focal length of the fourth lens f4 and the total effective focal length f satisfy: |f/f3|+|f/f4|=0.87. An effective focal length of the fifth lens f5 and the total effective focal length f satisfy: f5/f=−0.86.

Table 26 shows a surface form, a radius of curvature, a thickness, a material and a conic constant of each lens in this embodiment.

TABLE 26

| surface number | surface form | radius of curvature | thickness | material | conic constant |
|---|---|---|---|---|---|
| OBJ | spherical | infinite | Infinite | | |
| STO | spherical | infinite | −0.4066 | | |
| S1 | aspheric | 1.4425 | 0.6856 | 1.54, 56.1 | −0.8383 |
| S2 | aspheric | 9.7319 | 0.1478 | | −91.1481 |
| S3 | aspheric | 74.3832 | 0.3923 | 1.66, 20.4 | −99.0000 |
| S4 | aspheric | 3.7537 | 0.3808 | | 14.4813 |
| S5 | aspheric | 31.6813 | 0.3000 | 1.54, 56.1 | 99.0000 |
| S6 | aspheric | 8.0855 | 0.7581 | | 22.1609 |
| S7 | aspheric | −66.5794 | 0.5092 | 1.66, 20.4 | −83.7435 |
| S8 | aspheric | −5.6190 | 0.7505 | | 2.9479 |
| S9 | aspheric | −2.9707 | 0.3913 | 1.53, 55.8 | −1.7406 |
| S10 | aspheric | 16.8960 | 0.6113 | | −98.8658 |
| S11 | spherical | infinite | 0.3000 | 1.52, 64.2 | |
| S12 | spherical | infinite | 0.0732 | | |
| S13 | spherical | infinite | | | |

Table 27 shows high-order coefficients $A_4$, $A_6$, $A_8$, $A_{10}$, $A_{12}$, $A_{14}$, $A_{16}$, $A_{18}$ and $A_{20}$ applicable to each of the aspheric surfaces S1 to S10 of the aspheric lenses in this Embodiment.

TABLE 27

| surface number | $A_4$ | $A_6$ | $A_8$ | $A_{10}$ | $A_{12}$ |
|---|---|---|---|---|---|
| S1 | 3.7314E−02 | −1.8203E−02 | 1.5212E−01 | −4.7778E−01 | 9.5806E−01 |
| S2 | −4.8623E−02 | 1.2615E−01 | −4.8862E−01 | 1.8898E+00 | −4.8763E+00 |
| S3 | −8.3231E−02 | 1.8491E−01 | −1.3983E−01 | 1.0563E−01 | −1.6399E−01 |
| S4 | −8.8211E−02 | 3.0073E−01 | −8.6038E−01 | 3.2209E+00 | −8.2647E+00 |
| S5 | −2.3516E−01 | 1.0942E−01 | 1.7400E−01 | −4.8054E−01 | 7.2018E−01 |
| S6 | −1.7056E−01 | 7.6214E−03 | 4.9682E−01 | −1.3551E+00 | 2.2644E+00 |
| S7 | 4.4512E−02 | −2.4763E−01 | 3.4808E−01 | −3.4832E−01 | 2.1551E−01 |
| S8 | 1.2254E−01 | −2.2984E−01 | 2.0950E−01 | −1.3498E−01 | 5.6683E−02 |
| S9 | 1.7592E−01 | −2.4216E−01 | 1.5954E−01 | −6.5938E−02 | 1.8207E−02 |
| S10 | 6.4177E−02 | −1.0640E−01 | 5.9649E−02 | −2.1391E−02 | 5.4456E−03 |

| surface number | $A_{14}$ | $A_{16}$ | $A_{18}$ | $A_{20}$ |
|---|---|---|---|---|
| S1 | −1.2037E+00 | 9.0959E−01 | −3.7244E−01 | 5.9904E−02 |
| S2 | 7.8694E+00 | −7.7513E+00 | 4.2428E+00 | −9.8957E−01 |
| S3 | 1.5638E−01 | −7.4585E−02 | 1.7455E−02 | −1.6176E−03 |
| S4 | 1.3002E+01 | −1.1922E+01 | 5.7392E+00 | −1.1098E+00 |
| S5 | −3.0515E−01 | −7.6645E−01 | 9.6365E−01 | −3.1033E−01 |
| S6 | −2.3261E+00 | 1.3855E+00 | −4.3753E−01 | 5.6712E−02 |
| S7 | −7.5485E−02 | 1.3483E−02 | −8.8092E−04 | −1.6593E−05 |
| S8 | −1.4625E−02 | 2.2257E−03 | −1.8315E−04 | 6.2788E−06 |
| S9 | −3.3948E−03 | 4.2040E−04 | −3.1876E−05 | 1.1266E−06 |
| S10 | −9.7364E−04 | 1.1294E−04 | −7.4432E−06 | 2.0866E−07 |

With reference to Table 26 and Table 27, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.91. A radius of curvature of the object side surface of the second lens R3 and a radius of curvature of the image side surface of the second lens R4 satisfy: |(R3+R4)/(R3−R4)|=1.11. An axial air spacing between the second lens and the third lens T23 and an axial air spacing between the third lens and the fourth lens T34 satisfy: T34/T23=1.99. A radius of curvature of the object side surface of the third lens R5 and a radius of curvature of the image side surface of the third lens R6 satisfy: |(R5−R6)/(R5+R6)|=0.59. A radius of curvature of the object side surface of the fourth lens R7 and a radius of curvature of the image side surface of the fourth lens R8 satisfy: |(R7+R8)/(R7−R8)|=1.18.

In this embodiment, a vector height of the object side surface of the fifth lens at a maximum effective diameter SAG51 and the center thickness of the fifth lens CT5 satisfy: |SAG51/CT5|=1.95.

Figure 18A:
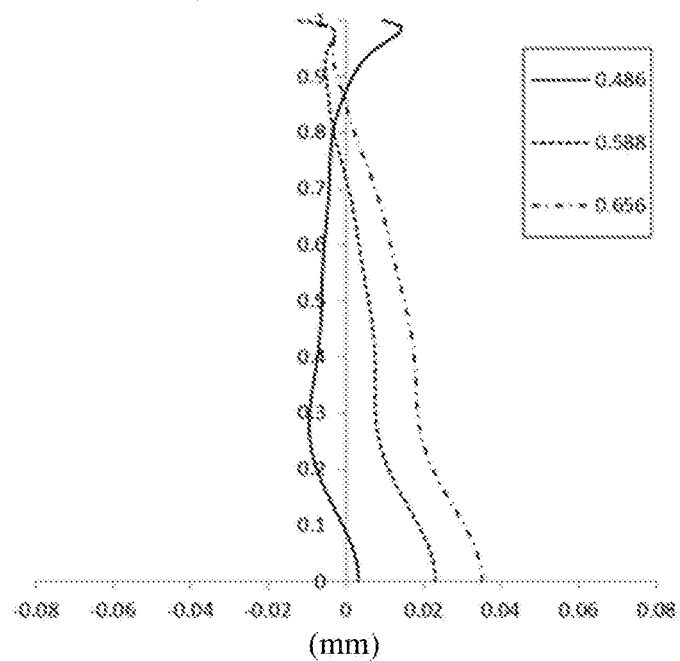
FIG. 18A illustrates a longitudinal aberration curve of the telephoto lens assembly according to Embodiment 9.
Figure 18B:
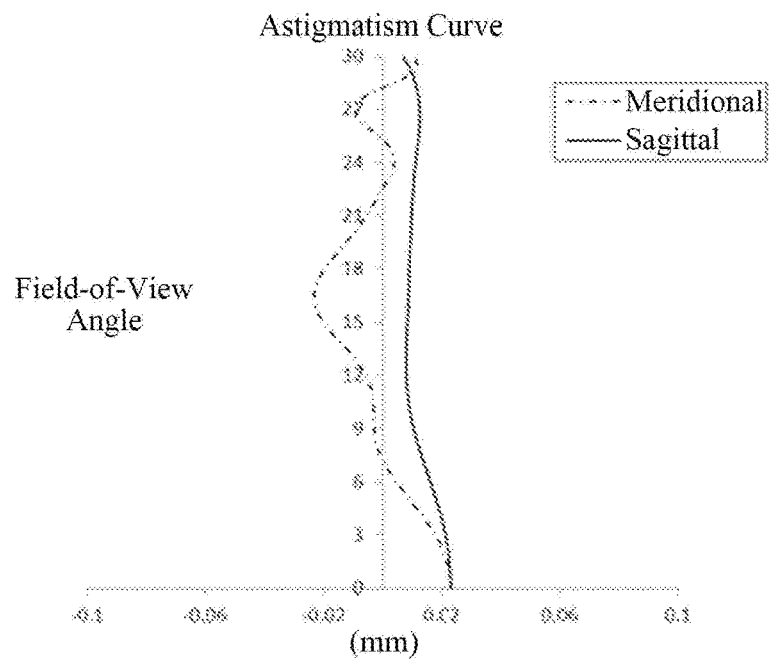
FIG. 18B illustrates an astigmatism curve of the telephoto lens assembly according to Embodiment 9.
Figure 18C:
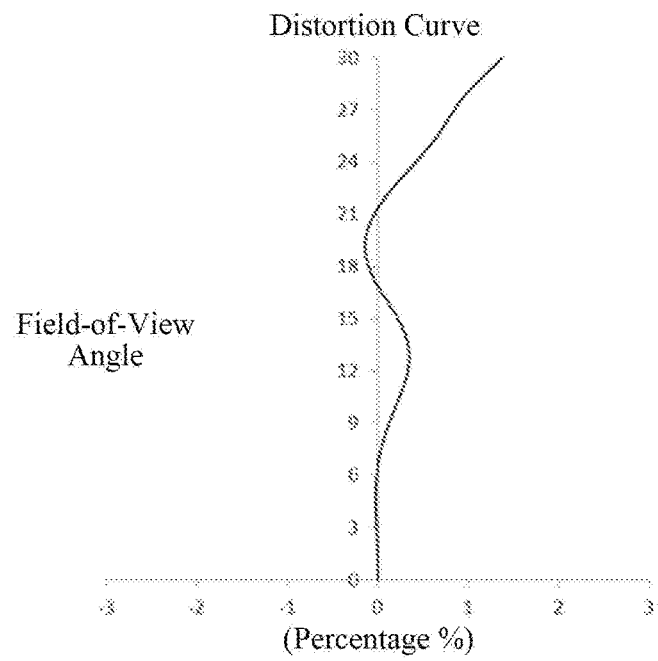
FIG. 18C illustrates a distortion curve of the telephoto lens assembly according to Embodiment 9.
Figure 18D:
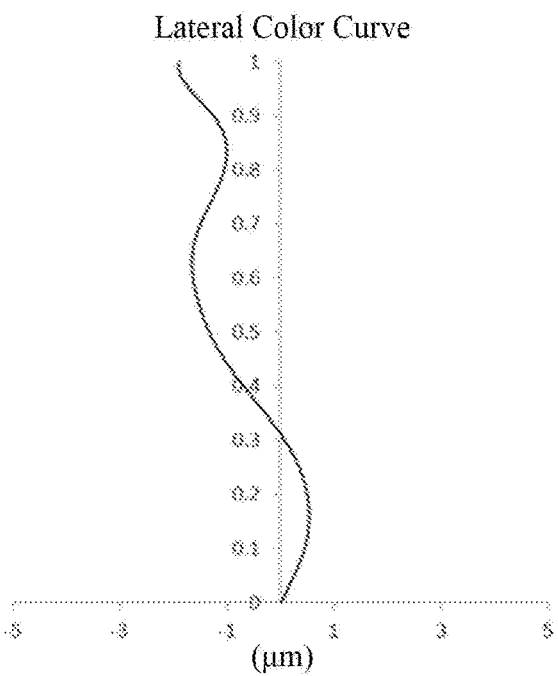
FIG. 18D illustrates a lateral color curve of the telephoto lens assembly according to Embodiment 9.

FIG. 18A illustrates a longitudinal aberration curve of the telephoto lens assembly according to Embodiment 9, representing deviations of focal points of light of different wavelengths converged after passing through an optical system. FIG. 18B illustrates an astigmatism curve of the telephoto lens assembly according to Embodiment 9, representing a curvature of a meridional image plane and a curvature of a sagittal image plane. FIG. 18C illustrates a distortion curve of the telephoto lens assembly according to Embodiment 9, representing amounts of distortion at different viewing angles. FIG. 18D illustrates a lateral color curve of the telephoto lens assembly according to Embodiment 9, representing deviations of different image heights on an image plane after light passes through the telephoto lens assembly. It can be seen from FIG. 18A to FIG. 18D that the telephoto lens assembly according to Embodiment 9 achieves good image quality while ensuring miniaturization.

Embodiment 10

Figure 19:
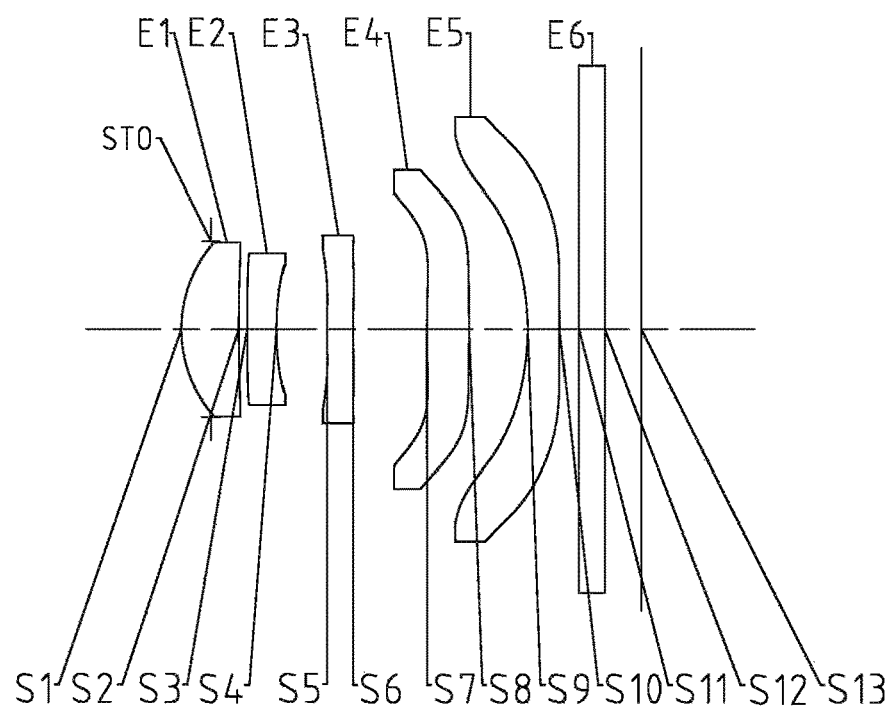
FIG. 19 is a schematic structural diagram illustrating a telephoto lens assembly according to Embodiment 10 of the present application.

A telephoto lens assembly according to Embodiment 10 of the present application is described below with reference to FIG. 19 to FIG. 20D. FIG. 19 is a schematic structural diagram illustrating a telephoto lens assembly according to Embodiment 10 of the present application. As shown in FIG. 19, the telephoto lens assembly according to Embodiment 10 includes five lenses E1-E5 respectively having an object side surface and an image side surface.

Effective focal lengths of the lenses f1 to f5, a total effective focal length f of the telephoto lens assembly, a total length of the camera lens TTL and a half maximum field-of-view angle HFOV of the telephoto lens assembly in Embodiment 10 are shown in Table 28 below.

TABLE 28

| f1 (mm) | 3.10 | f (mm) | 5.48 |
|---|---|---|---|
| f2 (mm) | −6.46 | TTL (mm) | 5.308 |
| f3 (mm) | −28.05 | HFOV (deg) | 30.5 |
| f4 (mm) | 11.30 | | |
| f5 (mm) | −4.78 | | |

With reference to Table 28, the axial distance from the object side surface of the first lens to the image plane TTL and the total effective focal length f of the telephoto lens assembly satisfy: TTL/f=0.97. An effective focal length of the first lens f1 and the total effective focal length f satisfy: f1/f=0.57. An effective focal length of the second lens f2 and the total effective focal length f satisfy: f2/f=−1.18. The effective focal length of the first lens f1, an effective focal length of the fourth lens f4 and the total effective focal length f satisfy: |f/f1|+|f/f4|=2.25. An effective focal length of the third lens f3, the effective focal length of the fourth lens f4 and the total effective focal length f satisfy: |f/f3|+|f/f4|=0.68. An effective focal length of the fifth lens f5 and the total effective focal length f satisfy: f5/f=−0.87.

Table 29 shows a surface form, a radius of curvature, a thickness, a material and a conic constant of each lens in this embodiment.

TABLE 29

| surface number | surface form | radius of curvature | thickness | material | conic constant |
|---|---|---|---|---|---|
| OBJ | spherical | infinite | Infinite | | |
| STO | spherical | infinite | −0.3820 | | |
| S1 | aspheric | 1.5178 | 0.6638 | 1.54, 56.1 | −0.9216 |
| S2 | aspheric | 12.8198 | 0.0979 | | −73.8492 |
| S3 | aspheric | 18.8496 | 0.3366 | 1.66, 20.4 | 79.8950 |
| S4 | aspheric | 3.4550 | 0.5789 | | 6.5871 |
| S5 | aspheric | 13.1472 | 0.3000 | 1.54, 56.1 | 99.0000 |
| S6 | aspheric | 7.0067 | 0.8516 | | −5.8177 |
| S7 | aspheric | 12.8821 | 0.4882 | 1.66, 20.4 | −31.2384 |
| S8 | aspheric | −17.5021 | 0.6774 | | 71.5418 |
| S9 | aspheric | −2.5435 | 0.3655 | 1.53, 55.8 | −0.4616 |
| S10 | aspheric | −524.8782 | 0.2196 | | 99.0000 |
| S11 | spherical | infinite | 0.3000 | 1.52, 64.2 | |
| S12 | spherical | infinite | 0.4204 | | |
| S13 | spherical | infinite | | | |

Table 30 shows high-order coefficients $A_4$, $A_6$, $A_8$, $A_{10}$, $A_{12}$, $A_{14}$, $A_{16}$, $A_{18}$ and $A_{20}$ applicable to each of the aspheric surfaces S1 to S10 of the aspheric lenses in this Embodiment.

TABLE 30

| surface number | $A_4$ | $A_6$ | $A_8$ | $A_{10}$ | $A_{12}$ |
|---|---|---|---|---|---|
| S1 | 3.4234E−02 | −7.5675E−03 | 7.0352E−02 | −1.8378E−01 | 2.8078E−01 |
| S2 | −6.2595E−02 | 1.4568E−01 | −3.0635E−01 | 9.0612E−01 | −2.1126E+00 |
| S3 | −8.8106E−02 | 1.5201E−01 | 3.3518E−01 | −2.2085E+00 | 6.5782E+00 |
| S4 | −6.4876E−02 | 3.0923E−01 | −1.5039E+00 | 8.0845E+00 | −2.8421E+01 |
| S5 | −1.9985E−01 | 5.8095E−02 | 3.0557E−01 | −1.3161E+00 | 3.4704E+00 |
| S6 | −1.6933E−01 | 1.2908E−01 | −1.4209E−01 | 3.1293E−01 | −3.5151E−01 |
| S7 | 2.9143E−02 | −2.4044E−01 | 3.9894E−01 | −5.0268E−01 | 4.2623E−01 |
| S8 | 1.0728E−01 | −2.6257E−01 | 3.3966E−01 | −3.3784E−01 | 2.3188E−01 |
| S9 | 1.2589E−01 | −1.9171E−01 | 1.4337E−01 | −5.9315E−02 | 1.1250E−02 |
| S10 | 1.6588E−02 | −7.6615E−02 | 5.4990E−02 | −2.4025E−02 | 7.2481E−03 |

| surface number | $A_{14}$ | $A_{16}$ | $A_{18}$ | $A_{20}$ |
|---|---|---|---|---|
| S1 | −2.2909E−01 | 5.8475E−02 | 3.9270E−02 | −2.4833E−02 |
| S2 | 3.1754E+00 | −2.9842E+00 | 1.5643E+00 | −3.4978E−01 |
| S3 | −1.2103E+01 | 1.3555E+01 | −8.4823E+00 | 2.2696E+00 |
| S4 | 6.3165E+01 | −8.5845E+01 | 6.5136E+01 | −2.1149E+01 |
| S5 | −5.6475E+00 | 5.5799E+00 | −3.0810E+00 | 7.1791E−01 |
| S6 | 1.6908E−01 | 4.7863E−02 | −9.0517E−02 | 2.7647E−02 |
| S7 | −2.4656E−01 | 9.4970E−02 | −2.1491E−02 | 2.1083E−03 |
| S8 | −1.0601E−01 | 3.0600E−02 | −4.9711E−03 | 3.4254E−04 |
| S9 | 3.4272E−04 | −5.3090E−04 | 8.4338E−05 | −4.4078E−06 |
| S10 | −1.4823E−03 | 1.8875E−04 | −1.3074E−05 | 3.6655E−07 |

With reference to Table 29 and Table 30, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.87. A radius of curvature of the object side surface of the second lens R3 and a radius of curvature of the image side surface of the second lens R4 satisfy: |(R3+R4)/(R3−R4)|=1.45. An axial air spacing between the second lens and the third lens T23 and an axial air spacing between the third lens and the fourth lens T34 satisfy: T34/T23=1.47. A radius of curvature of the object side surface of the third lens R5 and a radius of curvature of the image side surface of the third lens R6 satisfy: |(R5−R6)/(R5+R6)|=0.30. A radius of curvature of the object side surface of the fourth lens R7 and a radius of curvature of the image side surface of the fourth lens R8 satisfy: |(R7+R8)/(R7−R8)|=0.15.

In this embodiment, a vector height of the object side surface of the fifth lens at a maximum effective diameter SAG51 and the center thickness of the fifth lens CT5 satisfy: |SAG51/CT5|=2.29.

Figure 20A:
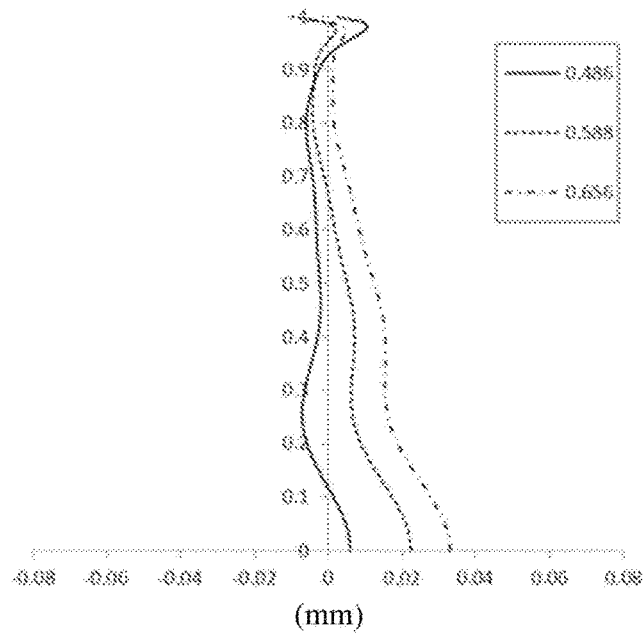
FIG. 20A illustrates a longitudinal aberration curve of the telephoto lens assembly according to Embodiment 10.
Figure 20B:
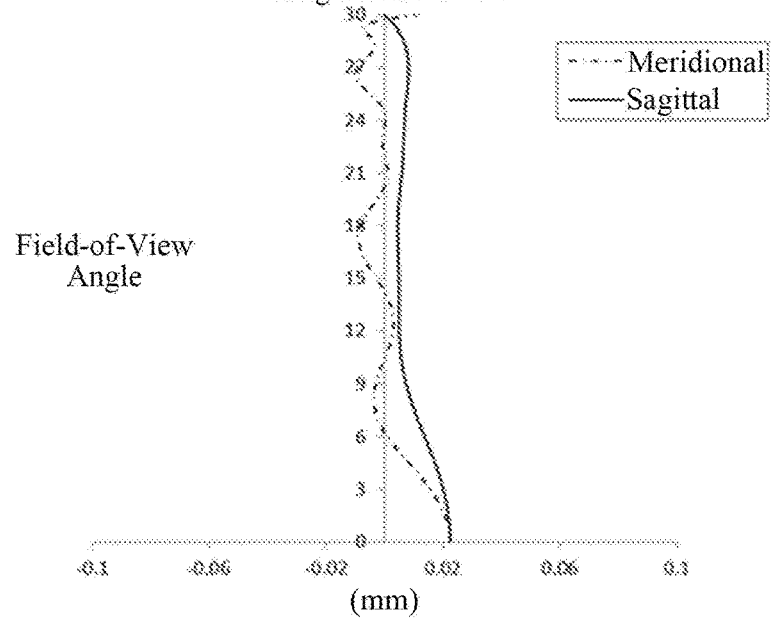
FIG. 20B illustrates an astigmatism curve of the telephoto lens assembly according to Embodiment 10.
Figure 20C:
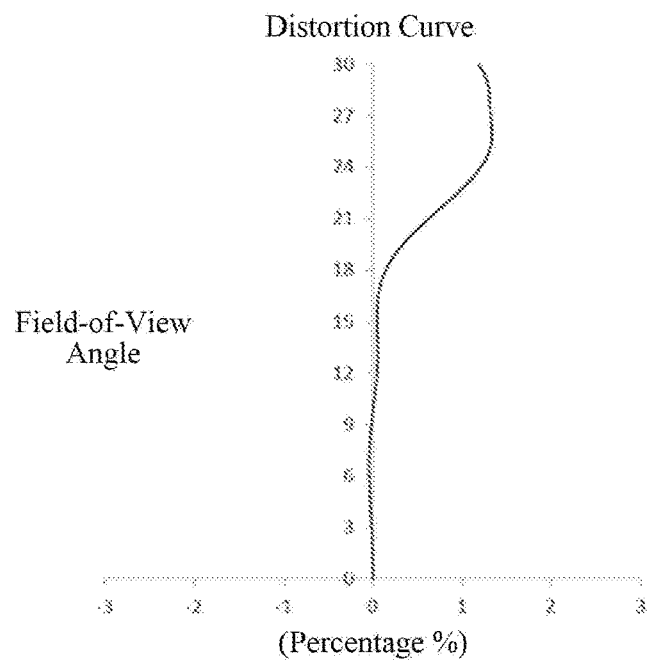
FIG. 20C illustrates a distortion curve of the telephoto lens assembly according to Embodiment 10.
Figure 20D:
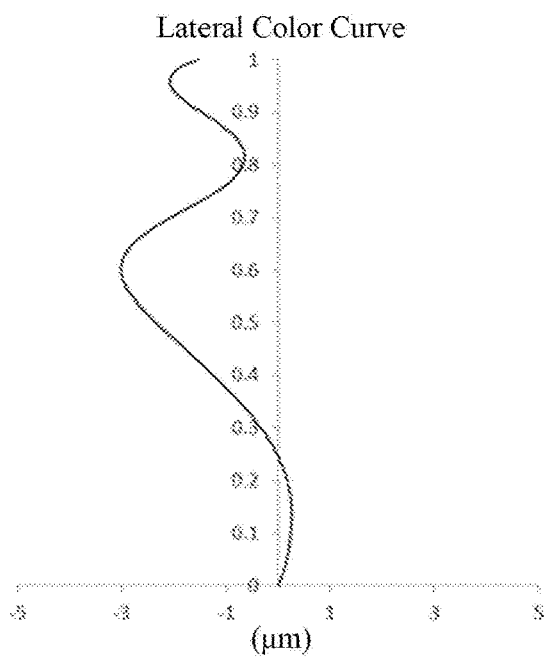
FIG. 20D illustrates a lateral color curve of the telephoto lens assembly according to Embodiment 10.

FIG. 20A illustrates a longitudinal aberration curve of the telephoto lens assembly according to Embodiment 10, representing deviations of focal points of light of different wavelengths converged after passing through an optical system. FIG. 20B illustrates an astigmatism curve of the telephoto lens assembly according to Embodiment 10, representing a curvature of a meridional image plane and a curvature of a sagittal image plane. FIG. 20C illustrates a distortion curve of the telephoto lens assembly according to Embodiment 10, representing amounts of distortion at different viewing angles. FIG. 20D illustrates a lateral color curve of the telephoto lens assembly according to Embodiment 10, representing deviations of different image heights on an image plane after light passes through the telephoto lens assembly. It can be seen from FIG. 20A to FIG. 20D that the telephoto lens assembly according to Embodiment 10 achieves good image quality while ensuring miniaturization.

Embodiment 11

Figure 21:
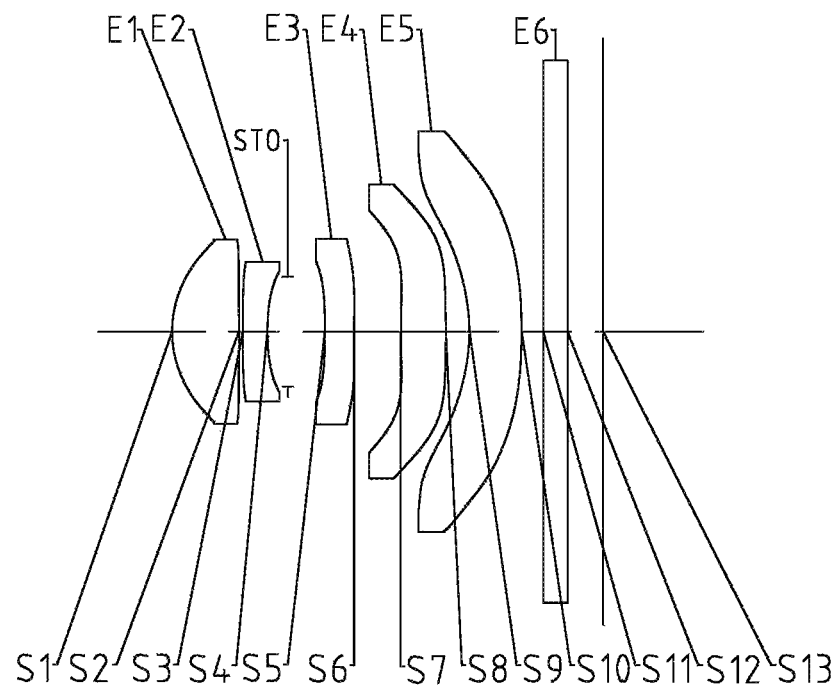
FIG. 21 is a schematic structural diagram illustrating a telephoto lens assembly according to Embodiment 11 of the present application.

A telephoto lens assembly according to Embodiment 11 of the present application is described below with reference to FIG. 21 to FIG. 22D. FIG. 21 is a schematic structural diagram illustrating a telephoto lens assembly according to Embodiment 11 of the present application. As shown in FIG. 21, the telephoto lens assembly according to Embodiment 11 includes five lenses E1-E5 respectively having an object side surface and an image side surface.

Effective focal lengths of the lenses f1 to f5, a total effective focal length f of the telephoto lens assembly, a total length of the camera lens TTL and a half maximum field-of-view angle HFOV of the telephoto lens assembly in Embodiment 11 are shown in Table 31 below.

TABLE 31

| f1 (mm) | 2.55 | f (mm) | 5.48 |
|---|---|---|---|
| f2 (mm) | −4.32 | TTL (mm) | 5.308 |
| f3 (mm) | −12.24 | HFOV (deg) | 30.5 |
| f4 (mm) | 9.78 | | |
| f5 (mm) | −6.89 | | |

With reference to Table 31, the axial distance from the object side surface of the first lens to the image plane TTL and the total effective focal length f of the telephoto lens assembly satisfy: TTL/f=0.97. An effective focal length of the first lens f1 and the total effective focal length f satisfy: f1/f=0.46. An effective focal length of the second lens f2 and the total effective focal length f satisfy: f2/f=−0.79. The effective focal length of the first lens f1, an effective focal length of the fourth lens f4 and the total effective focal length f satisfy: |f/f1|+|f/f4|=2.70. An effective focal length of the third lens f3, the effective focal length of the fourth lens f4 and the total effective focal length f satisfy: |f/f3|+|f/f4|=1.01. An effective focal length of the fifth lens f5 and the total effective focal length f satisfy: f5/f=−1.26.

Table 32 shows a surface form, a radius of curvature, a thickness, a material and a conic constant of each lens in this embodiment.

TABLE 32

| surface number | surface form | radius of curvature | thickness | material | conic constant |
|---|---|---|---|---|---|
| OBJ | spherical | infinite | Infinite | | |
| STO | spherical | 1.3845 | 0.8213 | 1.54, 56.1 | −2.7500 |
| S1 | aspheric | 1036.3160 | 0.0500 | | −55.0000 |
| S2 | aspheric | 44.0713 | 0.3000 | 1.64, 23.5 | 53.9702 |
| S3 | aspheric | 2.5950 | 0.2525 | | −1.1453 |
| S4 | aspheric | infinite | 0.4549 | | |
| S5 | aspheric | −14.8845 | 0.3588 | 1.54, 56.1 | −30.1256 |
| S6 | aspheric | 12.1581 | 0.5789 | | −3.2981 |
| S7 | aspheric | 11.8401 | 0.5509 | 1.66, 20.4 | −50.1928 |
| S8 | aspheric | −13.9559 | 0.2897 | | 44.2384 |
| S9 | aspheric | −2.1574 | 0.6430 | 1.53, 55.8 | −1.5289 |
| S10 | aspheric | −5.7488 | 0.2638 | | −45.9764 |
| S11 | spherical | infinite | 0.3000 | 1.52, 64.2 | |
| S12 | spherical | infinite | 0.4362 | | |
| S13 | spherical | infinite | | | |

Table 33 shows high-order coefficients $A_4$, $A_6$, $A_8$, $A_{10}$, $A_{12}$, $A_{14}$, $A_{16}$, $A_{18}$ and $A_{20}$ applicable to each of the aspheric surfaces S1 to S10 of the aspheric lenses in this Embodiment.

TABLE 33

| surface number | $A_4$ | $A_6$ | $A_8$ | $A_{10}$ | $A_{12}$ |
|---|---|---|---|---|---|
| S1 | 1.2911E−01 | −5.9438E−02 | 1.6660E−01 | −4.1760E−01 | 7.1328E−01 |
| S2 | −5.1185E−02 | 1.9358E−01 | −4.4416E−01 | 9.9648E−01 | −1.9684E+00 |
| S3 | −3.0560E−02 | 2.4078E−01 | −4.2070E−01 | 8.1999E−01 | −1.6381E+00 |
| S4 | 5.0441E−02 | 4.2170E−01 | −3.6559E+00 | 2.6731E+01 | −1.2182E+02 |
| S5 | −1.6551E−01 | −1.0512E−01 | 8.9081E−01 | −3.1042E+00 | 6.4687E+00 |
| S6 | −1.7268E−01 | 1.4538E−01 | −3.3707E−01 | 8.2573E−01 | −1.3023E+00 |
| S7 | −6.8557E−02 | −3.7392E−02 | −5.7873E−02 | 2.2563E−01 | −3.5860E−01 |
| S8 | 4.1119E−02 | −1.4345E−01 | 1.0173E−01 | −3.1967E−02 | −1.3923E−02 |
| S9 | 1.0157E−01 | −1.6071E−01 | 1.4222E−01 | −8.6329E−02 | 3.6105E−02 |
| S10 | −2.7264E−02 | −1.4647E−02 | 1.4419E−02 | −5.5324E−03 | 1.3371E−03 |

| surface number | $A_{14}$ | $A_{16}$ | $A_{18}$ | $A_{20}$ |
|---|---|---|---|---|
| S1 | −7.8836E−01 | 5.3547E−01 | −2.0529E−01 | 3.3166E−02 |
| S2 | 2.6896E+00 | −2.2755E+00 | 1.0628E+00 | −2.0909E−01 |
| S3 | 2.4819E+00 | −2.2428E+00 | 1.0271E+00 | −1.6712E−01 |
| S4 | 3.4812E+02 | −6.0449E+02 | 5.8389E+02 | −2.4034E+02 |
| S5 | −8.3787E+00 | 6.4704E+00 | −2.6131E+00 | 3.8786E−01 |
| S6 | 1.3146E+00 | −8.2091E−01 | 2.8891E−01 | −4.3804E−02 |
| S7 | 3.1297E−01 | −1.5125E−01 | 3.7982E−02 | −3.8674E−03 |
| S8 | 1.8192E−02 | −7.2042E−03 | 1.2989E−03 | −9.0479E−05 |
| S9 | −9.7374E−03 | 1.5949E−03 | −1.4400E−04 | 5.4986E−06 |
| S10 | −2.9248E−04 | 5.4663E−05 | −5.9764E−06 | 2.5970E−07 |

With reference to Table 32 and Table 33, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.95. A radius of curvature of the object side surface of the second lens R3 and a radius of curvature of the image side surface of the second lens R4 satisfy: |(R3+R4)/(R3−R4)|=1.13. An axial air spacing between the second lens and the third lens T23 and an axial air spacing between the third lens and the fourth lens T34 satisfy: T34/T23=0.82. A radius of curvature of the object side surface of the third lens R5 and a radius of curvature of the image side surface of the third lens R6 satisfy: |(R5−R6)/(R5+R6)|=0.96. A radius of curvature of the object side surface of the fourth lens R7 and a radius of curvature of the image side surface of the fourth lens R8 satisfy: |(R7+R8)/(R7−R8)|=0.01.

In this embodiment, a vector height of the object side surface of the fifth lens at a maximum effective diameter SAG51 and the center thickness of the fifth lens CT5 satisfy: |SAG51/CT5|=2.61.

Figure 22A:
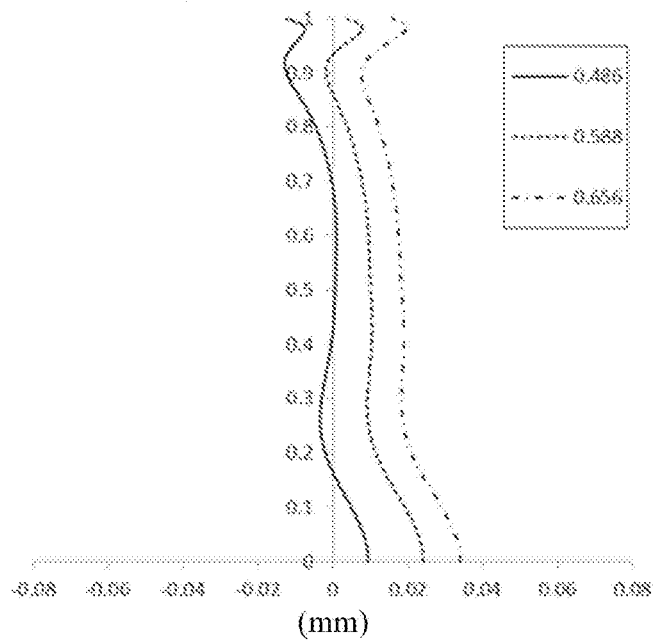
FIG. 22A illustrates a longitudinal aberration curve of the telephoto lens assembly according to Embodiment 11.
Figure 22B:
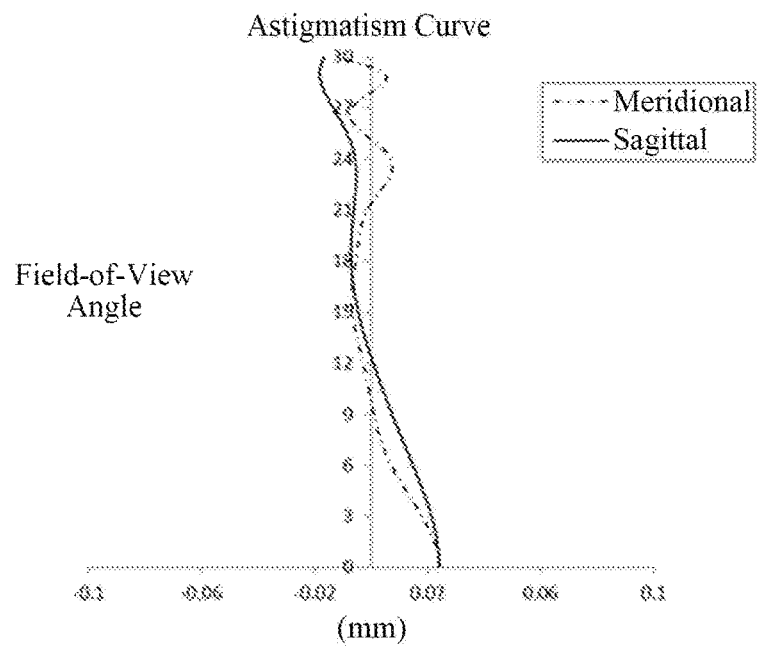
FIG. 22B illustrates an astigmatism curve of the telephoto lens assembly according to Embodiment 11.
Figure 22C:
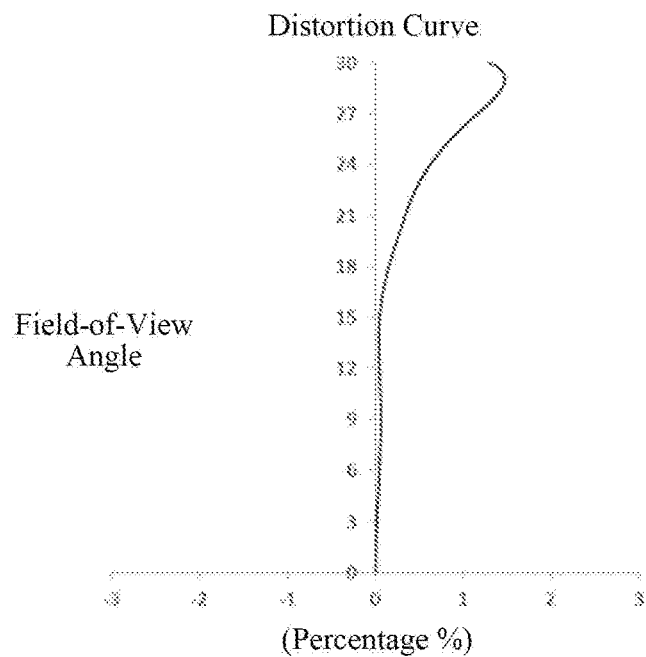
FIG. 22C illustrates a distortion curve of the telephoto lens assembly according to Embodiment 11.
Figure 22D:
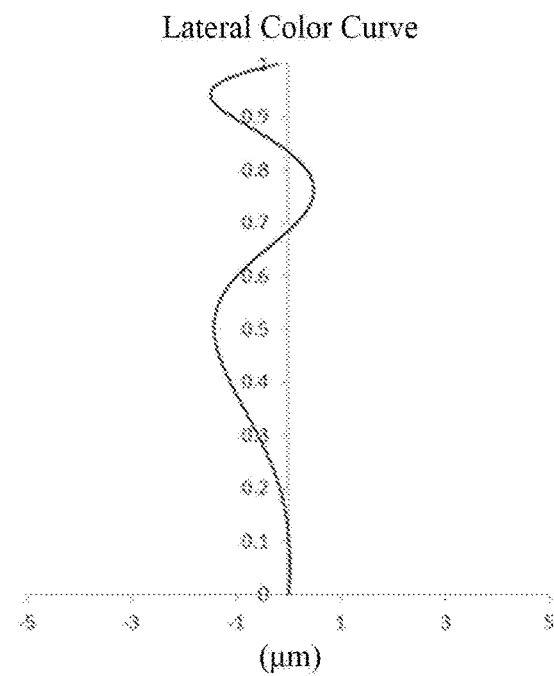
FIG. 22D illustrates a lateral color curve of the telephoto lens assembly according to Embodiment 11.

FIG. 22A illustrates a longitudinal aberration curve of the telephoto lens assembly according to Embodiment 11, representing deviations of focal points of light of different wavelengths converged after passing through an optical system. FIG. 22B illustrates an astigmatism curve of the telephoto lens assembly according to Embodiment 11, representing a curvature of a meridional image plane and a curvature of a sagittal image plane. FIG. 22C illustrates a distortion curve of the telephoto lens assembly according to Embodiment 11, representing amounts of distortion at different viewing angles. FIG. 22D illustrates a lateral color curve of the telephoto lens assembly according to Embodiment 11, representing deviations of different image heights on an image plane after light passes through the telephoto lens assembly. It can be seen from FIG. 22A to FIG. 22D that the telephoto lens assembly according to Embodiment 11 achieves good image quality while ensuring miniaturization.

Embodiment 12

Figure 23:
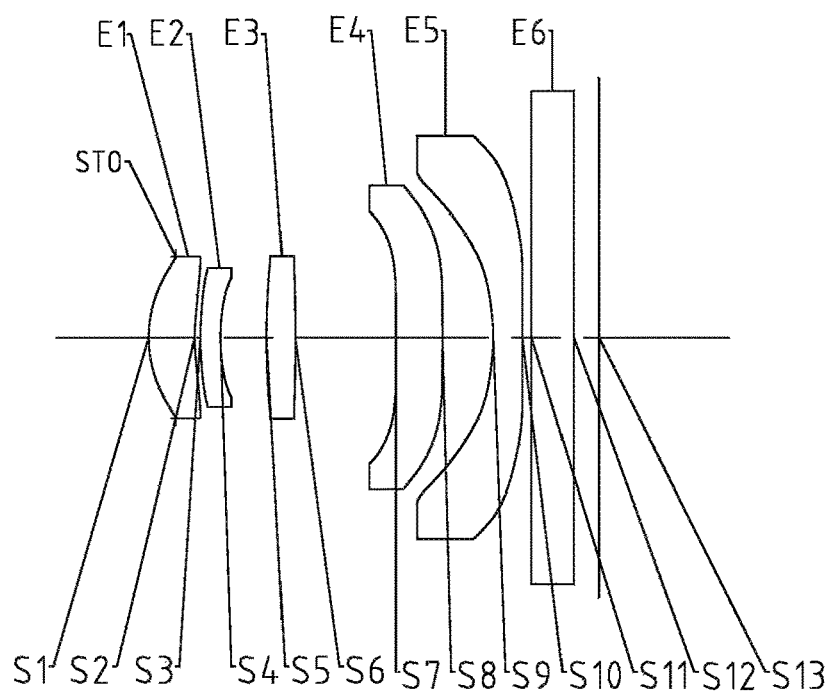
FIG. 23 is a schematic structural diagram illustrating a telephoto lens assembly according to Embodiment 12 of the present application.

A telephoto lens assembly according to Embodiment 12 of the present application is described below with reference to FIG. 23 to FIG. 24D. FIG. 23 is a schematic structural diagram illustrating a telephoto lens assembly according to Embodiment 12 of the present application. As shown in FIG. 23, the telephoto lens assembly according to Embodiment 12 includes five lenses E1-E5 respectively having an object side surface and an image side surface.

Effective focal lengths of the lenses f1 to f5, a total effective focal length f of the telephoto lens assembly, a total length of the camera lens TTL and a half maximum field-of-view angle HFOV of the telephoto lens assembly in Embodiment 12 are shown in Table 34 below.

TABLE 34

| f1 (mm) | 5.49 | f (mm) | 5.50 |
|---|---|---|---|
| f2 (mm) | −25.72 | TTL (mm) | 5.418 |
| f3 (mm) | 14.07 | HFOV (deg) | 30.6 |
| f4 (mm) | 33.94 | | |
| f5 (mm) | −5.53 | | |

With reference to Table 34, the axial distance from the object side surface of the first lens to the image plane TTL and the total effective focal length f of the telephoto lens assembly satisfy: TTL/f=0.99. An effective focal length of the first lens f1 and the total effective focal length f satisfy: f1/f=1.00. The effective focal length of the first lens f1, an effective focal length of the fourth lens f4 and the total effective focal length f satisfy: |f/f1|+|f/f4|=1.16. An effective focal length of the third lens f3, the effective focal length of the fourth lens f4 and the total effective focal length f satisfy: |f/f3|+|f/f4|=0.55. An effective focal length of the fifth lens f5 and the total effective focal length f satisfy: f5/f=−1.01.

Table 35 shows a surface form, a radius of curvature, a thickness, a material and a conic constant of each lens in this embodiment.

TABLE 35

| surface number | surface form | radius of curvature | thickness | material | conic constant |
|---|---|---|---|---|---|
| OBJ | spherical | infinite | Infinite | | |
| STO | spherical | infinite | −0.3386 | | |
| S1 | aspheric | 1.5478 | 0.5802 | 1.54, 56.1 | −1.1955 |
| S2 | aspheric | 2.7882 | 0.0705 | | −43.3493 |
| S3 | aspheric | 3.0274 | 0.2525 | 1.66, 20.4 | −12.3414 |
| S4 | aspheric | 2.4843 | 0.5753 | | 6.9474 |
| S5 | aspheric | 7.5026 | 0.3553 | 1.54, 56.1 | 53.2491 |
| S6 | aspheric | 366.0440 | 1.2611 | | −99.0000 |
| S7 | aspheric | 44.0734 | 0.5868 | 1.66, 20.4 | 99.0000 |
| S8 | aspheric | −45.4094 | 0.6357 | | 55.0000 |
| S9 | aspheric | −2.4952 | 0.3650 | 1.53, 55.8 | −0.1278 |
| S10 | aspheric | −16.7384 | 0.1147 | | −55.0000 |
| S11 | spherical | infinite | 0.3000 | 1.52, 64.2 | |
| S12 | spherical | infinite | 0.3156 | | |
| S13 | spherical | infinite | | | |

Table 36 shows high-order coefficients $A_4$, $A_6$, $A_8$, $A_{10}$, $A_{12}$, $A_{14}$, $A_{16}$, $A_{18}$ and $A_{20}$ applicable to each of the aspheric surfaces S1 to S10 of the aspheric lenses in this Embodiment.

TABLE 36

| surface number | $A_4$ | $A_6$ | $A_8$ | $A_{10}$ | $A_{12}$ |
|---|---|---|---|---|---|
| S1 | 3.7271E−02 | −4.0603E−02 | 2.5385E−01 | −8.5112E−01 | 1.7080E+00 |
| S2 | −1.6676E−02 | −3.3338E−01 | 1.4465E+00 | −2.8976E+00 | 4.0016E+00 |
| S3 | −2.3466E−01 | 3.2674E−01 | 2.5865E−01 | −2.4376E−01 | −1.6970E+00 |
| S4 | −1.3709E−01 | 1.9443E−01 | 1.2664E−01 | 6.3669E−01 | −7.3491E+00 |
| S5 | −7.4348E−02 | −1.8941E−02 | 3.1843E−01 | −1.1645E+00 | 2.7933E+00 |
| S6 | −4.5474E−02 | −1.7859E−02 | 2.5219E−01 | −8.9476E−01 | 2.0607E+00 |
| S7 | −1.5765E−02 | −1.2026E−01 | 2.4780E−01 | −3.5357E−01 | 3.3231E−01 |
| S8 | 2.9389E−02 | −1.4468E−01 | 1.8006E−01 | −1.5822E−01 | 9.7114E−02 |
| S9 | 1.7048E−01 | −2.6574E−01 | 1.4029E−01 | −1.8838E−03 | −3.2712E−02 |
| S10 | 1.3546E−01 | −2.0114E−01 | 1.2716E−01 | −4.6557E−02 | 1.0716E−02 |

TABLE 36-continued

| surface number | $A_{14}$ | $A_{16}$ | $A_{18}$ | $A_{20}$ |
|---|---|---|---|---|
| S1 | −2.1552E+00 | 1.6583E+00 | −7.1863E−01 | 1.3207E−01 |
| S2 | −4.1972E+00 | 2.7354E+00 | −8.5092E−01 | 7.0874E−02 |
| S3 | 4.5855E+00 | −5.7182E+00 | 3.6602E+00 | −9.4364E−01 |
| S4 | 2.3771E+01 | −4.0440E+01 | 3.6358E+01 | −1.3973E+01 |
| S5 | −4.2603E+00 | 3.9352E+00 | −2.0060E+00 | 4.2471E−01 |
| S6 | −2.9705E+00 | 2.6088E+00 | −1.2790E+00 | 2.6881E−01 |
| S7 | −2.0049E−01 | 7.4317E−02 | −1.5314E−02 | 1.3348E−03 |
| S8 | −3.9658E−02 | 1.0148E−02 | −1.4628E−03 | 9.0259E−05 |
| S9 | 1.7283E−02 | −4.3416E−03 | 5.5993E−04 | −2.9646E−05 |
| S10 | −1.5824E−03 | 1.4610E−04 | −7.7577E−06 | 1.8488E−07 |

With reference to Table 35 and Table 36, a center thickness of the first lens CT1, a center thickness of the second lens CT2, a center thickness of the third lens CT3, a center thickness of the fourth lens CT4 and a center thickness of the fifth lens CT5 satisfy: (CT2+CT3+CT5)/(CT1+CT4)=0.83. An axial air spacing between the second lens and the third lens T23 and an axial air spacing between the third lens and the fourth lens T34 satisfy: T34/T23=2.19. A radius of curvature of the object side surface of the fourth lens R7 and a radius of curvature of the image side surface of the fourth lens R8 satisfy: |(R7+R8)/(R7−R8)|=0.01.

In this embodiment, a vector height of the object side surface of the fifth lens at a maximum effective diameter SAG51 and the center thickness of the fifth lens CT5 satisfy: |SAG51/CT5|=0.97.

Figure 24A:
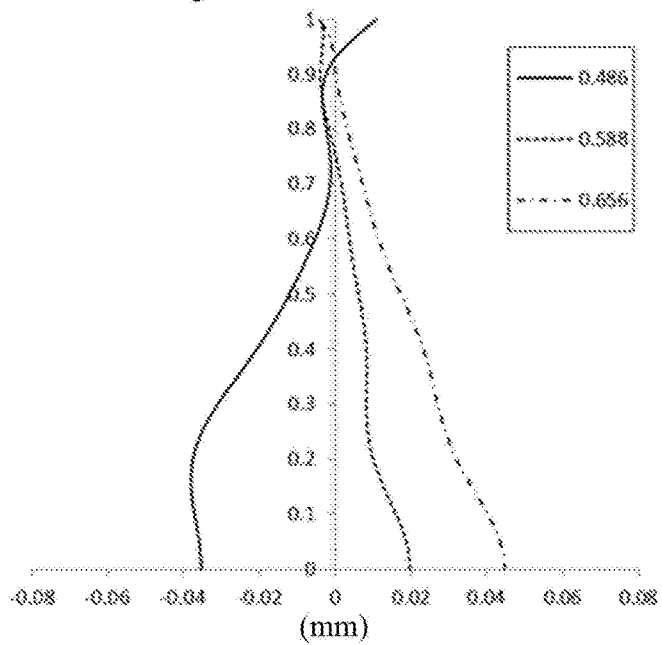
FIG. 24A illustrates a longitudinal aberration curve of the telephoto lens assembly according to Embodiment 12.
Figure 24B:
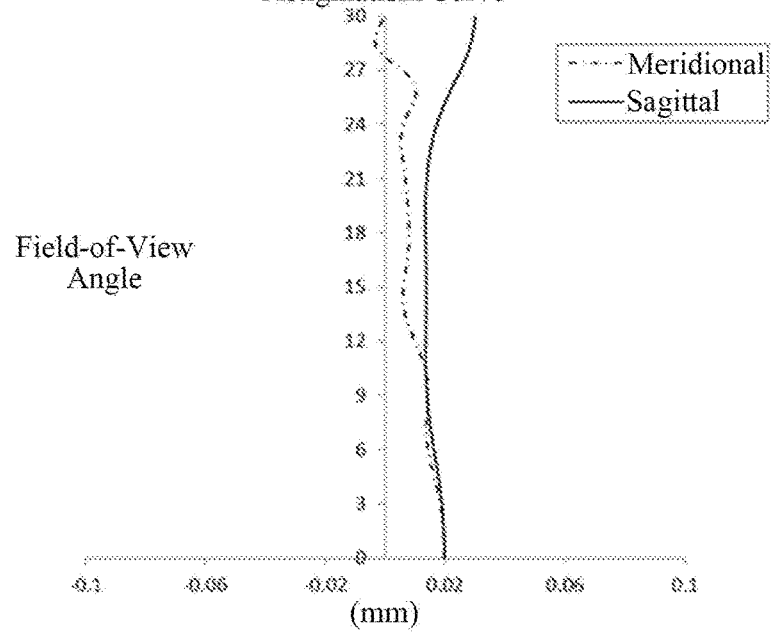
FIG. 24B illustrates an astigmatism curve of the telephoto lens assembly according to Embodiment 12.
Figure 24C:
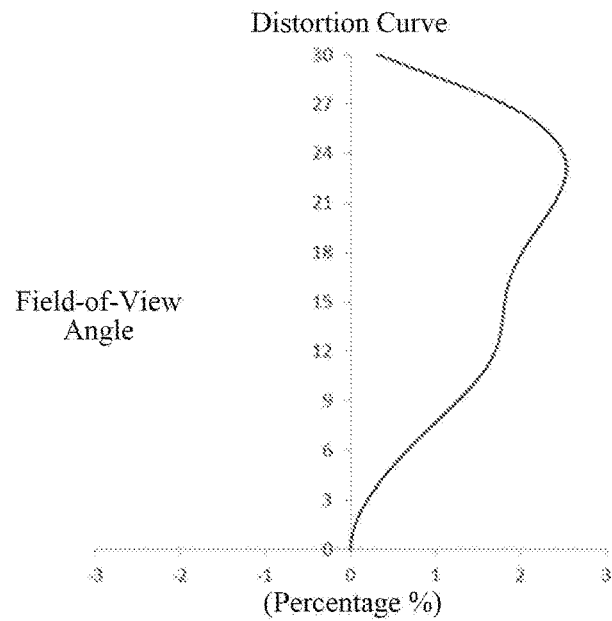
FIG. 24C illustrates a distortion curve of the telephoto lens assembly according to Embodiment 12.
Figure 24D:
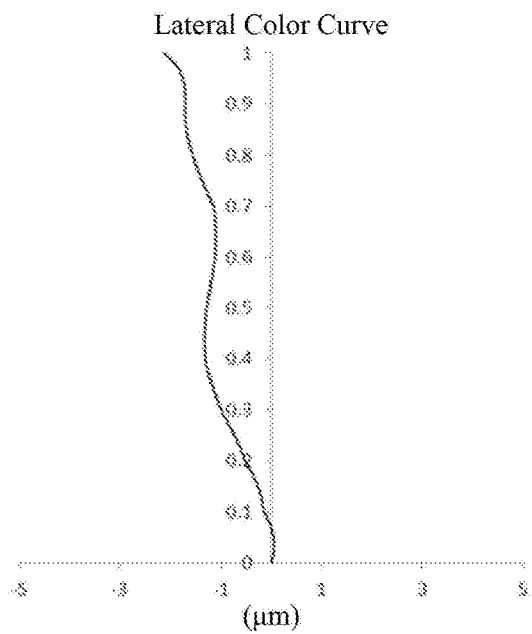
FIG. 24D illustrates a lateral color curve of the telephoto lens assembly according to Embodiment 12.

FIG. 24A illustrates a longitudinal aberration curve of the telephoto lens assembly according to Embodiment 12, representing deviations of focal points of light of different wavelengths converged after passing through an optical system. FIG. 24B illustrates an astigmatism curve of the telephoto lens assembly according to Embodiment 12, representing a curvature of a meridional image plane and a curvature of a sagittal image plane. FIG. 24C illustrates a distortion curve of the telephoto lens assembly according to Embodiment 12, representing amounts of distortion at different viewing angles. FIG. 24D illustrates a lateral color curve of the telephoto lens assembly according to Embodiment 12, representing deviations of different image heights on an image plane after light passes through the telephoto lens assembly. It can be seen from FIG. 24A to FIG. 24D that the telephoto lens assembly according to Embodiment 12 achieves good image quality while ensuring miniaturization.

The present application also provides a camera device, a photosensitive element of the camera device may be a charged coupled device (CCD) or a complementary metal-oxide semiconductor (CMOS). The camera device may be an independent camera device such as a digital camera, or a camera module integrated on a mobile electronic device such as a mobile phone. The camera device is equipped with the telephoto lens assembly as described above in the embodiments.

The foregoing is only a description of the exemplary embodiments of the present application. It should be appreciated by those skilled in the art that the above embodiments are examples only for illustrative purpose and are not intended to limit the scope of the present application. Any modifications, equivalent substitutions, etc., made within the protection scope of the teachings and the claims of the present application are intended to be included within the protection scope of the present application.

What is claimed is:

1. A telephoto lens assembly, comprising a first lens, a second lens, a third lens, a fourth lens, and a fifth lens, which are provided sequentially from an object side to an image side along an optical axis,
  the first lens having a positive focal power, an object side surface of the first lens being a convex surface, and an axial distance from the object side surface of the first lens to an image plane TTL and a total effective focal length f of the telephoto lens assembly satisfying: TTL/f≤1.0; and
  the fourth lens having a positive focal power, an effective focal length of the first lens f1, an effective focal length of the fourth lens f4 and the total effective focal length f satisfying: 1<|f/f1|+|f/f4|≤2.7,
  wherein, the fifth lens has a negative focal power, and an object side surface of the fifth lens is a concave surface,
  wherein, a radius of curvature of an object side surface of the fourth lens R7 and a radius of curvature of an image side surface of the fourth lens R8 satisfy: |(R7+R8)/(R7−R8)|≤2,
  wherein the telephoto lens assembly has and only has five lenses having focal power, and
  wherein a center thickness of the first lens CT1, a center thickness of the second lens CT2, a center thickness of the third lens CT3, a center thickness of the fourth lens CT4 and a center thickness of the fifth lens CT5 satisfy: 0.5<(CT2+CT3+CT5)/(CT1+CT4)<1.0.

2. The telephoto lens assembly according to claim 1, wherein
  the effective focal length of the first lens f1 and the total effective focal length f satisfy: 0.45<f1/f≤1.0.

3. The telephoto lens assembly according to claim 1, wherein
  the second lens has a negative focal power, an image side surface of the second lens is a concave surface, and an effective focal length of the second lens f2 and the total effective focal length f satisfy: −1.5<f2/f<−0.7.

4. The telephoto lens assembly according to claim 1, wherein
  an effective focal length of the third lens f3, the effective focal length of the fourth lens f4 and the total effective focal length f satisfy: |f/f3|+|f/f4|<1.5.

5. The telephoto lens assembly according to claim 1, wherein
  a radius of curvature of an object side surface of the third lens R5 and a radius of curvature of an image side surface of the third lens R6 satisfy: |(R5−R6)/(R5+R6)|≤1.

6. A telephoto lens assembly, comprising a first lens, a second lens, a third lens, a fourth lens and a fifth lens, which are provided sequentially from an object side to an image side along an optical axis, an axial distance from an object side surface of the first lens to an image plane TTL and a total effective focal length f of the telephoto lens assembly satisfying: TTL/f≤1.0, and a radius of curvature of an object side surface of the third lens R5 and a radius of curvature of an image side surface of the third lens R6 satisfying: |(R5−R6)/(R5+R6)|≤1, the fourth lens having a positive focal power, wherein, the fifth lens has a negative focal power, and an object side surface of the fifth lens is a concave surface, and wherein, a radius of curvature of an object side surface of the fourth lens R7 and a radius of curvature of an image side surface of the fourth lens R8 satisfy: |(R7+R8)/(R7−R8)|≤2, wherein the telephoto lens assembly has and only has five lenses having focal power, and wherein the second lens has a negative focal power, an image side surface of the second lens is a concave surface, and an effective focal length of the second lens f2 and the total effective focal length f satisfy: −1.5<f2/f<−0.7, wherein a center thickness of the first lens CT1, a center thickness of the second lens CT2, a center thickness of the third lens CT3, a center thickness of the fourth lens CT4 and a center thickness of the fifth lens CT5 satisfy: 0.5<(CT2+CT3+CT5)/(CT1+CT4)<1.0.

7. The telephoto lens assembly according to claim 6, wherein the first lens has a positive focal power, the object side surface of the first lens is a convex surface, and an effective focal length of the first lens f1 and the total effective focal length f satisfy: 0.45<f1/f≤1.0.

8. The telephoto lens assembly according to claim 6, wherein the fourth lens has a positive focal power, and an effective focal length of the third lens f3, an effective focal length of the fourth lens f4 and the total effective focal length f satisfy: |f/f3|+|f/f4|<1.5.

9. The telephoto lens assembly according to claim 8, wherein the effective focal length of the first lens f1, the effective focal length of the fourth lens f4 and the total effective focal length f satisfy: 1<|f/f1|+|f/f4|≤2.7.

10. The telephoto lens assembly according to claim 1, wherein a radius of curvature of an object side surface of the second lens R3 and a radius of curvature of the image side surface of the second lens R4 satisfy: |(R3+R4)/(R3−R4)|≤2.

11. The telephoto lens assembly according to claim 1, wherein an axial air spacing between the second lens and the third lens T23 and an axial air spacing between the third lens and the fourth lens T34 satisfy: T34/T23<2.5.

12. The telephoto lens assembly according to claim 1, wherein a vector height of the object side surface of the fifth lens at a maximum effective diameter SAG51 and a center thickness of the fifth lens CT5 satisfy: |SAG51/CT5|<4.0.

13. The telephoto lens assembly according to claim 1, wherein an effective focal length of the fifth lens f5 and the total effective focal length f satisfy: −1.5<f5/f<−0.5.

14. A camera device, comprising the telephoto lens assembly according to claim 1.

15. A camera device, comprising a telephoto lens assembly, the telephoto lens assembly comprising a first lens, a second lens, a third lens, a fourth lens and a fifth lens, which are provided sequentially from an object side to an image side along an optical axis, an axial distance from an object side surface of the first lens to an image plane TTL and a total effective focal length f of the telephoto lens assembly satisfying: TTL/f≤1.0, and a radius of curvature of an object side surface of the third lens R5 and a radius of curvature of an image side surface of the third lens R6 satisfying: |(R5−R6)/(R5+R6)|≤1, the fourth lens having a positive focal power, wherein, the fifth lens has a negative focal power, and an object side surface of the fifth lens is a concave surface, wherein, a radius of curvature of an object side surface of the fourth lens R7 and a radius of curvature of an image side surface of the fourth lens R8 satisfy: |(R7+R8)/(R7−R8)|≤2, wherein the telephoto lens assembly has and only has five lenses having focal power, wherein the second lens has a negative focal power, an image side surface of the second lens is a concave surface, and an effective focal length of the second lens f2 and the total effective focal length f satisfy: −1.5<f2/f<−0.7, and wherein a center thickness of the first lens CT1, a center thickness of the second lens CT2, a center thickness of the third lens CT3, a center thickness of the fourth lens CT4 and a center thickness of the fifth lens CT5 satisfy: 0.5<(CT2+CT3+CT5)/(CT1+CT4)<1.0.

* * * * *